(12) United States Patent
Zhang

(10) Patent No.: US 10,041,451 B2
(45) Date of Patent: Aug. 7, 2018

(54) METHODS AND SYSTEMS FOR CONTROLLING AIR FLOW PATHS IN AN ENGINE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 281 days.

(21) Appl. No.: 15/162,443

(22) Filed: May 23, 2016

(65) Prior Publication Data

US 2017/0335805 A1 Nov. 23, 2017

(51) Int. Cl.

| | |
|---|---|
| B60T 7/12 | (2006.01) |
| F02M 26/30 | (2016.01) |
| F02M 26/02 | (2016.01) |
| F02M 26/28 | (2016.01) |
| F02M 26/33 | (2016.01) |

(Continued)

(52) U.S. Cl.
CPC .............. *F02M 26/30* (2016.02); *F01N 3/20* (2013.01); *F01N 5/025* (2013.01); *F01P 3/20* (2013.01); *F02D 41/0007* (2013.01); *F02D 41/0065* (2013.01); *F02D 41/0077* (2013.01); *F02D 41/26* (2013.01); *F02M 26/02* (2016.02); *F02M 26/05* (2016.02); *F02M 26/28* (2016.02); *F02M 26/33* (2016.02); *F02M 35/10157* (2013.01); *F02M 35/10268* (2013.01); *Y02T 10/144* (2013.01); *Y02T 10/166* (2013.01); *Y02T 10/47* (2013.01)

(58) Field of Classification Search
CPC ... F01P 7/00; F01P 7/02; F02D 41/006; F02D 41/0007; F02D 2021/083; F02D 2021/086; F02D 41/0047; F02D 41/0072; F02M 25/0752; F02M 25/072; F02M 25/0722; F02M 25/0724; F02M 25/0793; F02B 29/04; F02B 29/0475
USPC .............. 123/568.2, 568.21, 568.23, 568.31; 60/599; 701/101, 108, 109, 114, 115
See application file for complete search history.

(56) References Cited

U.S. PATENT DOCUMENTS

| | | |
|---|---|---|
| 4,674,283 A | 6/1987 | Ishida et al. |
| 5,271,221 A | 12/1993 | Lyon |

(Continued)

FOREIGN PATENT DOCUMENTS

WO 2010112959 A1 10/2010

OTHER PUBLICATIONS

Zhang, Xiaogang, "Methods and Systems for Controlling Air Flow Paths in an Engine," U.S. Appl. No. 15/162,443, filed May 23, 2016, 124 pages.

*Primary Examiner* — John Kwon
(74) *Attorney, Agent, or Firm* — Julia Voutyras; McCoy Russell LLP

(57) ABSTRACT

Methods and systems are provided for controlling a temperature of gases within a heat exchanger, a ratio of gases output by the heat exchanger, and selectively charging/discharging gases from the heat exchanger to one or both of an intake system or an exhaust system. In one example, a method may include controlling operation of an energy recovery device coupled to the heat exchanger in response to engine operating conditions, and increasing or decreasing flow of exhaust gas and/or compressed intake air into the heat exchanger in response to energy recovery device output.

20 Claims, 13 Drawing Sheets

(51) Int. Cl.
*F01N 3/20* (2006.01)
*F01N 5/02* (2006.01)
*F01P 3/20* (2006.01)
*F02D 41/00* (2006.01)
*F02D 41/26* (2006.01)
*F02M 35/10* (2006.01)
*F02M 26/05* (2016.01)

(56) References Cited

U.S. PATENT DOCUMENTS

| | | |
|---|---|---|
| 5,333,447 A | 8/1994 | Goodrich |
| 6,209,530 B1 | 4/2001 | Faletti et al. |
| 7,028,463 B2 | 4/2006 | Hammond et al. |
| 8,042,527 B2 | 10/2011 | Styles et al. |
| 8,857,179 B2 | 10/2014 | Kado et al. |
| 8,997,484 B2 | 4/2015 | Rollinger et al. |
| 9,279,396 B2 | 3/2016 | Rollinger et al. |
| 9,382,838 B2 | 7/2016 | Rollinger et al. |
| 2006/0201468 A1 | 9/2006 | Lancaster et al. |
| 2010/0146968 A1 | 6/2010 | Simpson et al. |
| 2011/0072788 A1 | 3/2011 | Ruona et al. |
| 2011/0209473 A1* | 9/2011 | Fritz ............... F01K 23/065 60/605.2 |
| 2011/0239643 A1* | 10/2011 | LeJeune ........... F01K 23/065 60/598 |
| 2012/0192560 A1* | 8/2012 | Ernst ............... F01K 23/065 60/616 |
| 2013/0305715 A1 | 11/2013 | Rollinger et al. |
| 2014/0060040 A1 | 3/2014 | Zhang et al. |
| 2014/0238318 A1 | 8/2014 | Zhang |
| 2015/0007569 A1* | 1/2015 | Eybergen ............ F01K 7/36 60/670 |
| 2015/0027118 A1* | 1/2015 | Tricaud ............... F01N 5/02 60/624 |
| 2016/0003045 A1* | 1/2016 | Fortini ............... F01C 1/126 418/197 |
| 2017/0130613 A1* | 5/2017 | Eybergen ........... F01K 23/10 |
| 2017/0321598 A1* | 11/2017 | Williams ............ F01N 5/02 |

\* cited by examiner

METHODS AND SYSTEMS FOR CONTROLLING AIR FLOW PATHS IN AN ENGINE

FIELD

The present description relates generally to methods and systems for controlling air flow paths of an internal combustion engine.

BACKGROUND/SUMMARY

Engine systems may utilize recirculation of exhaust gas from an engine exhaust system to an engine intake system, a process referred to as exhaust gas recirculation (EGR), to reduce regulated noxious emissions. Turbocharged engines may include a low-pressure EGR (LP EGR) system, a high-pressure EGR (HP EGR) system, or both. The LP EGR system diverts exhaust gases after the gases pass through the turbine of the turbocharger and injects the gases before the compressor, while the HP EGR system diverts exhaust gases before the turbine and injects the gases after the intake throttle. An EGR valve may be controlled in either example to achieve a desired intake air dilution, the desired intake air dilution based on engine operating conditions to maintain desirable combustion stability of the engine while providing emissions and fuel economy benefits.

An engine system may also utilize another separate approach to reduce noxious emissions that includes increasing exhaust gas temperatures by operating the engine rich (e.g., increasing the ratio of fuel to air delivered to cylinders of the engine) to generate high levels of engine-out carbon monoxide (CO), hydrogen (H2), and hydrocarbons and at the same time pumping air (herein referred to as secondary air injection or SAI) into the exhaust manifold upstream of an emissions control device (such as an exhaust catalyst). The air pumped into the exhaust manifold may react with the exhaust gases generating an exothermic reaction. As a result, rapid heating of the emissions control device may be achieved and performance of the emissions control device increases, resulting in decreased noxious emissions.

However, the inventors herein have recognized issues with the above approaches. An engine system including only a LP EGR system has a long transport delay, as the exhaust gases travel through the turbocharger compressor, high pressure air induction plumbing, charge air cooler, and intake manifold before reaching the combustion chamber. As a result, it may be difficult to provide the desired amount of EGR to the cylinders, particularly during transient conditions. This is due to the fact that, by the time the EGR reaches the cylinder, the engine speed/load state may have changed and another EGR rate may be desired. An engine system including only a HP EGR system has a reduced EGR delivery time, but the percentage of EGR gases compared to intake gases may be limited and the ability to provide sustained EGR delivery may be compromised by low exhaust pressures. An engine system including a both a LP EGR system and a HP EGR system may experience energy losses due to increased cooling of hot exhaust gases and an increased complexity of valve arrangement. Additionally, the ability to supply secondary air injection to the exhaust system may be controlled by an additional system separate from the LP and EGR systems, further increasing the complexity of the engine system arrangement. Further still, EGR gases are often cooled via an EGR cooler in order to reduce a risk of engine and/or compressor degradation due to injection of hot EGR gases into the intake system. As a result, thermal energy of the hot EGR gases is wasted (e.g., the thermal energy is absorbed by coolant circulating through the EGR cooler) and the engine system may experience increased energy losses due to increased engine load (e.g., increased fan speeds, increased coolant circulation and pump speeds, etc.) in order to cool the EGR gases via the EGR cooler.

In one example, the issues described above may be addressed by a method for flowing intake air through a heat exchanger and selectively to each of an intake system and an exhaust system; flowing exhaust gas through an energy recovery device coupled with the heat exchanger, through the heat exchanger, and selectively to each of the intake and exhaust system; and adjusting the flow of intake air and exhaust gas through the heat exchanger in response to an output of the energy recovery device. In one example of the heat exchanger, exhaust gases may selectively flow from both upstream and downstream of an emissions control device into the heat exchanger and through the energy recovery device. Additionally, compressed intake air may selectively flow from downstream of a compressor and into the heat exchanger. The energy recovery device may receive thermal energy from the hot exhaust gases entering the heat exchanger and convert the thermal energy into electrical energy. The exhaust gases may then travel through the remainder of the heat exchanger where a portion of the thermal energy remaining in the exhaust gases may transfer to fresh air within the heat exchanger, resulting in an increased temperature of the fresh air. The fresh air may then be provided to the exhaust system in the form of secondary air injection, with the increased temperature of the fresh air enabling a more efficient exothermal reaction between the fresh air and the engine exhaust gases, or returned to the intake system upstream of the compressor to decrease compressor surge. The exhaust gases exiting the heat exchanger may be provided to the intake system in the form of LP EGR or HP EGR, with the decreased temperature of the exhaust gases enabling a more efficient compression for increased compressor and/or engine performance. In this way, the output of the heat exchanger may be controlled to supply low pressure LP EGR, HP EGR, secondary air injection, air for compressor surge control, and exhaust energy recovery. By controlling the temperature of the gases within the heat exchanger and the ratio of the gases output by the heat exchanger, the heat exchanger can be utilized with a wide variety of engine operating conditions to increase engine performance and lower emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
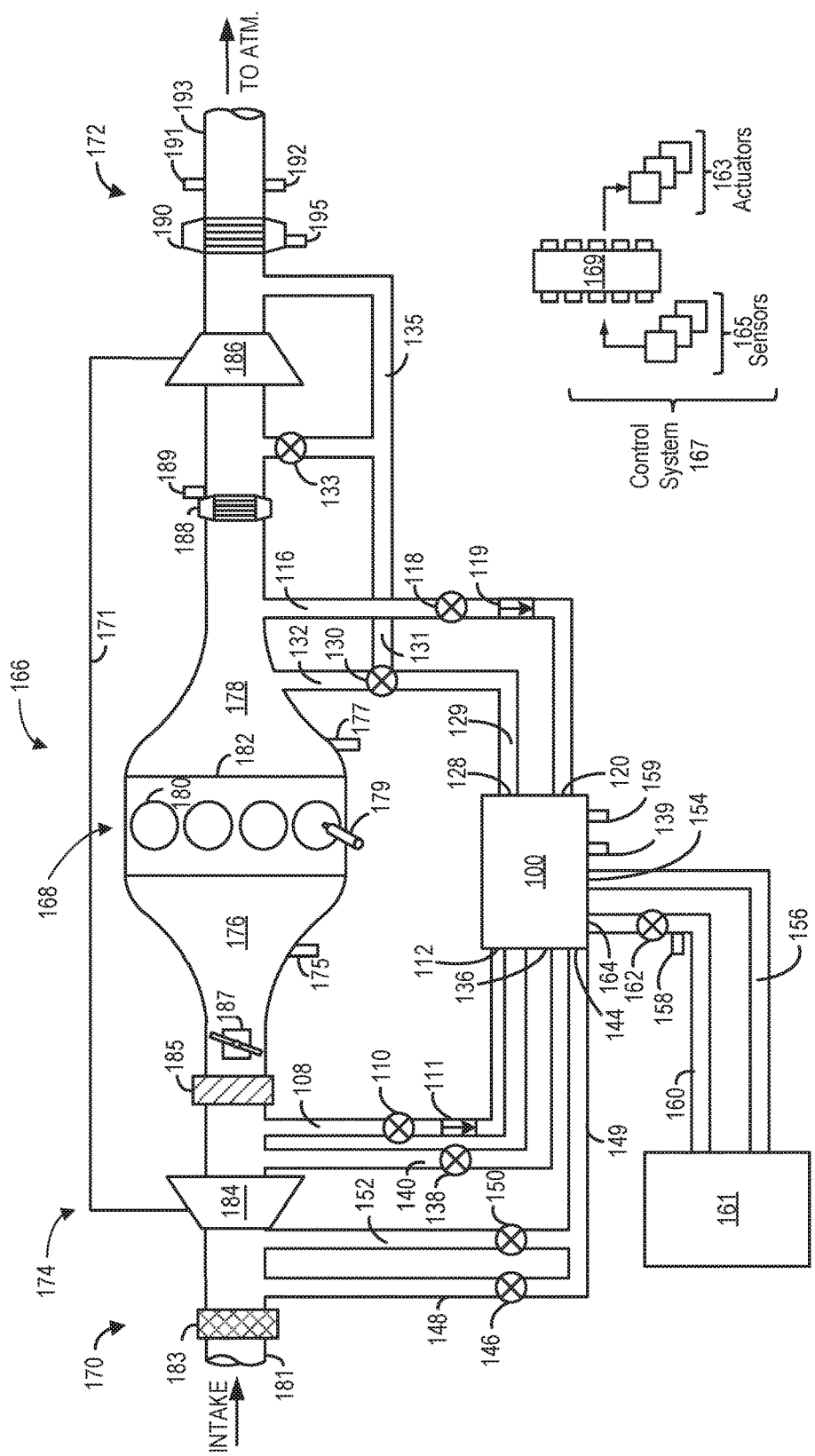
FIG. 1 shows a first schematic of a system for an engine including a heat exchanger positioned between an intake system and an exhaust system of the engine.

The following description relates to systems and methods for accumulating and/or distributing exhaust gases and intake air throughout a boosted engine system, such as the engine system shown by FIG. 1, wherein the engine system includes a heat exchanger (which may herein be referred to as a mixing tank, flow mixing tank, or gas mixing tank reservoir). By accumulating, mixing, and/or flowing exhaust gases and intake air within the heat exchanger, such as the heat exchanger shown by FIG. 2, gases may be discharged into an intake system and/or an exhaust system to provide low-pressure exhaust-gas recirculation, high-pressure exhaust-gas recirculation, secondary air injection, and/or compressor surge reduction. An engine controller may be configured to perform a control routine, such as the example method of FIGS. 3A-3B, to charge the heat exchanger with one or more of combusted exhaust gas from the exhaust system or fresh intake air from the intake system (when charging opportunities are available), and/or to discharge the pressurized charge from the mixing tank into the intake system and/or the exhaust system based on engine operating conditions, as well as the composition of charge available in the mixing tank. Further, the flow of coolant through the heat exchanger may be controlled in order to deliver air from the heat exchanger to the intake and/or exhaust system at a desired temperature for the air injection application (e.g., HP EGR, LP EGR, or secondary air injection). The controller may also be configured to perform a control routine, such as the example method of FIG. 4, to determine whether to adjust a discharge of gases from the heat exchanger to the exhaust manifold and/or the turbine bypass passage when secondary air injection and/or an increase in turbine rotational speed is advantageous. Example charging and discharging operations are shown in FIG. 5.

Figure 6:
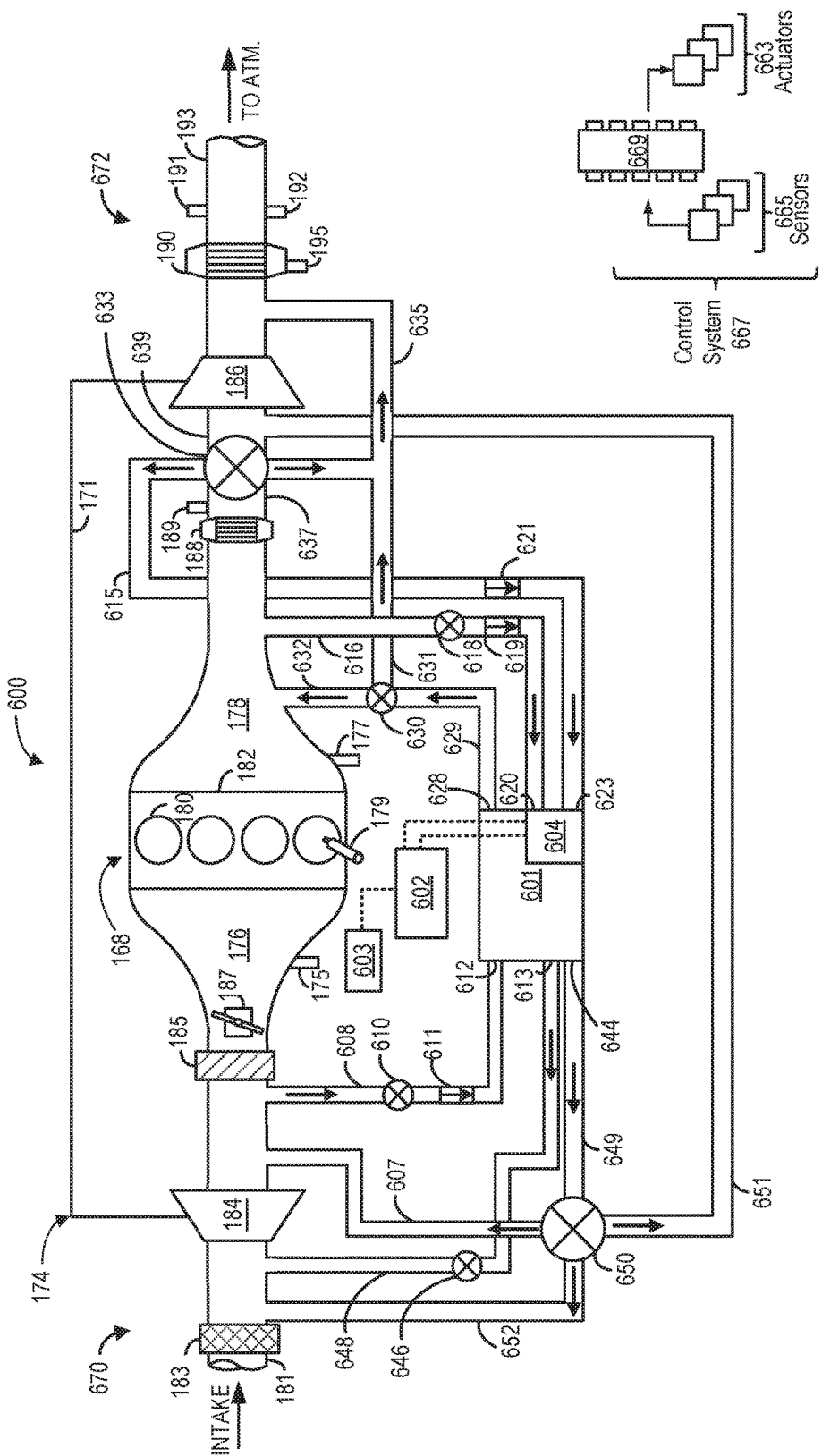
FIG. 6 shows a second schematic of a system for an engine including a heat exchanger positioned between an intake system and an exhaust system of the engine and an energy recovery device coupled to the heat exchanger.
Figure 7:
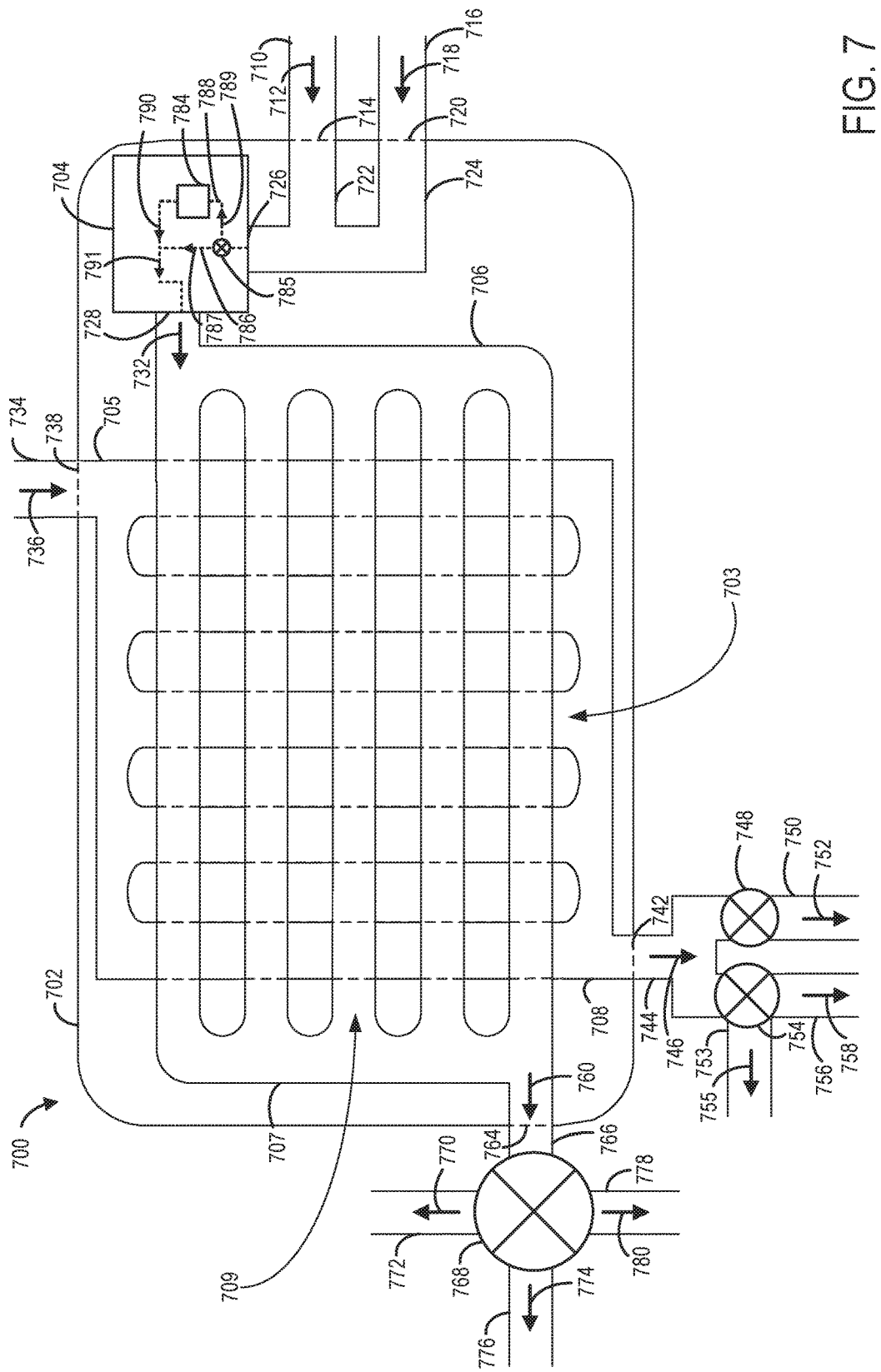
FIG. 7 shows a second embodiment of a heat exchanger including gas passages internal to the heat exchanger, gas inlet and outlet ports coupled to the internal gas passages, and an energy recovery device coupled to the heat exchanger.
Figure 10:
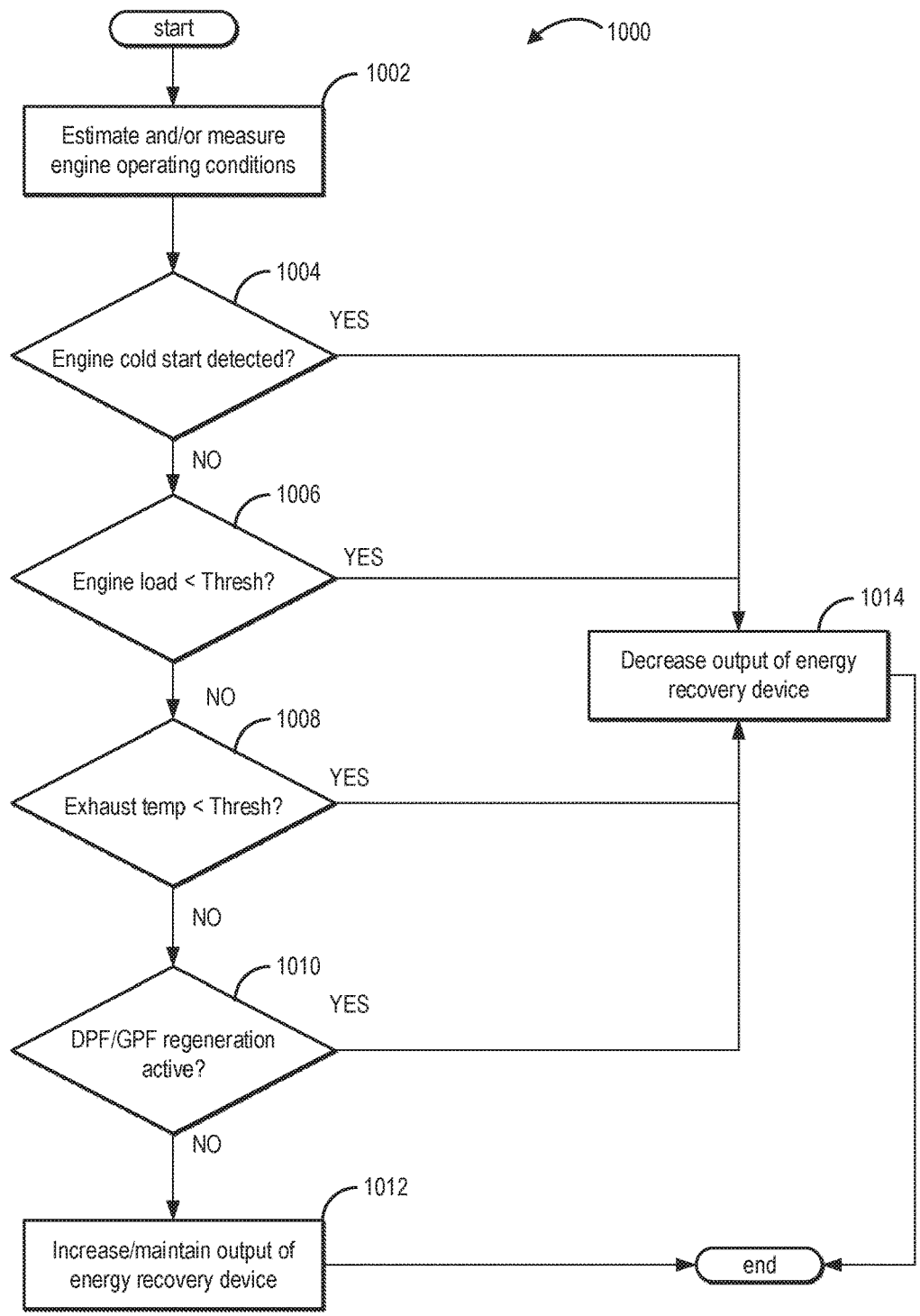
FIG. 10 shows a method of increasing or decreasing energy recovery from an energy recovery device of a heat exchanger in response to engine operating conditions.
Figure 11:
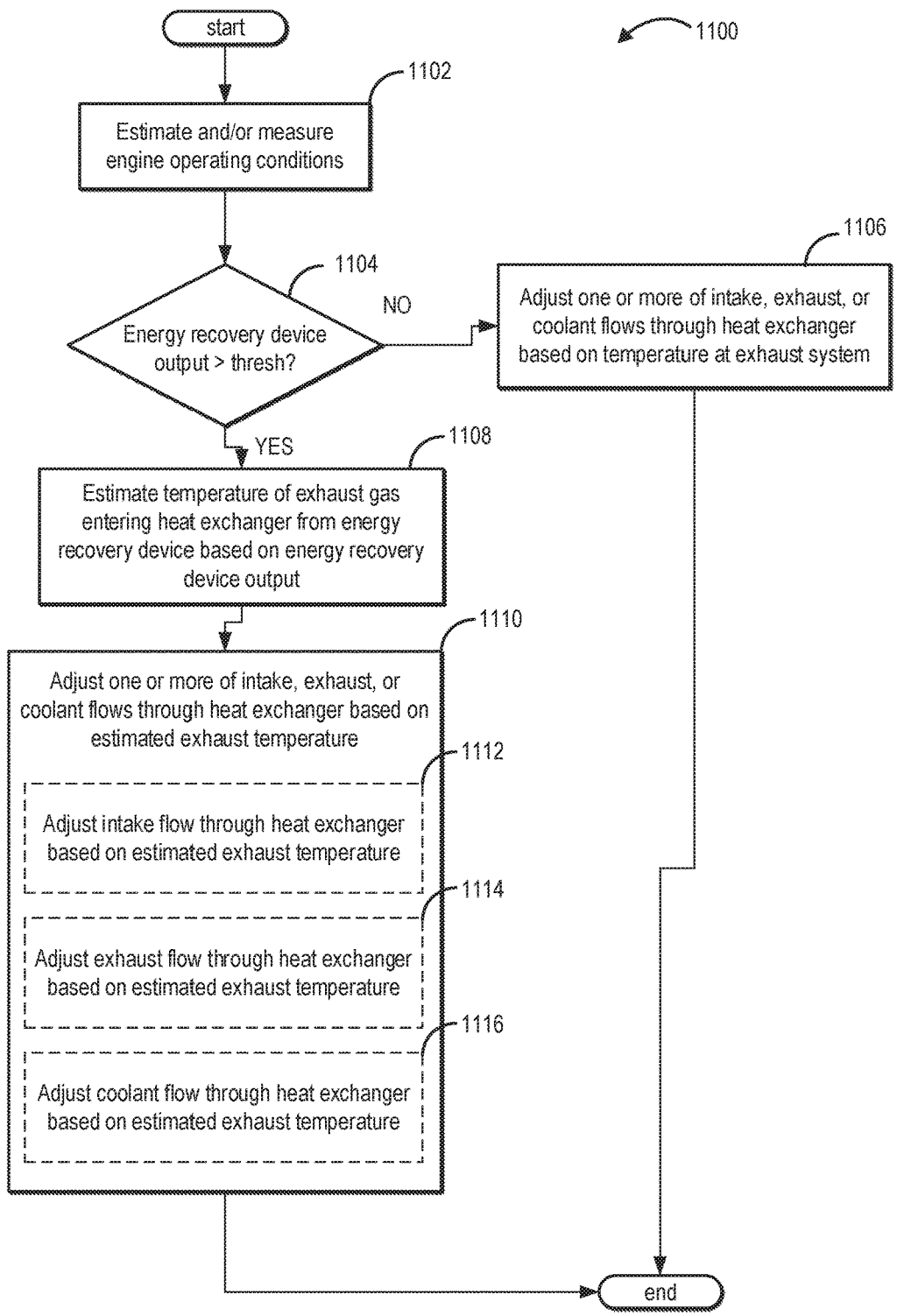
FIG. 11 shows a method of adjusting intake, exhaust, and/or coolant flow to a heat exchanger in response to energy recovery device operating conditions.
Figure 12:
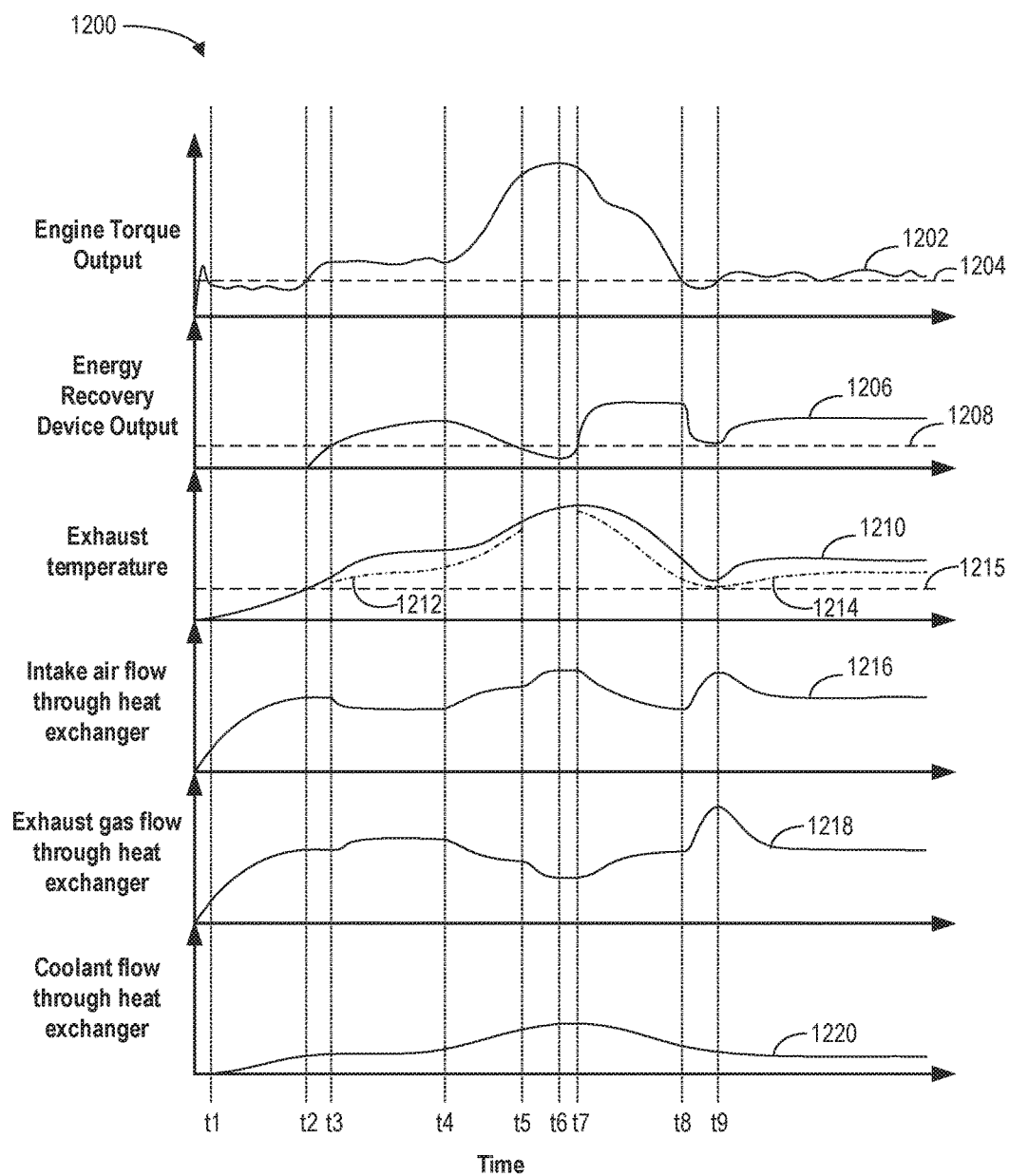
FIG. 12 shows graphs illustrating example energy recovery device operation of a heat exchanger based on engine operating conditions.

In another embodiment, an engine system, such as the engine system shown by FIG. 6, may include an energy recovery device coupled to a heat exchanger. Hot exhaust gases from an exhaust system may flow into the heat exchanger and through the energy recovery device, where a portion of the thermal energy of the exhaust gases is converted into electrical energy by the energy recovery device. The exhaust gases may then provide thermal energy to intake gases flowing through the heat exchanger via a plurality of passages internal to the heat exchanger, as shown by FIG. 7. In yet another embodiment, an engine system, such as the engine system shown by FIG. 8, may include a heat exchanger utilizing an energy recovery device and a radiator circulating coolant between the heat exchanger and the radiator. The coolant may circulate through a volume (e.g., a series of passages) internal to the heat exchanger and may exchange thermal energy with the intake gases and the exhaust gases flowing through the heat exchanger (e.g., via separate flow passages within the heat exchanger), as shown by FIG. 9. For example, coolant passages may be arranged proximate to the gas passages to permit heat to transfer from the gases into the coolant. In one example, the heat exchanger may include separate gas passages for the coolant flow, exhaust flow, and intake air flow such that the coolant, exhaust gases, and intake air do not mix with each other within the heat exchanger. The operation of the energy recovery device within the heat exchanger may be controlled in response to engine operating conditions, as shown by FIG. 10. In one example, engine operating conditions that may determine the output of the energy recovery device include exhaust temperature, engine load, particulate filter regeneration activation, etc. In response to operation of the energy recovery device, flow of exhaust gases, intakes gases, and coolant to the heat exchanger may be adjusted, as shown by FIG. 11. Example operation of the energy recovery device, including output of the energy recovery device in response to engine operating conditions, is shown by FIG. 12.

By discharging gases from the heat exchanger into the exhaust system, turbine spin-up may be expedited and/or operating temperatures for one or more emission control devices may be quickly reached. By utilizing the output of the heat exchanger to enable high-pressure EGR to be provided during high engine torque demand, low-pressure EGR to be provided during low-to-moderate engine torque demand, and compressor surge control to be provided when adjusting from high engine torque demand to low engine torque demand, engine performance may be increased. Further, by adjusting the flow of coolant through the heat exchanger based on a temperature of the coolant and desired air injection application, a temperature of the air entering the intake or exhaust system from the heat exchanger may be controlled to a desired temperature. This may result in an increase in engine efficiency, decrease in engine emissions, and a decrease in compressor degradation. Additionally, by utilizing hot exhaust gases to convert thermal energy into electrical energy via the energy recovery device, and to heat the intake air within the heat exchanger, energy may be more efficiently transferred between mediums without using additional devices and/or energy storage means. For example, various electrical loads of the engine may be supported using energy recovered by the energy recovery device from exhaust gases, thereby reducing a power usage of the engine and/or reducing additional batteries or electrical storage means. Further, in one example, by transferring heat between exhaust gas and intake air within the heat exchanger, additional cooling from a cooling system (e.g., coolant from a radiator) may be reduced or altogether omitted. This may allow the engine to operate more efficiently and reduce power usage.

FIG. 1 schematically shows aspects of an example engine system 166 including an engine 168. In the depicted embodiment, engine 168 includes an intake system 170 and an exhaust system 172. The engine 168 also includes a turbocharger 174 with a compressor 184 arranged within the intake system 170 and a turbine 186 arranged within the exhaust system 172. The compressor 184 is coupled to the turbine 186 by a shaft 171 and driven by the rotational motion of the turbine 186. Specifically, fresh air is introduced along intake passage 181 into engine 168 via air cleaner 183 and flows to compressor 184. The compressor may be any suitable intake-air compressor, such as a motor-driven or driveshaft driven supercharger compressor. In engine system 166, however, the compressor is a turbocharger compressor mechanically coupled to turbine 186 via shaft 171, and the turbine 186 is driven to rotate by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 184 is coupled, through charge-air cooler 185 to throttle valve 187. Throttle valve 187 is coupled to engine intake manifold 176. From the compressor, the compressed air charge flows through the charge-air cooler 185 and the throttle valve 187 to the intake manifold 176. The charge-air cooler 185 may be an air-to-air or air-to-water heat exchanger, for example. In the embodiment shown in FIG. 1, the pressure of the air charge within the intake manifold 176 is sensed by manifold air pressure (MAP) sensor 175. A compressor by-pass valve (not shown) may be coupled in series between the inlet and the outlet of compressor 184. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 176 is coupled to a series of combustion chambers 180 through a series of intake valves (not shown). The combustion chambers are further coupled to exhaust manifold 178 via a series of exhaust valves (not shown). The combustion chambers 180 are capped by cylinder head 182 and coupled to fuel injectors 179. In the depicted embodiment, a single exhaust manifold 178 is shown. However, in other embodiments, the exhaust manifold may include a plurality of exhaust manifold sections. Configurations having a plurality of exhaust manifold sections may enable effluent from different combustion chambers to be directed to different locations in the engine system. In the embodiment shown in FIG. 1, the pressure of the exhaust gases within the exhaust manifold 178 is sensed by manifold air pressure (MAP) sensor 177.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as desired for combustion and emissions-control performance.

Engine 168 may be controlled at least partially by a control system 167 including controller 169 and by input from a vehicle operator via an input device (not shown). Control system 167 is configured to receive information from a plurality of sensors 165 (various examples of which are described herein) and sending control signals to a plurality of actuators 163. As one example, sensors 165 may include temperature sensor 158 coupled to coolant inlet passage 160, temperature sensor 139 coupled to flow mixing tank (also referred to herein as a heat exchanger) 100, temperature sensor 189 coupled to first emission control device 188, temperature sensor 191 coupled to exhaust conduit 193, temperature sensor 195 coupled to second emission control device 190, manifold air pressure sensor 175 coupled to intake manifold 176, manifold air pressure sensor 177 coupled to exhaust manifold 178, and pressure sensor 159 coupled to flow mixing tank 100. Various exhaust gas sensors may also be included in exhaust system 172, within and/or downstream of exhaust manifold 178, such as particulate matter (PM) sensors, temperature sensors, pressure sensors, NOx sensors, oxygen sensors, ammonia sensors, hydrocarbon sensors, etc. Other sensors such as additional pressure, temperature, air/fuel ratio and composition sensors may be coupled to various locations in the engine system 166. As another example, actuators 163 may include fuel injector 179, valve 150 coupled to surge control passage 152, valve 146 coupled to low-pressure exhaust gas recirculation passage 148, valve 138 coupled to high-pressure exhaust gas recirculation passage 140, valve 110 coupled to boost air passage 108, valve 118 coupled to exhaust inlet passage 116, waste gate 133 coupled to turbine bypass passage 135, valve 162 coupled to coolant inlet passage 160, and intake throttle 187. Actuators 163 may also include three-way valve 130 coupled to second external split passage 129, first secondary air injection passage 132, and second secondary air injection passage 131. Other actuators, such as a variety of additional valves and throttles, may be coupled to various locations in engine system 166. Controller 169 may receive input data from the various sensors, process the input data, and trigger the actuators in response to the processed input data based on instruction or code programmed therein corresponding to one or more routines.

Controller 169 may be a microcomputer, and may include a microprocessor unit, input/output ports, an electronic storage medium for executable programs and calibration values such as a read only memory chip, random access memory, keep alive memory, and/or a data bus. Controller 169 may receive various signals from sensors coupled to engine 168, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft; throttle position (TP) from a throttle position sensor; absolute manifold pressure signal (MAP) from one or more intake and exhaust manifold sensors, cylinder air/fuel ratio from an exhaust gas oxygen sensor, and abnormal combustion from a knock sensor and a crankshaft acceleration sensor. Engine speed signal, RPM, may be generated by controller 169 from signal PIP. Manifold pressure signal MAP from a manifold pressure sensor may be used to provide an indication of vacuum, or pressure, in the intake manifold.

Storage medium read-only memory can be programmed with computer readable data representing instructions executable by a processor for performing the methods described below as well as other variants that are anticipated but not specifically listed. Example routines are shown with reference to FIGS. 3A-6.

FIG. 1 shows electronic control system 167, which may be any electronic control system of the vehicle in which engine system 166 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system-throttle valves, compressor by-pass valves, waste gates, EGR valves and shut-off valves, secondary air valves, various reservoir intake and exhaust valves, for example—to enact any of the control functions described herein. Further, to assess operating conditions in connection with the control functions of the engine system, the electronic control system may be operatively coupled to a plurality of sensors arranged throughout the engine system-flow sensors, temperature sensors, pedal-position sensors, pressure sensors, etc.

Combustion chambers 180 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 186 to drive the turbine 186. The exhaust passes through a first emission control device 188 while flowing towards turbine 186. When reduced turbine torque is desired, some exhaust may be directed instead through a waste gate 133 into a turbine bypass passage 135, by-passing the turbine. The combined flow from the turbine 186 and the waste gate 133 then flows through second emission control device 190. In the embodiment of the engine system 166 shown by FIG. 1, the second emission control device 190 has a larger exhaust processing capability than the first emission control device 188, but may experience an increased amount of time to reach operating temperature. In alternate embodiments (not shown), the engine system may possesses a different number, arrangement, and/or relative processing capacity of emission control devices. First emission control device 188 and second emission control device 190 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control devices 188 and 190 may be released into the atmosphere via exhaust conduit 193. Temperature sensor 191 and flow sensor 192 are coupled to exhaust conduit 193 to monitor operating conditions. Additional sensors (not shown) may be included to detect exhaust pressure, composition, etc. Depending on operating conditions, some exhaust may be diverted instead to an exhaust inlet passage 116 of a gas mixing tank reservoir 100 via valve 118. An exhaust inlet port 120 of the gas mixing tank reservoir 100 is fluidically coupled with the exhaust inlet passage 116 to permit exhaust gases to flow into the gas mixing tank reservoir 100 (which herein may be referred to as a mixing tank or flow mixing tank). In this manner, the flow mixing tank 100 is configured to admit exhaust tapped from upstream of first emission control device 188 and downstream of the exhaust manifold 178. The valve 118 may be opened to admit a controlled amount of exhaust gas to the flow mixing tank 100 for desirable tank pressure and gas composition. A check valve 119 is included within exhaust inlet passage 116 downstream of the valve 118 to reduce the likelihood of flowing contents of the mixing tank back through exhaust inlet passage 116 towards the exhaust manifold 178. In this way, engine system 166 is adapted to accumulate exhaust gases within flow mixing tank 100. The flow mixing tank 100 provides increased homogenization of the exhaust gas into the intake air charge. Further, the mixing of exhaust gas with intake air charge within the flow mixing tank 100 provides effective cooling of the exhaust gas for increased available EGR mass and increased performance.

In engine system 166, compressor 184 is a source of compressed intake air, but under some conditions, the amount of intake air available from the compressor may be inadequate. Such conditions include periods of rapidly increasing engine load, such as immediately after start-up, upon tip-in, or upon exiting deceleration fuel shut-off (DFSO). As such, during a DFSO operation, fuel injection to one or more engine cylinders may be selectively deactivated responsive to selected vehicle deceleration or braking conditions. During at least some of these conditions of rapidly increasing engine load, the amount of compressed intake air available from the compressor may be limited due to the turbine not being spun up to a sufficiently high rotational speed (for example, due to low exhaust temperature or pressure). As such, the time for the turbine to spin up and drive the compressor to provide an amount of compressed intake air is referred to as turbo lag. During turbo-lag, the amount of torque provided may not match the torque demand, leading to a drop in engine performance.

In view of the issues noted above, the flow mixing tank 100 of engine system 166 may be any reservoir of suitable size configured to store pressurized charge for later discharge. As used herein, the pressurized charge refers to the gas stored in flow mixing tank 100. As such, the pressurized charge stored in flow mixing tank 100 may include clean intake air (e.g., compressed intake air drawn from the intake manifold), combusted exhaust gas (e.g., combusted exhaust gases drawn from the exhaust manifold), or a combination thereof (e.g., a mixture of intake air and exhaust gas having a defined and controlled EGR percentage). In one embodiment, the flow mixing tank 100 may be configured to store charge at the maximum pressure generated by compressor 184. Various inlets, outlets, and sensors may be coupled to the flow mixing tank 100, as elaborated below. In the embodiment shown in FIG. 1, pressure sensor 159 is coupled to the flow mixing tank 100 and configured to respond to the charge pressure there within. Temperature sensor 139 is also coupled to the flow mixing tank 100 and configured to respond to the temperature of the charge there within.

In engine system 166, flow mixing tank 100 is selectably coupled to intake system 170, both upstream of compressor 184 and downstream of compressor 184. More specifically, the flow mixing tank 100 is configured to discharge pressurized charge to the intake system 170, either to a first region upstream of the compressor 184 and downstream of air cleaner 183, or to a second region downstream of compressor 184 and upstream of charge air cooler 185. Discharge to the first region is accomplished via valve 146 coupled to/within low-pressure exhaust gas recirculation passage 148 (e.g., LP EGR passage 148), and/or via valve 150 coupled to/within surge control passage 152. The LP EGR passage 148 and the surge control passage 152 are coupled to the gas mixing tank reservoir 100 via first external split passage 149 (e.g., external to an interior of the gas mixing tank reservoir 100). Discharge to the second region is accomplished via valve 138 coupled to high-pressure exhaust gas recirculation passage 140 (e.g., HP EGR passage 140). Valve 150, valve 146, and valve 138 may be normally closed valves commanded to open (or increase an amount of opening to a position between fully closed and fully open) when a flow of charge from the flow mixing tank to the intake system is desired. In some scenarios, the pressurized charge may be delivered when the throttle valve is at least partially open. In some embodiments, a pressure recovery cone (not shown) may be fluidically coupled between the flow mixing tank and the intake system so that pressurized charge is conducted through the pressure recovery cone on discharge from the flow mixing tank. When included, the pressure recovery cone converts flow energy back to pressure energy during flow conditions by suppressing flow detachment from the conduit walls. In alternate embodiments, however, the pressure recovery cone may not be included.

Flow mixing tank 100 may also be charged with air drawn from the intake system, downstream of compressor 184 and upstream of charge air cooler 185. More specifically, the flow mixing tank 100 is configured to be charged with compressed intake air from the intake system, drawn from downstream of compressor 184 and upstream of intake throttle valve 187, via valve 110 coupled to boost air passage 108. The valve 110 may be a normally closed valve commanded to open (or increase an amount of opening) when a flow of pressurized intake air charge from the intake system to the flow mixing tank is desired. In one example, during low boost conditions, the valve 110 may be opened to drive at least some intake air pressurized by the compressor into flow mixing tank 100. As another example, during high boost conditions, the valve 110 may be opened to drive some compressed intake air into flow mixing tank 100 wherein it is mixed with pre-stored combusted exhaust gas to generate high pressure EGR. Then, during boosted conditions when a transient EGR request is received, the high pressure EGR is discharged into the intake system via valve 138 to provide the requested high pressure EGR. A check valve 111 coupled upstream of valve 110 allows compressed air from the compressor to flow into the flow mixing tank under conditions of high throttle-inlet pressure (TIP) and to be stored therein, but it reduces the likelihood of flowing stored compressed air back to the compressor under conditions of low TIP.

Flow mixing tank 100 is also shown selectably coupled to exhaust system 172 both upstream and downstream of turbine 186. More specifically, the flow mixing tank 100 is coupled to second external split passage 129 and the flow of gases from flow mixing tank 100 through second external split passage 129 is adjustable by actuation of three-way valve 130. Three-way valve 130 is coupled to second external split passage 129, first secondary air injection passage 132, and second secondary air injection (SAI) passage 131. The three-way valve 130 may be normally closed to each of the coupled passages (e.g., second external split passage 129, first SAI passage 132, and second SAI passage 131) so that gases do not flow through the three-way valve 130. However, the three-way valve 130 may be actuated by the controller 169 to allow gases to flow through the three-way valve 130 from one or more of the coupled passages.

In a first example, the three-way valve 130 may be actuated (e.g., opened) to increase the flow of gases from the second external split passage 129 into the first SAI passage 132, but reduce the flow of gases from the second external split passage 129 into the second SAI passage 131. By opening in this way, the three-way valve 130 allows gases to flow from the flow mixing tank 100 into the exhaust manifold 178, upstream of turbine 186. In a second example, the three-way valve 130 may be opened to increase the flow of gases from the second external split passage 129 into the second SAI passage 131 while reducing the flow of gases from first SAI passage 132 into either of the second external split passage 129 or the second SAI passage 131. By opening in this way, the three-way valve 130 allows gases to flow from the flow mixing tank 100 into the second SAI passage 131. The second SAI passage 131 is coupled to turbine bypass passage 135. Gases flow from the flow mixing tank 100, through three-way valve 130, into the second SAI passage 131, and into the turbine bypass passage 135.

By actuating the three-way valve 130 according to the first example described above, the flow mixing tank 100 may discharge gases into the exhaust manifold 178 upstream of the turbine 186 (e.g., to heat first emission control device 188, to spin turbine 186, etc.). By actuating the three-way valve 130 according to the second example described above, the flow mixing tank 100 may discharge gases downstream of the turbine 186 (e.g., to heat second emission control device 190, to reduce the likelihood of increasing turbine speed, etc.). Actuation of the three-way valve 130 may include fully opening or closing the valve to increase or decrease flow from one or more of the coupled passages from traveling through the three-way valve 130. Actuation may also include increasing or decreasing an amount of opening of the three-way valve 130 to a position between fully open and fully closed in order to increase or decrease flow from one or more of the coupled passages from traveling through the three-way valve 130.

Flow mixing tank 100 may also be charged with combusted exhaust gases drawn from the exhaust manifold, upstream of turbine 186. More specifically, the flow mixing tank 100 is configured to be charged with combusted exhaust gases drawn from the exhaust manifold, upstream of turbine 186, via valve 118. The valve 118 may be a normally closed valve commanded to open when a flow of combusted exhaust gas from the exhaust manifold to the flow mixing tank is desired. In one example, during low boost conditions, or low engine speed-load conditions, the valve 118 may be opened to drive at least some combusted exhaust gas into flow mixing tank 100. In this way, the EGR percentage of the flow mixing tank charge may be increased. The check valve 119 coupled downstream of valve 118 allows combusted exhaust gas from the exhaust manifold to flow into the flow mixing tank 100 and to be stored therein, but it reduces the likelihood of exhaust gas from flowing back.

In this way, during a first condition, the flow mixing tank 100 may be selectively charged with intake air from the intake system, downstream of a compressor, while during a second condition, the flow mixing tank may be selectively charged with combusted exhaust gas from the exhaust manifold, upstream of the turbine. During a third condition, the flow mixing tank 100 may be selectively charged with both intake air from the intake system and combusted exhaust gas from the exhaust manifold.

The flow mixing tank 100 includes a plurality of inlet/outlet ports for receiving and transmitting gases. For example, the flow mixing tank 100 includes a boost air port 112 coupled to boost air passage 108, an exhaust inlet port 120 coupled to exhaust inlet passage 116, a first gas outlet port 144 coupled to first external split passage 149, a second gas outlet port 136 coupled to HP EGR passage 140, and a third gas outlet port 128 coupled to second external split passage 129. While the flow mixing tank 100 shown by FIG. 1 includes the above inlet and outlet ports, alternate embodiments of the flow mixing tank may include a different number and/or arrangement of inlet and/or outlet ports.

The flow mixing tank 100 additionally includes a coolant inlet port 164 and a coolant outlet port 154 so that the flow mixing tank 100 may transmit and receive coolant to/from a radiator 161 included within the engine system 166. Coolant flowing through the flow mixing tank 100 may exchange heat with the gases stored/flowing through the mixing tank. As such, the coolant may remove or provide heat to the gases stored within the mixing tank depending on a temperature difference between the gases and coolant. A coolant inlet passage 160 is coupled to both the coolant inlet port 164 of the flow mixing tank 100 and the radiator 161. A valve 162 and a temperature sensor 158 are included with (e.g., coupled to) the coolant inlet passage 160. A measurement from temperature sensor 158 may be transmitted to the controller 169, and the controller 169 may actuate valve 162 in order to regulate the flow of coolant through coolant inlet passage 160 into the flow mixing tank 100. Coolant may then flow out of the flow mixing tank 100 through the coolant outlet port 154 coupled to a coolant outlet passage 156 to return to the radiator 161. While the radiator 161 is shown coupled to the flow mixing tank 100 in FIG. 1, the radiator may additionally be coupled to other components of the engine system (e.g., the cylinder head 182, or other components not shown by FIG. 1). In other words, the coolant inlet passage 160 and the coolant outlet passage 156 may be passages peripheral (e.g., secondary) to other coolant passages (not shown) coupled to the radiator.

The flow of the coolant through flow mixing tank 100 may vary depending on engine conditions, as described in the discussion of FIGS. 3A-3B and FIG. 5 below.

The configuration of flow mixing tank 100 in relation to the engine intake and exhaust systems enables various options for charging and discharging the flow mixing tank 100. As a first example, such as when the engine system is operated in a first mode, the mixing tank may be charged with compressed intake air from the intake system, and then responsive to a tip-in (or during high boost conditions), the compressed intake air may be discharged to the intake system to reduce turbo lag and assist in turbine spin-up. As a second example, such as when the engine system is operated in a second mode, the mixing tank may be charged with compressed intake air from the intake system, the compressed intake air may be discharged to the exhaust manifold to raise exhaust temperatures and assist in turbine spin-up. As a third example, such as when the engine system is operated in a third mode, the mixing tank may be charged with combusted exhaust gas from the exhaust manifold, and then during boosted conditions, when EGR is requested, the combusted exhaust gas may be discharged to the intake system to provide the desired EGR. As a fourth example, such as when the engine system is operated in a fourth mode, the mixing tank may be charged with combusted exhaust gas from the exhaust manifold, and then responsive to a tip-in, the combusted exhaust gas may be discharged to the exhaust manifold to raise the exhaust pressure upstream of the turbine, and assist in turbine spin-up. In still further examples, the reservoir may be charged with at least some combusted exhaust gas and at least some compressed intake air to provide a boost charge of a selected composition (e.g., desired EGR percentage, desired AFR, etc.) and then, at a later time, the pressurized charge may be discharged to either the intake system (for example, to provide high-pressure EGR, low-pressure EGR, and/or compressor surge reduction), to the exhaust manifold (for example, to raise the exhaust pressure and/or to provide secondary air injection for noxious emission reduction), or to the turbine bypass passage (for example, to expedite catalyst warm-up).

In some embodiments, flow mixing tank 100 may also be charged with the effluent of one or more unfueled cylinders (that is, charged with unfueled and uncombusted exhaust gas). Specifically, when engine 168 is operated in DFSO mode, where some of the combustion chambers receive no fuel and merely pump the air admitted through their respective intake valves, the air pumped and thereby compressed by the unfueled combustion chambers may be drawn from exhaust manifold via valve 118 and stored in mixing tank 100.

In the various engine systems discussed above, and in others fully consistent with this disclosure, pressurizing air or an air/exhaust mixture in a mixing tank may cause water vapor to condense inside the mixing tank. Therefore in some embodiment, a drain valve (not shown) may be coupled to flow mixing tank 100. The drain valve may be opened by electronic control system 167 to drain condensate from the mixing tank onto the road surface below the vehicle in liquid form, or directed to the exhaust system of the vehicle, evaporated, and discharged as a vapor.

The configuration of FIG. 1 enables air stored in the flow mixing tank to be discharged in response to at least a tip-in condition, where the throttle valve opens suddenly and the compressor is spinning too slowly to provide the desired intake manifold pressure (MAP). As elaborated herein below, during at least some tip-in conditions (such as when the boost level at tip-in is lower and anticipated turbo lag is higher), while discharging air from the flow mixing tank, a higher amount of spark retard may be used to rapidly raise the temperature of exhaust gas and expedite turbine spin-up. During other tip-in conditions (such as when the boost level at tip-in is higher and anticipated turbo lag is lower), while discharging air from the flow mixing tank, a smaller amount of spark retard (e.g., no spark retard) may be used to provide additional engine torque (corresponding to the discharged amount of boost air) to meet the torque demand while the compressor reaches the desired capacity.

In some embodiments, at least some cylinders of the engine may be configured to have spark timing retarded while boost air is discharged into the intake system for purposes of heating exhaust gas and expediting turbine spin. At the same time, other cylinders may be configured to maintain ignition timing while boost air is discharged for the purposes of torque generation. To reduce potential issues arising from a torque differential between the cylinders, the cylinders enabling exhaust gas heating and the cylinder enabling torque generation may be selected based their firing order. In this way, by expediting turbine spin-up, while providing torque, turbo lag can be reduced while increasing net engine combustion torque.

The configurations described above enable various methods for providing charge including air and/or combusted exhaust gas for a combustion chamber of an engine, for spinning up a turbine, for supplying high and/or low-pressure EGR gases to an intake system, for supplying secondary air injection to an exhaust manifold and/or turbine bypass passage, and for supplying gases to a compressor to reduce compressor surge. Accordingly, some such methods are now described, by way of example, with continued reference to the above configuration. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

Figure 2:
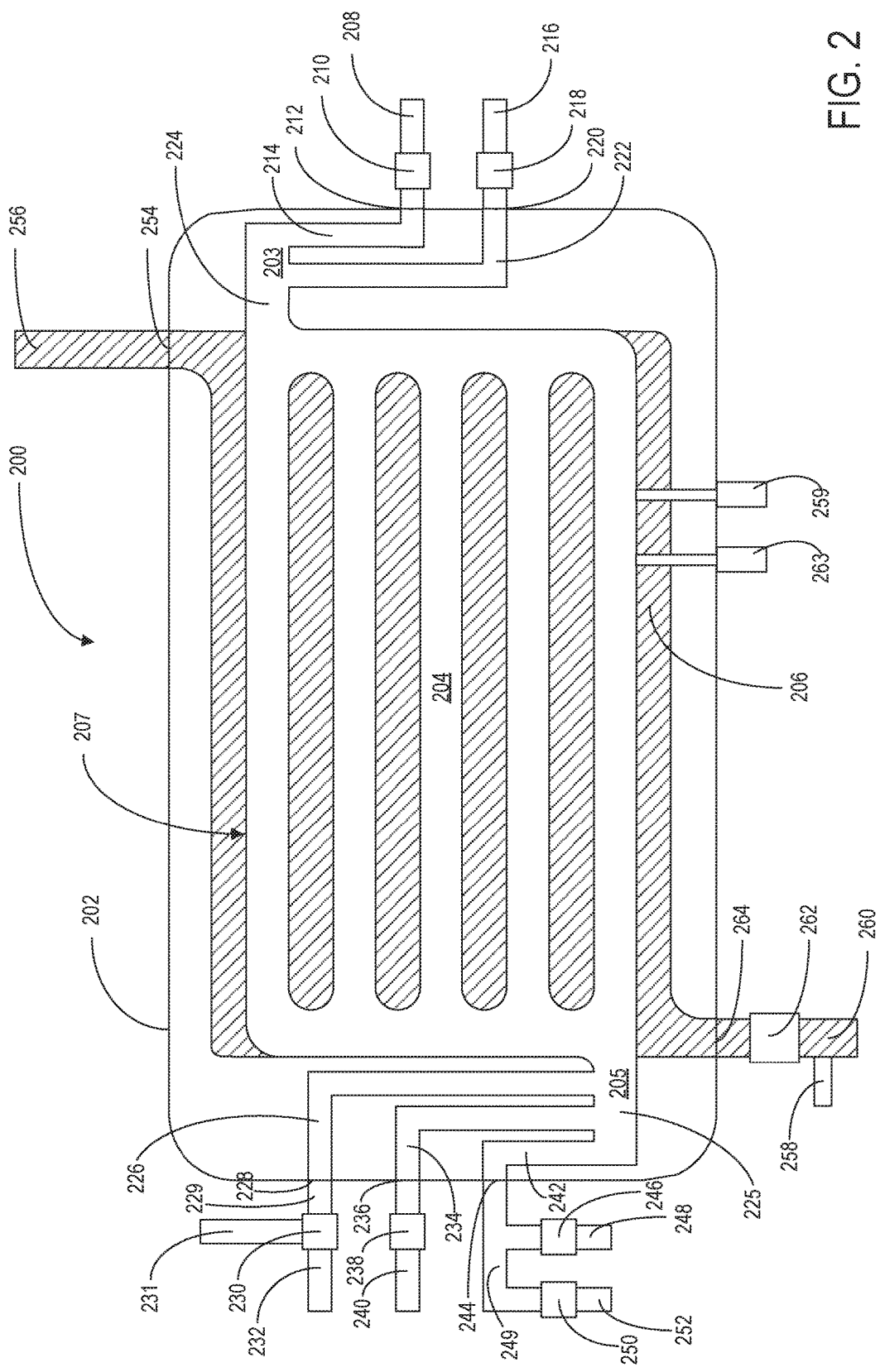
FIG. 2 shows a first embodiment of a heat exchanger including gas and coolant passages internal to the heat exchanger and inlet and outlet ports coupled to the internal gas and coolant passages.

FIG. 2 shows an embodiment of a gas mixing tank reservoir (such as the gas mixing tank reservoir 100 shown in FIG. 1, which may also be referred to as a mixing tank, reservoir, or heat exchanger) coupled to an intake system, an exhaust system, and a radiator of an engine system (such as the engine system 166 shown by FIG. 1). The mixing tank 200 shown by FIG. 2 includes a housing 202 and a plurality of internal coolant/gas passages (e.g., internal to the housing 202 of the mixing tank 200). The housing 202 of the embodiment of the mixing tank 200 shown by FIG. 2 is formed such that the shape of the mixing tank 200 is approximately a rectangular parallelepiped. Alternate embodiments may exist in which the mixing tank possesses a different shape (e.g., the housing may be cylindrical, etc.), and/or a different arrangement of surfaces, and/or a different number of surfaces.

Included within the housing 202 of the mixing tank 200 (e.g., internal to the mixing tank 200) is a coolant manifold 206. The coolant manifold 206 includes a plurality of coolant passages internal to the mixing tank 200 (e.g., internal to an interior of the mixing tank 200). Also shown by FIG. 2 is a coolant inlet passage 260 (e.g., such as coolant inlet passage 160 shown by FIG. 1) and a coolant outlet passage 256 (e.g., such as coolant outlet passage 156 shown by FIG. 1). Coolant inlet passage 260 and coolant outlet passage 256 are both external to the mixing tank 200 (e.g., external to an interior of the mixing tank 200). Coolant may flow from coolant inlet passage 260 and into a coolant inlet port 264 (e.g., such as coolant inlet port 164 shown by FIG. 1) of the mixing tank 200. The coolant inlet port 264 includes an aperture (e.g., opening) in the housing 202 of the mixing tank 200 and permits the transfer of coolant from the coolant inlet passage 260 into the coolant manifold 206. In other words, coolant inlet passage 260 is fluidically coupled to the coolant inlet port 264, and the coolant inlet port 264 is fluidically coupled with the coolant manifold 206.

The coolant inlet passage 260 includes a valve 262 (e.g., such as valve 162 shown by FIG. 1) and a temperature sensor 258 (e.g., such as temperature sensor 158 shown by FIG. 1). The valve 262 may be actuated by a controller (e.g., such as controller 169 shown by FIG. 1) to adjust the flow of coolant (e.g., adjust the flow rate or amount of coolant) from the coolant inlet passage 260 to the coolant inlet port 264. The controller (not shown in FIG. 2) may determine the adjustment of the flow of coolant from the coolant inlet passage 260 to the coolant inlet port 264 based at least in part on the temperature of the coolant as measured and/or detected by temperature sensor 258. In this way, flow of coolant to the coolant inlet port 264 may be increased or decreased depending on the temperature of the coolant as determined by temperature sensor 258.

Coolant travels from the coolant inlet passage 260, through the coolant inlet port 264, and into the coolant manifold 206. Coolant flows through the plurality of passages included within the coolant manifold 206, and as the coolant flows through the plurality of passages the coolant transfers thermal energy to and/or from gases contained within gas mixing manifold 204 of the mixing tank 200. In this way, gases within the gas mixing manifold 204 of the mixing tank 200 may increase or decrease in temperature depending on the condition (e.g., temperature) of the coolant flowing through the coolant manifold 206.

The coolant exits the coolant manifold 206 through a coolant outlet port 254 (e.g., such as coolant outlet port 154 shown by FIG. 1). The coolant outlet port 254 includes an aperture (e.g., opening) in the housing 202 of the mixing tank 200 and permits the transfer of coolant from the coolant manifold 206 into the coolant outlet passage 256. In other words, the coolant manifold 206 is fluidically coupled to the coolant outlet port 254, and the coolant outlet port 254 is fluidically coupled to the coolant outlet passage 256.

A radiator (e.g., such as radiator 161 shown by FIG. 1) may route coolant into the coolant inlet passage 260. Additionally, the coolant outlet passage 256 may route coolant into the radiator. The gas mixing tank reservoir 200 includes a gas temperature sensor 263 and a gas pressure sensor 259. Measured and/or estimated values for gas temperature and gas pressure may be determined by the temperature sensor 263 and pressure sensor 259 (respectively) and utilized by a controller (e.g., such as controller 169 shown by FIG. 1) to control the flow of coolant and gases to and from the gas mixing tank reservoir 200 (as described in the discussion of FIGS. 3A-3B and FIGS. 4-5).

According to the arrangement of the coolant manifold 206 and connecting passages described above, a process of coolant circulation between the radiator and the mixing tank 200 may occur. Coolant may be routed from the radiator via coolant inlet passage 260. The flow of coolant from coolant inlet passage 260 into the coolant inlet port 264 of the mixing tank 200 is increased or decreased through the actuation of valve 262 based on coolant temperature measured and/or detected by temperature sensor 258. The coolant entering coolant inlet port 264 then passes through the plurality of passages included within coolant manifold 206, and an exchange of thermal energy may occur between the coolant and the gases in the gas mixing manifold 204 of the mixing tank 200. The coolant then exits the mixing tank 200 via the coolant outlet port 254 and enters the coolant outlet passage 256. The coolant outlet passage 256 directs the coolant back into the radiator.

The coolant circulation process described above may be a continuous process (e.g., magnitude of coolant flow is adjustable within a continuous range), a binary process (e.g., coolant flow is adjustable from on to off, or from off to on), and/or may be selectively configured to perform as a continuous process or a binary process based on engine conditions.

As mentioned above, the mixing tank 200 includes the gas mixing manifold 204 for the storage of gases from an intake system (e.g., such as intake system 170 shown by FIG. 1) and/or an exhaust system (e.g., such as exhaust system 172 shown by FIG. 1). Gases from the intake system and/or exhaust system may mix and converge within a plurality of gas passages 207 included within the gas mixing manifold 204 and internal to the housing 202. Also included within the gas mixing manifold 204 is a gas inlet manifold 203 and a gas outlet manifold 205. The gas inlet manifold 203 includes passages configured to receive gases from the intake system and exhaust system. The gas outlet manifold 205 includes passages configured to discharge gases from the flowing mixing tank 200 into the intake system and/or the exhaust system. The gas mixing manifold 204 is fluidically coupled to a plurality of gas inlet ports of the mixing tank 200 via the gas inlet manifold 203 and a plurality of gas outlet ports of the mixing tank 200 via the gas outlet manifold 205 to permit the transfers of gases to and/or from the mixing tank 200.

A boost air passage 208 (e.g., such as boost air passage 108 shown by FIG. 1) is coupled between the mixing tank 200 and an intake manifold of an engine (e.g., such as intake manifold 176 shown by FIG. 1). The boost air passage 208 is external to an interior of the mixing tank 200. The boost air passage 208 is fluidically coupled to a boost air port 212 (e.g., such as boost air port 112 shown by FIG. 1) of the mixing tank 200, and the flow of gases through boost air passage 208 towards boost air port 212 is adjustable by valve 210 (e.g., such as valve 110 shown by FIG. 1). The valve 210 may be actuated by a controller (e.g., such as the controller 169 shown by FIG. 1) based on engine operating conditions.

The boost air port 212 is fluidically coupled to an internal boost air passage 214 of the mixing tank 200. The internal boost air passage 214 is internal to an interior of the mixing tank 200. The boost air port 212 includes an aperture (e.g., an opening) within the housing 202 of the mixing tank 200 and permits the transfer of intake gases from the boost air passage 208 into the internal boost air passage 214.

An exhaust inlet passage 216 (e.g., such as exhaust inlet passage 116 shown by FIG. 1) is coupled between the mixing tank 200 and an exhaust manifold of an engine (e.g., such as exhaust manifold 178 shown by FIG. 1). The exhaust inlet passage 216 is external to an interior of the mixing tank 200. The exhaust inlet passage 216 is fluidically coupled to an exhaust inlet port 220 (e.g., such as exhaust inlet port 120 shown by FIG. 1) of the mixing tank 200, and the flow of gases through exhaust inlet passage 216 towards the exhaust inlet port 220 is adjustable by valve 218 (e.g., such as valve 118 shown by FIG. 1).

The exhaust inlet port 220 is fluidically coupled to an internal exhaust inlet passage 222 of the mixing tank 200. The internal exhaust inlet passage 222 is internal to an interior of the mixing tank 200. The exhaust inlet port 220 includes an aperture (e.g., an opening) within the housing 202 of the mixing tank 200 and permits the transfer of exhaust gases from the exhaust inlet passage 216 into the internal exhaust inlet passage 222.

Internal exhaust inlet passage 222 and internal boost air passage 214 merge within an interior of the mixing tank 200 and form an internal intake passage 224. The internal intake passage 224 may receive gases from the intake manifold via internal boost air passage 214, from the exhaust manifold via internal exhaust inlet passage 222, or from both the intake manifold and the exhaust manifold (via the respective passages described above). The internal intake passage 224 is fluidically coupled to the plurality of gas passages within the gas mixing manifold 204. Gases from both the intake manifold and the exhaust manifold may mix and converge within the internal intake passage 224 and the plurality of passages within the gas mixing manifold 204.

The plurality of passages within the gas mixing manifold 204 are routed to an internal outlet passage 225. The internal outlet passage 225 is internal to an interior of the mixing tank 200. The internal outlet passage 225 is coupled to a plurality of gas outlet passages within an interior of the mixing tank 200 and serves as a connection for transferring gases from the gas mixing manifold 204 to the gas outlet passages. The embodiment of the mixing tank 200 shown by FIG. 2 includes three gas outlet passages internal to an interior of the mixing tank (e.g., first internal gas outlet passage 242, second internal gas outlet passage 234, and third internal gas outlet passage 226). Other embodiments of the mixing tank may include a different number and/or arrangement of gas outlet passages.

The first internal gas outlet passage 242 is coupled between the internal outlet passage 225 and a first gas outlet port 244 (e.g., such as first gas outlet port 144 shown by FIG. 1). The first gas outlet port 244 is fluidically coupled to a first external split passage 249 (e.g., such as first external split passage 149 shown by FIG. 1). The first external split passage 249 is external to an interior of the mixing tank 200. The first gas outlet port 244 includes an aperture (e.g., an opening) within the housing 202 of the mixing tank 200 and permits the transfer of gases from the first internal gas outlet passage 242 into the first external split passage 249.

The first external split passage 249 is fluidically coupled to a surge control passage 252 (e.g., such as surge control passage 152 shown by FIG. 1) and a low-pressure exhaust-gas recirculation passage 248 (e.g., such as low-pressure exhaust-gas recirculation passage 148 shown by FIG. 1). A valve 250 (e.g., such as valve 150 shown by FIG. 1) is included within the surge control passage 252, and a valve 246 (e.g., such as valve 146 shown by FIG. 1) is included within the low-pressure exhaust-gas recirculation passage 248 (which may herein be referred to as LP EGR passage 248). The valve 250 and the valve 246 may be actuated by a controller (e.g., controller 169 shown by FIG. 1) to allow gases to flow from the first external split passage 249 into one or both of the surge control passage 252 and the LP EGR passage 248.

The second internal gas outlet passage 234 is coupled between the internal outlet passage 225 and a second gas outlet port 236 (e.g., such as second gas outlet port 136 shown by FIG. 1). The second gas outlet port 236 is fluidically coupled to a high-pressure exhaust-gas recirculation passage 240 (e.g., such as high-pressure exhaust-gas recirculation passage 140 shown by FIG. 1). The high-pressure exhaust-gas recirculation passage 240 (which may herein be referred to as HP EGR passage 240) is external to an interior of the mixing tank 200. The second gas outlet port 236 includes an aperture (e.g., an opening) within the housing 202 of the mixing tank 200 and permits the transfer of gases from the second internal gas outlet passage 234 into the HP EGR passage 240. A valve 238 (e.g., such as valve 138 shown by FIG. 1) is included within the HP EGR passage 240. The valve 238 may be actuated by a controller (e.g., controller 169 shown by FIG. 1) to allow gases to flow from the second internal gas outlet passage 234 into the HP EGR passage 240.

The third internal gas outlet passage 226 is coupled between the internal outlet passage 225 and a third gas outlet port 228 (e.g., such as third gas outlet port 128 shown by FIG. 1). The third gas outlet port 228 is fluidically coupled to a second external split passage 229 (e.g., such as second external split passage 129 shown by FIG. 1). The second external split passage 229 is external to an interior of the mixing tank 200. The third gas outlet port 228 includes an aperture (e.g., an opening) within the housing 202 of the mixing tank 200 and permits the transfer of gases from the third internal gas outlet passage 226 into the second external split passage 229.

The second external split passage 229 is fluidically coupled to a first secondary air injection passage 232 (e.g., such as first secondary air injection passage 132 shown by FIG. 1) and a second secondary air injection passage 231 (e.g., such as second secondary air injection passage 131 shown by FIG. 1). A three-way valve 230 (e.g., such as three-way valve 130 shown by FIG. 1) is fluidically coupled to the second external split passage 229, the first secondary air injection passage 232 (which may herein be referred to as first SAI passage 232), and the second secondary air injection passage 231 (which may herein be referred to as second SAI passage 231). The three-way valve 230 may be actuated by a controller (e.g., controller 169 shown by FIG. 1) to allow gases to flow from the second external split passage 229 into one or both of the first SAI passage 232 and the second SAI passage 231.

In this way, gases may flow from the gas mixing manifold 204 into the internal outlet passage 225. The gases flowing into the internal outlet passage 225 may then be selectively routed to the first internal gas outlet passage 242 via the actuation of valve 250 and/or valve 246, the second internal gas outlet passage 234 via the actuation of valve 238, and/or the third internal gas outlet passage 226 via the actuation of the three-way valve 230.

Gases routed through the first internal gas outlet passage 242 flow through the first gas outlet port 244 and into the first external split passage 249. The gases flowing through first external split passage 249 may be selectively diverted to surge control passage 252 by actuation of valve 250, to LP EGR passage 248 by actuation of valve 246, or to both surge control passage 252 and LP EGR passage 248 by actuation of valve 250 and valve 246 respectively.

Gases routed through the second internal gas outlet passage 234 flow through the second gas outlet port 236 and into the HP EGR passage 240. The flow of the gas into the HP EGR passage 240 is controlled by actuation of the valve 238.

Gases routed through the third internal gas outlet passage 226 flow through the third gas outlet port 228 and into the second external split passage 229. The gases flowing through second external split passage 229 may be selectively diverted to first SAI passage 232 and/or second SAI passage 231 by actuation of three-way valve 230.

As the gases flow through the gas mixing manifold 204 towards the internal outlet passage 225, the gases may experience an increase or decrease in thermal energy due to the proximity of the coolant manifold 206 with the gas mixing manifold 204. The plurality of passages within the coolant manifold 206 are not in fluidic communication with the plurality of passages within the gas mixing manifold 204. In other words, no coolant is permitted to enter the passages of the gas mixing manifold 204, and no exhaust and/or intake gases are permitted to enter the passages of the coolant manifold 206. However, the passages of the coolant manifold 206 may be separated from the passages of the gas mixing manifold 204 by a thermally conductive material (e.g., metal) so that thermal energy is allowed to transfer from one manifold to the other.

In this way, if the temperature of the coolant within the coolant manifold 206 is lower than the temperature of the gases within the gas mixing manifold 204, thermal energy may transfer from the gases in the gas mixing manifold 204 to the coolant within the coolant manifold 206 via the thermally conductive material separating the passages of the manifolds. Similarly, if the temperature of the coolant within the coolant manifold 206 is higher than the temperature of the gases within the gas mixing manifold 204, thermal energy may transfer from the coolant in the coolant manifold 206 to the gases within the gas mixing manifold 204 via the thermally conductive material separating the passages of the manifolds.

The actuation of valve 250, valve 246, valve 238, and three-way valve 230 may be controlled at least in part by the temperature of the coolant and/or the temperature of the gases as described in the discussion of FIGS. 3A-3B below.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3A:
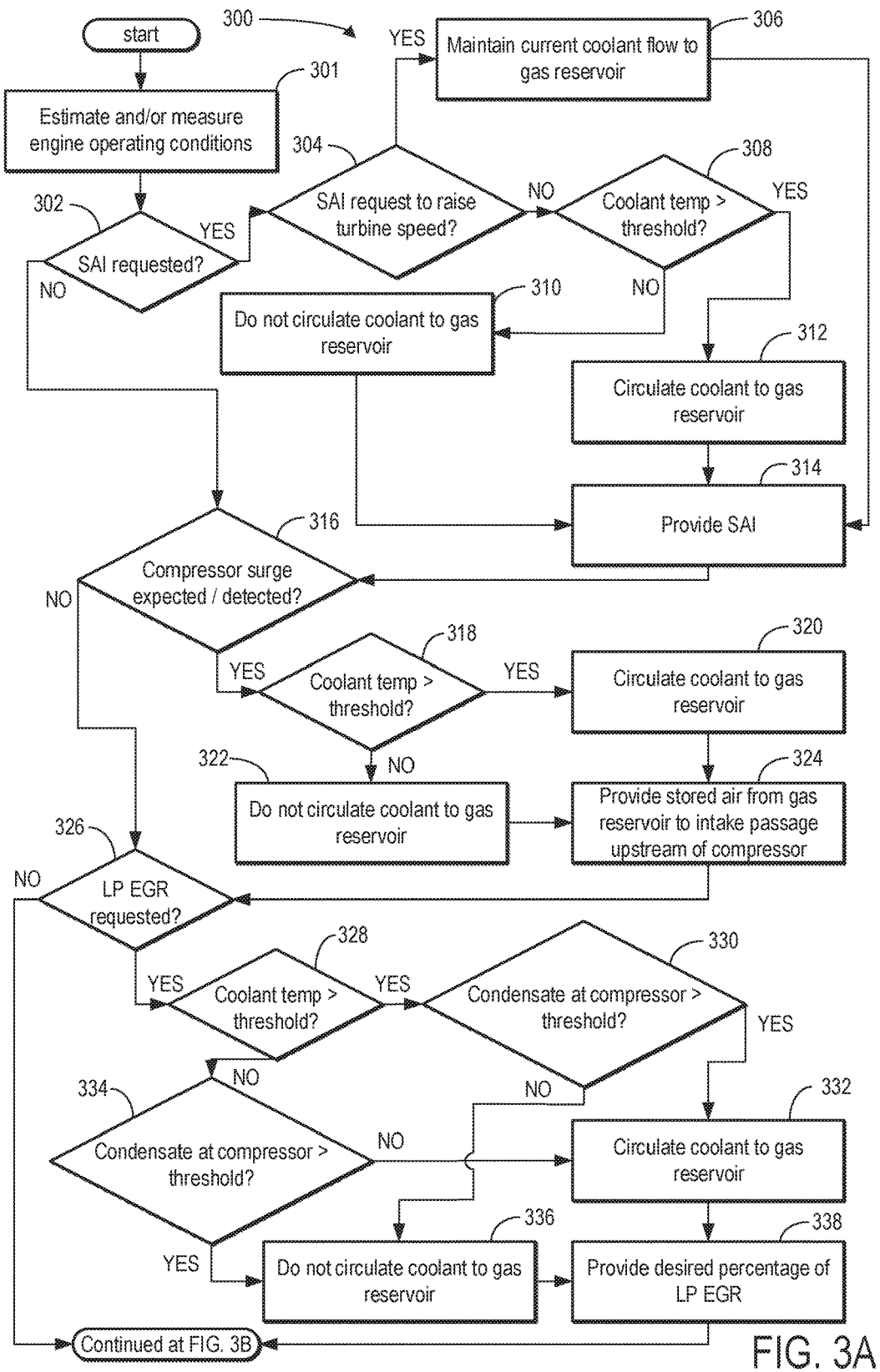
FIGS. 3A-3B illustrate an example method for adjusting a flow of coolant to a heat exchanger based on engine operating conditions.
Figure 3B:
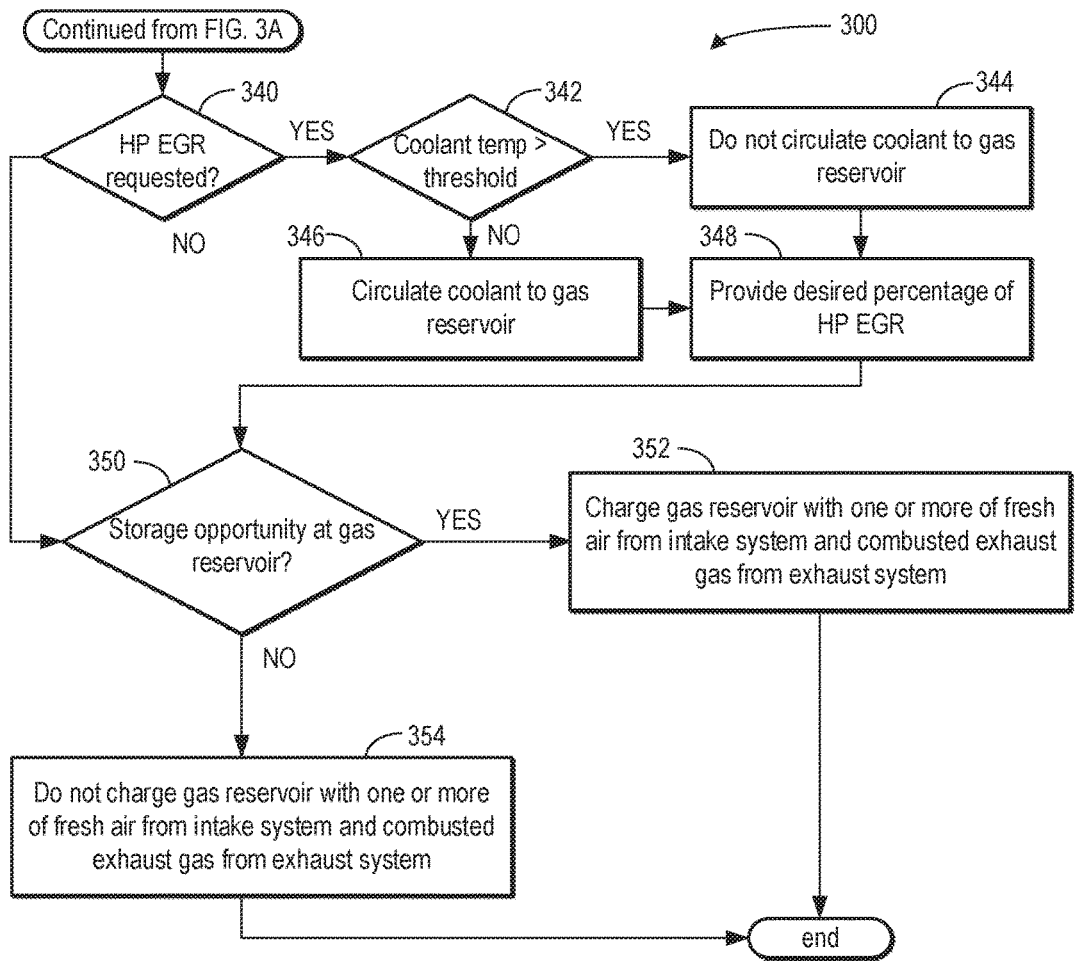

FIGS. 3A-3B show a method for adjusting a flow of coolant to a gas mixing reservoir (e.g., such as gas mixing tank reservoir 100 shown by FIG. 1, or gas mixing tank reservoir 200 shown by FIG. 2) based on a request to discharge gas contents from the reservoir and a temperature of the coolant entering the reservoir. The flow of coolant to the gas mixing tank reservoir 200 may be adjusted in order to adjust the temperature of the gases contained within (and/or entering) the gas mixing tank reservoir. The temperature of the gases contained within the gas mixing tank reservoir may be adjusted (via adjusting the flow of coolant through the gas mixing tank reservoir) to a desired temperature based on an indicated location for injecting the gases from the reservoir to one or more of the intake system and exhaust system. In other words, the temperature of the gases within the gas mixing tank reservoir may be adjusted to a desired temperature by increasing or decreasing the flow of coolant to the gas mixing tank reservoir, and the desired temperature of the gases may be based on an intended injection location for the gases in one or both of the intake system and exhaust system. In one example, the temperature of the coolant entering the gas mixing tank reservoir may be a measured or estimated coolant temperature based on an output of a temperature sensor (e.g., such as the temperature sensor 258 shown by FIG. 2).

Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system (e.g., such as valves 162, 146, 150, 110, 130, and 118) to adjust engine operation, according to the methods described below.

Turning first to FIG. 3A, method 300 includes estimating and/or measuring engine operating conditions at 301 based on one or more outputs of various sensors in the engine system and/or operating conditions of the engine system (e.g., such as various temperature sensors, pressure sensors, etc., as described above). Engine operating conditions may include engine speed and load, EGR flow rate (LP and/or HP), mass air flow rate, turbine speed, compressor inlet pressure, emissions control device temperature, coolant flow rate, etc. The operating conditions may also include the operating conditions of the gas mixing tank reservoir (e.g., temperature of coolant, temperature of stored gases, gas pressure, amount of stored gas, percentage of exhaust gas mixed with intake air, etc.).

At 302, the method includes determining if secondary air injection is requested. For example, based on the measured and/or inferred engine operating conditions determined at 301, the controller may determine that providing secondary air injection (SAI) would be advantageous to engine operation (e.g., for reduced emissions, turbine speed increase, etc.). In one example, SAI may be requested in response to one or more of cold start conditions, an engine temperature below a threshold temperature, and a catalyst temperature below a catalyst light off temperature. In another example, SAI may be requested in response to a concentration of unburned hydrocarbons in the exhaust (e.g., based on an exhaust air/fuel ratio below a threshold air/fuel ratio indicating increased unburned hydrocarbons in the exhaust gas). In yet another example, SAI may be requested in response to a turbine speed of a turbine being below a desired turbine speed (e.g., due to an increase in torque demand such as a tip-in).

The method continues to 304 if SAI is requested by the controller. At 304, the method includes determining if the SAI request is based on a request to increase the turbine speed of the turbine (e.g., based on turbine speed being below a desired turbine speed). As an example, the rotational speed of the turbine may be below a desired speed due to a sudden increase in engine torque demand (e.g., during a throttle tip-in event). As a result, an increase in turbine speed may be desired to increase the output of the compressor of the turbocharger. In this example, SAI may be provided to increase the mass flow rate of gases passing through the exhaust manifold, thereby increasing the flow rate through the turbine and increasing turbine rotational speed.

If the SAI request is in response to a low turbine speed (e.g., turbine speed below a desired turbine speed which may be based on torque demand), as determined at 304, the method continues to 306 where the method includes maintaining the coolant flow through the gas mixing tank reservoir at the current level (e.g., not adjusting the coolant flow). As an example, if no coolant is flowing through a coolant manifold (e.g., such as coolant manifold 206 shown by FIG. 2) of the gas mixing tank reservoir when the controller determines that an SAI request is due to low turbine speed, the gas mixing tank reservoir continues to flow no coolant through the coolant manifold. As a second example, if coolant is flowing through the coolant manifold of the gas mixing tank reservoir at a determined rate (as determined by one or more sensors) when the controller determines that an SAI request is due to low turbine speed, the gas mixing tank reservoir continues to flow coolant through the coolant manifold at the same rate.

The method continues from 306 at 314 where the method includes providing SAI to the exhaust manifold in order to increase the speed of the turbine. In an example, SAI to the exhaust manifold may be delayed until an emissions control device reaches operating temperature, as described further in the discussion of FIG. 4 below.

Returning to 304, if the SAI request is not a request to raise turbine speed, the method continues to 308. One alternative function for SAI is to increase the temperature of one or more emission control devices if it is determined that the devices are below operational temperature. Another alternative function for SAI is to promote combustion of excess hydrocarbons within exhaust gases. The presence of excess hydrocarbons may be based on a measurement of the air-to-fuel ratio of the exhaust gas (as measured by a sensor in the exhaust system). The method at 308 includes determining if a temperature of the coolant at the gas mixing tank reservoir (e.g., upstream of and flowing to the gas mixing tank reservoir) is greater than a threshold coolant temperature. The threshold coolant temperature may be determined by the controller in response to the engine operating conditions measured at 301 and the confirmation of an SAI request at 302. In one example, the threshold coolant temperature may be based on the temperature of the exhaust gas exiting the exhaust manifold and/or the temperature of the intake air entering (or contained within) the gas mixing tank reservoir. Said another way, the threshold temperature may be based on a temperature of gases stored within the gas mixing tank reservoir.

If the determined coolant temperature is not greater than the threshold coolant temperature as determined at 308, the method continues to 310 where the method includes not circulating coolant to (or decreasing the flow of coolant to) the gas mixing tank reservoir. For example, if coolant is currently flowing to the gas mixing tank reservoir, the method at 310 may include stopping (or decreasing) coolant flow to the mixing tank reservoir. However, if coolant is currently not flowing to the gas mixing tank reservoir before 310, the method at 310 may include maintaining no coolant flow to the gas mixing tank reservoir. The flow of coolant to the gas mixing tank reservoir may be stopped (or decreased) by actuation of a valve (e.g., such as valve 262 shown by FIG. 2) in a coolant passage upstream of the gas mixing tank reservoir, as described in the discussion of FIG. 2. In another example, the method at 310 may include decreasing the flow of coolant (e.g., via decreasing an amount of opening of the valve) to the gas mixing tank reservoir. In method 300, wherever the method includes circulating or not circulating coolant to the gas mixing tank reservoir, the method may instead including increasing the flow of coolant (from a current level delivered to the gas mixing tank reservoir) or decreasing the flow of coolant (from the current level). In this way, these methods may include adjusting the coolant valve mentioned above into a plurality of positions between fully open (to flow coolant at a maximum flow rate) or a fully closed (to stop coolant flow altogether) position.

The method then continues to 314 where the method includes providing the requested SAI via the gas mixing tank reservoir. In one example, the method at 314 may include delaying providing the requested SAI until the gas temperature of gases within the gas mixing tank reservoir are at a desired injection temperature for the SAI request. For example, SAI may be delayed until the temperature of gases within the gas mixing tank reservoir increases (e.g., due to decreased coolant flow) to a level desired for SAI.

Returning to 308, if the determined coolant temperature is greater than the threshold temperature, the method continues to 312 where the method includes circulating coolant through the gas mixing tank reservoir (or increasing the flow of coolant to the gas mixing tank reservoir). As explained above, the threshold temperature may be based on the temperature of gases within the mixing tank reservoir and/or the temperature of the intake air entering (or contained within) the gas mixing tank reservoir. If the temperature of the coolant is higher than the threshold temperature (e.g., the temperature of the intake air), coolant is circulated through the gas mixing tank reservoir in order to increase the temperature of the intake air within the reservoir. The increase temperature of the intake air allows for a more efficient combustion of unburned hydrocarbons and an expedited increase in emission control device temperature, as described above. The method then continues to 314 to provide the requested SAI. In one example, the method at 314 may include delaying providing the requested SAI until the gas temperature of gases within the gas mixing tank reservoir are at a desired injection temperature for the SAI request. For example, SAI may be delayed until the temperature of gases within the gas mixing tank reservoir increase (e.g., due to increased coolant flow) to a level desired for SAI. The method at 314 then includes delivering the requested SAI when the gas temperature is at the desired injection temperature.

If SAI is not requested at 302, or if SAI is provided at 314, the method continues to 316 where the method includes determining if compressor surge is expected and/or detected. The determination of the condition of the compressor may be based a difference in pressure between the compressor inlet and outlet, the intake air flow rate through the compressor, etc. The pressure and flow rate at the inlet and outlet of the compressor may be measured by one or more sensors at the compressor and/or intake manifold (e.g., such as manifold air pressure sensor 175). The compressor and/or intake manifold may also include one or more temperature sensors, flow sensors, etc.

If compressor surge is expected and/or detected based on the outputs of the various sensors (as described above) and/or additional engine operating conditions, the method continues to 318. At 318, the method includes determining if the temperature of the coolant entering (or flowing to) the gas mixing tank reservoir is greater than a threshold coolant temperature. The threshold coolant temperature may be determined by the controller based on the engine operating conditions determined at 301 and the expectation and/or detection of compressor surge at 316. In one example, the threshold temperature may be based on the temperature of the gases contained within the gas mixing tank reservoir.

If the coolant temperature is not greater than the threshold temperature at 318, the method continues to 322 where the method includes not circulating coolant to and through the gas mixing tank reservoir (or alternatively, as explained above, decreasing the flow of coolant to the gas mixing tank reservoir). For example, if the threshold temperature is based on the temperature of the gases contained within the gas mixing tank reservoir and the coolant temperature is less than the gas temperature within the reservoir, coolant may not be circulated so that the temperature of the gases within the reservoir do not decrease further. Instead, the temperature of the gases within the gas mixing tank reservoir may increase. The higher temperature of the gases within the reservoir provides a greater increase in pressure at the compressor inlet when the gases are discharged into the compressor inlet. The method then continues to 324 where the stored charge within the gas mixing tank reservoir is discharged into an intake passage, upstream of the compressor inlet, to increase the pressure and/or flow at the compressor inlet. In this way, providing gasses to the compressor inlet from the gas mixing tank reservoir may reduce compressor surge. In one example, the method at 324 may include delaying the discharge upstream of the compressor inlet until the gas temperature of gases within the gas mixing tank reservoir are at a desired injection temperature for the discharge request. For example, the discharge may be delayed until the temperature of gases within the gas mixing tank reservoir increase (e.g., due to decreased coolant flow) to a level desired for discharge upstream of the compressor inlet to reduce compressor surge. The method at 324 then includes delivering the requested discharge when the gas temperature is at the desired injection temperature.

If the coolant temperature is determined to be above the threshold temperature at 318, the method instead continues to 320 where the method includes circulating coolant (or increasing coolant flow) to the gas mixing tank reservoir. For example, if the threshold temperature is based on the temperature of the gases contained within the gas mixing tank reservoir, coolant is circulated so that the temperature of the gases within the reservoir increases. The higher temperature of the gases within the reservoir provides a greater increase in pressure at the compressor inlet when the gases are discharged into the compressor inlet. The method then continues to 324 where the stored charge within the gas mixing tank reservoir is discharged upstream of the compressor inlet to increase the pressure and/or flow at the compressor inlet. In one example, the method at 324 may include delaying the discharge upstream of the compressor inlet until the gas temperature of gases within the gas mixing tank reservoir are at a desired injection temperature for the discharge request. For example, the discharge may be delayed until the temperature of gases within the gas mixing tank reservoir increase (e.g., due to increased coolant flow) to a level desired for discharge upstream of the compressor inlet to reduce compressor surge. The method at 324 then includes delivering the requested discharge when the gas temperature is at the desired injection temperature.

If compressor surge is not expected and/or detected at 316, or if stored air is discharged upstream of the compressor at 324, the method continues to 326. At 326, the method includes determining if low-pressure exhaust-gas recirculation (LP EGR) is requested. In one example, the controller may determine that LP EGR is requested based on one or more engine operating conditions. The method at 324 may further include determining if an increase in LP EGR is requested and/or determining a desired percentage of LP EGR that is requested. The determination at 326 may be in response to one or more of operating conditions of the gas mixing tank reservoir (e.g., amount of charge stored), conditions at the compressor (e.g., condensate forming conditions at the compressor inlet), etc.

If LP EGR is requested at 326, the method continues to 328 where the method includes determining if the temperature of the coolant entering the gas mixing tank reservoir is greater than a threshold coolant temperature. The threshold coolant temperature may be determined by the controller in response to the engine operating conditions measured at 301 and the operating conditions of the gas mixing tank reservoir (e.g., temperature of the gases contained within the reservoir, flow of gases through the reservoir, etc.). In one example, the threshold temperature may be based on the temperature of the gases contained within the gas mixing tank reservoir.

If the coolant temperature is determined to be above the threshold temperature at 328, the method continues to 330 where the method includes determining whether condensate formation (e.g., the amount of condensate) at the compressor inlet is greater than a condensate threshold. The condensate threshold may be based on an amount of condensate that may result in degradation of the compressor. For example, condensate at the compressor inlet can cause corrosion and degradation of the compressor wheel when the amount of condensate is above a threshold value. The amount of condensate at the compressor inlet may change based on a variety of conditions such as ambient temperature of the atmosphere (e.g., temperature of the intake air), the humidity of the intake air, the temperature of any EGR gases injected upstream of the compressor, etc.

If the amount of condensate at the compressor inlet determined at 330 is below the condensate threshold, the method continues to 336 where the method includes not circulating coolant (or decreasing the flow rate or amount of coolant flowing) to the gas mixing tank reservoir. As an example, the condensate at the compressor inlet may be at an acceptable level for continued operation of the compressor. Additionally, the temperature of the coolant at the gas mixing tank reservoir is above the threshold temperature based on the temperature of the gases contained within the mixing tank. In response to these conditions, the controller does not circulate coolant through the mixing tank in order to reduce the thermal energy transferred to the gases stored within the tank from the coolant.

The method then continues to 338, where the method includes providing the desired percentage of EGR (e.g., desired amount of EGR), from the gas mixing tank reservoir, upstream of the compressor in the intake system to provide LP EGR. The percentage of LP EGR injected into the intake system may be determined in part by the ratio of exhaust gas to intake gas within the gas mixing tank reservoir. By reducing the circulation of coolant within the mixing tank at 336 prior to the discharge of the gases at 338, the gases may be injected at a lower temperature than if coolant had been circulated.

Returning to 330, if the amount of condensate at the compressor is determined to be above the condensate threshold, the method continues to 332 where the method includes circulating coolant through the gas mixing tank reservoir (or increasing the coolant flow to the gas mixing tank reservoir). Circulating coolant through the gas mixing tank reservoir may raise the temperature of the gases stored within the tank prior to injection into the intake system upstream of the compressor.

The method then continues to 338, where the method includes providing the desired percentage of LP EGR upstream of the compressor in the intake system from the gas tanking mixing reservoir. The amount of gases injected into the intake system from the reservoir may be determined in part by the ratio of exhaust gas to intake gas within the gas mixing tank reservoir and the desired percentage of LP EGR. By allowing the circulation of coolant within the mixing tank at 332 prior to the discharge of the gases at 338, the gases may be injected at a higher temperature than if coolant had not been circulated. The higher temperature gases may reduce the formation of condensation at the compressor inlet. In one example, the method at 338 may include delaying providing the requested LP EGR injection until the gas temperature of gases within the gas mixing tank reservoir are at a desired injection temperature for the LP EGR request. For example, LP EGR injection may be delayed until the temperature of gases within the gas mixing tank reservoir increase (e.g., due to increased coolant flow) to a level desired for LP EGR. The method at 338 then includes delivering the requested LP EGR when the gas temperature is at the desired injection temperature.

Returning to 328, if the coolant temperature is determined to be below the threshold temperature, the method continues to 334 where the method includes determining whether the amount of condensate at the compressor inlet is greater than a condensate threshold. The condensate threshold may be based on an acceptable level of condensate for compressor operation, as described in the discussion of 330 above.

If the amount of condensate at the compressor inlet determined at 334 is below the condensate threshold, the method continues to 332 where the method includes circulating coolant (or increases the flow rate or amount of coolant flowing) to the gas mixing tank reservoir. As an example, the condensate at the compressor inlet may be at an acceptable level for continued operation of the compressor. Additionally, the temperature of the coolant at the gas mixing tank reservoir is below the threshold temperature based on the temperature of the gases contained within the mixing tank. In response to these conditions, the controller circulates coolant through the mixing tank in order to reduce the temperature and increase the density of the gases contained within the gas mixing tank reservoir.

The method then continues to 338, where the method includes providing the desired percentage of EGR (e.g., desired amount of EGR) from the gas mixing tank reservoir, upstream of the compressor in the intake system to provide LP EGR. The percentage of LP EGR injected into the intake system may be determined in part by the ratio of exhaust gas to intake gas within the gas mixing tank reservoir. By increasing the circulation of coolant within the mixing tank at 332 prior to the discharge of the gases at 338, the gases may be injected at a lower temperature than if coolant had not been circulated.

Returning to 334, if the amount of condensate at the compressor inlet determined at 334 is above the condensate threshold, the method continues to 336 where the method includes not circulating coolant to the gas mixing tank reservoir (or decreasing the coolant flow to the gas mixing tank reservoir). Not circulating coolant through the gas mixing tank reservoir may increase the temperature of the gases contained within the gas mixing tank reservoir prior to injection into the intake system upstream of the compressor.

The method then continues to 338, where the method includes providing the desired percentage of LP EGR upstream of the compressor into the intake system from the gas mixing tank reservoir. The amount of gases injected into the intake system from the reservoir may be determined in part by the ratio of exhaust gas to intake gas within the gas mixing tank reservoir and the desired percentage of LP EGR. By reducing the circulation of coolant within the mixing tank at 336 prior to the discharge of the gases at 338, the gases may be injected at a higher temperature than if coolant circulation had not been reduced. The higher temperature gases may reduce the formation of condensation at the compressor inlet. In one example, the method at 338 may include delaying providing the requested LP EGR injection until the gas temperature of gases within the gas mixing tank reservoir are at a desired injection temperature for the LP EGR request. For example, LP EGR injection may be delayed until the temperature of gases within the gas mixing tank reservoir increase (e.g., due to increased coolant flow) to a level desired for LP EGR. The method at 338 then includes delivering the requested LP EGR when the gas temperature is at the desired injection temperature.

If LP EGR is not requested at 326, or if the determined percentage of LP EGR is provided at 338, the method 300 continues to 340 shown by FIG. 3B, where the method includes determining if high-pressure exhaust-gas recirculation (HP EGR) is requested in response to the estimated and/or inferred conditions at 301. The determination at 340 may be partly in response to operating conditions of the gas mixing tank reservoir (e.g., amount of charge stored).

If HP EGR is requested at 340, the method continues to 342 where the method includes determining if the temperature of the coolant entering the gas mixing tank reservoir is greater than a threshold coolant temperature. The threshold coolant temperature may be determined by the controller in response to the engine operating conditions measured at 301 and the operating conditions of the gas mixing tank reservoir (e.g., temperature of the gases contained within the reservoir, flow of gases through the reservoir, etc.). In one example, the threshold temperature may be based on the temperature of the gases contained within the gas mixing tank reservoir.

If the determined coolant temperature is not greater than the threshold temperature at as determined at 342, the method continues to 346 where the method includes circulating coolant (or increasing the flow rate or amount of coolant flowing) to the gas mixing tank reservoir. As explained above, the threshold temperature may be based on the temperature of the gases contained within the gas mixing tank reservoir and/or the temperature of intake gases entering (or contained within) the gas mixing tank reservoir. If the temperature of the coolant is lower than the threshold temperature, coolant is circulated so that the temperature of the gases within the reservoir decreases. The lower temperature of the gases enables an increased amount of charge to be stored within the reservoir at a pressure appropriate for discharging downstream of the compressor. The coolant may also be circulated in order to reduce the temperature of hot exhaust gases entering the gas mixing tank reservoir in order to decrease degradation of the mixing tank and/or the intake system.

The method then continues to 348 where the method includes discharging the charge within the gas mixing tank reservoir downstream of the compressor outlet in order to provide the desired amount of HP EGR gases to the intake system. In one example, the method at 348 may include delaying providing the requested HP EGR injection until the gas temperature of gases within the gas mixing tank reservoir are at a desired injection temperature for the HP EGR request. For example, HP EGR injection may be delayed until the temperature of gases within the gas mixing tank reservoir decrease (e.g., due to increased coolant flow) to a level desired for HP EGR. The method at 338 then includes delivering the requested HP EGR when the gas temperature is at the desired injection temperature.

Returning to 342, if the determined coolant temperature is greater than a threshold temperature, the method continues to 344 where the method includes not circulating coolant to the gas mixing tank reservoir (or the flow of coolant to the gas mixing tank reservoir is decreased). As explained above, the threshold temperature may be based on the temperature of the gases contained within the gas mixing tank reservoir and/or the temperature of the intake air entering (or contained within) the gas mixing tank reservoir. If the temperature of the coolant is greater than the threshold temperature, coolant is not circulated so that the temperature of the gases within the reservoir does not increase. The lower temperature of the gases enables an increased amount of charge to be stored within the reservoir at a pressure appropriate for discharging downstream of the compressor, and may reduce degradation of system components, as described above.

The method then continues to 348 where the method includes discharging the charge within the gas mixing tank reservoir downstream of the compressor outlet in order to provide the desired amount of HP EGR gases to the intake system. In one example, the method at 348 may include delaying providing the requested HP EGR injection until the gas temperature of gases within the gas mixing tank reservoir are at a desired injection temperature for the HP EGR request. For example, HP EGR injection may be delayed until the temperature of gases within the gas mixing tank reservoir decrease (e.g., due to decreased coolant flow) to a level desired for HP EGR. The method at 338 then includes delivering the requested HP EGR when the gas temperature is at the desired injection temperature.

If HP EGR is not requested at 340, or if the determined percentage of HP EGR is provided at 348, the method continues to 350 where the method includes determining if there is an opportunity to store charge from the intake system and/or the exhaust system at the gas mixing tank reservoir. The determination at 350 may be partly in response to operating conditions of the gas mixing tank reservoir (e.g., amount of charge stored). In one example, reservoir charging conditions may be present if the gas mixing tank reservoir is sufficiently empty (e.g., gas mixing tank reservoir pressure being lower than a threshold). In another example, a storage opportunity may include a decrease in charge demand as described by the method 300 (e.g., a decrease in demand for SAI, compressor surge reduction, LP EGR, and/or HP EGR). As another example, reservoir charging conditions may be present if the engine is operating at a sufficiently high boost level (e.g., operating with boost at higher than a threshold level). As yet another example, reservoir charging conditions may be confirmed during an engine deceleration fuel shut-off operation. As still another example, reservoir charging conditions may be confirmed during a transient following a tip-out event. A storage opportunity may also include a condition in which one or more discharge requests are activated by the controller, with the potential inflow of gases into the gas mixing tank reservoir from the intake or exhaust systems being greater than the demand for outflow from the mixing tank. In such an example, the gas mixing tank reservoir may accumulate charge while simultaneously discharging a percentage of total charge to one or both of the intake system or the exhaust system. In other words, under some conditions, the gas mixing tank reservoir may be capable of accumulating charge faster than it disperses charge. Such situations can be considered storage opportunities. As such, based on engine operating conditions at the time the charging opportunity is confirmed, it may be determined whether the charge the gas mixing tank reservoir with compressed air from the intake manifold and/or combusted exhaust gas from the exhaust manifold.

Gas mixing tank reservoir conditions may be estimated using one or more sensors coupled to the reservoir, such as pressure, temperature, and air-fuel ratio sensors, as described above with reference to 301. However, in other examples, one or more gas mixing tank reservoir conditions may be inferred or retrieved from a memory of the controller rather than being sensed per se. For example, where the gas mixing tank reservoir was previously charged using air from the intake system, based on compressor conditions, intake air temperature and pressure conditions, as well as EGR demands at the time of charging, a state of the charge in the gas mixing tank reservoir may be inferred. As another example, where the gas mixing tank reservoir was previously charged with combusted exhaust gas from the exhaust manifold, based on engine operating conditions, exhaust conditions, and EGR demands at the time of charging, a state of the charge in the gas mixing tank reservoir may be inferred. Likewise, where the gas mixing tank reservoir was previously discharged to the intake system, based on the duration of discharging as well as boost conditions during the discharging, a state of charge (if any) remaining in the gas mixing tank reservoir may be inferred. In the same way, where the gas mixing tank reservoir was previously discharged to the exhaust manifold, based on the duration of discharging as well as engine conditions during the discharging, a state of charge (if any) remaining in the gas mixing tank reservoir may be inferred.

Based on the estimated conditions, it may be determined if a gas mixing tank reservoir charging opportunity is present. In one example, reservoir charging conditions may be present if the gas mixing tank reservoir is sufficiently empty (e.g., gas mixing tank reservoir pressure being lower than a threshold). As another example, reservoir charging conditions may be present if the engine is operating at a sufficiently high boost level (e.g., operating with boost at higher than a threshold level). As yet another example, reservoir charging conditions may be confirmed during an engine DFSO operation. As still another example, reservoir charging conditions may be confirmed during a transient following a tip-out event. As such, based on engine operating conditions at the time the charging opportunity is confirmed, it may be determined whether the charge the gas mixing tank reservoir with compressed air from the intake system and/or combusted exhaust gas from the exhaust manifold. For example, as elaborated below, the gas mixing tank reservoir may be selectively charged based on engine speed, vehicle speed, manifold pressure, etc. at the time of the charging opportunity.

If at 350 a storage opportunity is not available, the method continues to 354 where the method includes not charging the gas mixing tank reservoir with one or more of fresh air from the intake system and combusted gas from the exhaust system. In other words, the gas mixing tank reservoir is not charged with gases from either the intake system or the exhaust system.

If at 350 a storage opportunity is available, the method continues to 352 where the method includes charging the gas mixing tank reservoir with one or more of fresh air from the intake system and combusted exhaust gas from the exhaust system. In other words, the gas mixing tank reservoir is charged with gases from one or both of the intake system and the exhaust system.

By charging the gas mixing tank reservoir with combusted exhaust gas from the exhaust manifold, exhaust energy may be pre-stored in the reservoir and discharged at a later time to either provide EGR (when discharged into the intake system) or raise exhaust pressure (when discharged into the exhaust manifold). By charging the gas mixing tank reservoir with pressurized intake air from the intake system, boost energy may be pre-stored in the reservoir and discharged at a later time to raise exhaust pressure (when discharged into the exhaust manifold). In particular, turbine energy can be increased by increasing the pre-turbine exhaust pressure. In each case, by storing charge in the gas mixing tank reservoir for use at a later time, boosted engine performance can be increased.

A valve (e.g., such as valve 210 shown by FIG. 2) fluidically coupled to a boost air port (e.g., such as boost air port 212 shown by FIG. 2) of the reservoir may be opened for a duration to charge the reservoir with compressed intake air from the intake system, and/or a valve (e.g., such as valve 218 shown by FIG. 2) fluidically coupled to an exhaust inlet port (e.g., such as exhaust inlet port 220 shown by FIG. 2) of the reservoir may be opened for a duration to charge the reservoir with exhaust gas from the exhaust manifold. A duration of opening of the intake charge valve and/or the exhaust charge valve may be adjusted to adjust the composition of charge stored in the reservoir so as to provide a desired gas mixing tank reservoir charge EGR percentage (or dilution). In one example, the gas mixing tank reservoir may be charged with air and combusted exhaust gas to provide charge of a desired EGR percentage and desired pressure, such that when the pressurized charge is eventually discharged during a subsequent boosted engine operation, high pressure EGR can be enabled.

For example, during a first condition, when a tip-in is predicted at high engine speeds, the gas mixing tank reservoir may be charged with combusted exhaust gases. Herein, the engine may be operating at higher engine speeds with a pedal position near a closed position and with a vehicle speed being higher than a threshold speed but with an exhaust pressure being greater than a threshold pressure. In comparison, during a second condition, when a tip-in is predicted at low engine speeds, the gas mixing tank reservoir may be charged with fresh intake air and combusted exhaust gases, with a ratio of the fresh intake air to combusted exhaust gases adjusted based on a desired gas mixing tank reservoir EGR percentage.

During some conditions, the gas mixing tank reservoir may be charged with a first amount of combusted exhaust gas at a first, lower pressure from the exhaust manifold, upstream of the turbine. This initial charging increases the EGR percentage of the reservoir charge but the stored exhaust gas is at a lower pressure. To further raise the pressure of the stored charge, the gas mixing tank reservoir may be subsequently further charged with a second amount of fresh intake air at a second, higher pressure from the intake system, downstream of the compressor. This later charging slightly decreases the EGR percentage of the reservoir charge but raises the charge pressure. The first and second amounts may be adjusted to provide a desired EGR percentage of the pressurized charge. The stored charge can then be advantageously discharged during selected boosted engine conditions to provide high pressure EGR benefits.

As another example, the gas mixing tank reservoir may be charged with at least some combusted exhaust gases (e.g., with only combusted exhaust gases) during a tip-out at lower engine speeds. In comparison, during a tip-out at higher engine speeds, the controller may charge the gas mixing tank reservoir with at least some compressed intake air from the intake system (e.g., with only compressed intake air). As yet another example, when charging conditions are confirmed during an engine DFSO operation, the reservoir may be charged with uncombusted exhaust gas released from the cylinders having fuel shut-off.

As such, following the charging, gas mixing tank reservoir conditions may be updated in the controller's memory. In one example, gas mixing tank reservoir conditions may be updated using one or more sensors coupled to the reservoir, such as pressure, temperature, and air-fuel ratio sensors. However, in other examples, gas mixing tank reservoir conditions may be inferred and updated in the memory of the controller rather than being sensed per se. For example, where the gas mixing tank reservoir was recently charged using air from the intake system, based on compressor conditions, intake air temperature and pressure conditions, as well as EGR demands at the time of charging, a state of the charge in the gas mixing tank reservoir may be inferred and updated. As another example, where the gas mixing tank reservoir was currently charged with combusted exhaust gas from the exhaust manifold, based on engine operating conditions, exhaust conditions, and EGR demands at the time of charging, a state of the charge in the gas mixing tank reservoir may be inferred and updated.

In one example, the EGR percentage of the gas mixing tank reservoir may be estimated or inferred based on one or more an exhaust air-fuel ratio sensor output, MAF, and a fuel injector pulse-width. The controller may be configured to estimate a volume of gas that was stored in the reservoir based on a gas mixing tank reservoir pressure. The controller may then estimate how much of that volume was air based on MAF changes following discharging of the pressurized charge, and how much of that volume included fuel based on fuel injection adjustments following discharging of the pressurized charge (e.g., based on a fuel injector pulse-width). An air-to-fuel ratio estimated may then be based on the air and fuel estimates. In an alternate example, the estimated air-to-fuel ratio may be based on the output of an intake oxygen sensor. The estimated air-to-fuel ratio may then be compared to a measured air-to-fuel ratio to map an error. The error may then be used to update an EGR percentage estimate of the gas mixing tank reservoir charge. The stored gas mixing tank reservoir conditions may be retrieved by the controller during a subsequent discharging operation. It will be appreciated that in all cases, the charging may be performed during an engine cycle preceding a tip-in event where the pressurized charge is discharged.

In this way, a gas mixing tank reservoir may be selectively charged with one or more of fresh intake air from an intake system and combusted exhaust gas from an exhaust manifold. The charging with fresh intake air and combusted exhaust gas may be performed to enable storing of a gas mixing tank reservoir charge having a selected EGR percentage. Following the selective charging, such as in response to a tip-in, the pressurized charge may be discharged from the gas mixing tank reservoir to the intake system and/or the exhaust manifold, based on engine operating conditions at the time of the tip-in, to thereby reduce turbo lag and increase boosted engine performance.

Figure 4:
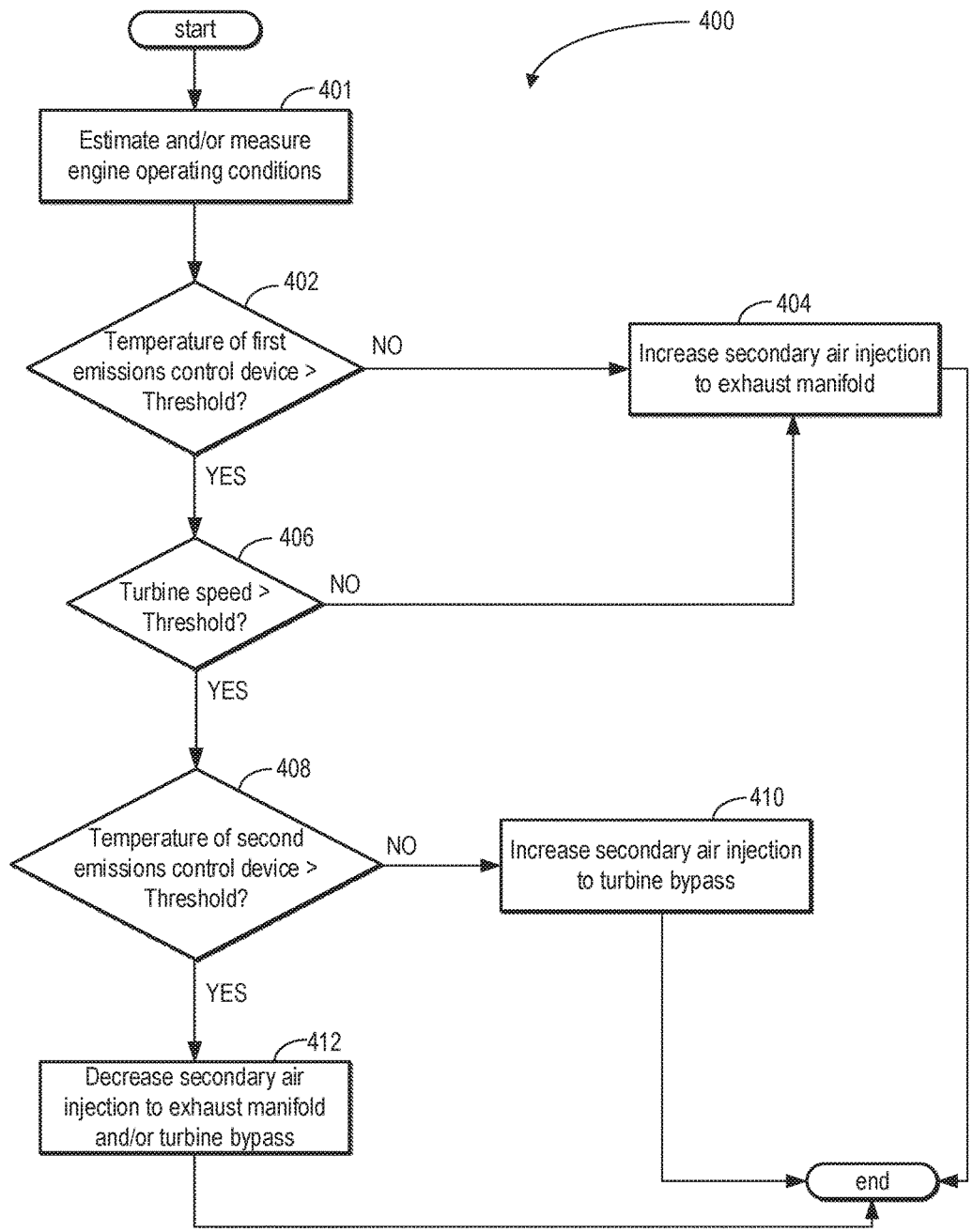
FIG. 4 illustrates an example method for discharging pressurized air from a heat exchanger as secondary air injection into either an exhaust manifold or a turbine bypass passage around a turbine based on engine operating conditions.
Figure 5:
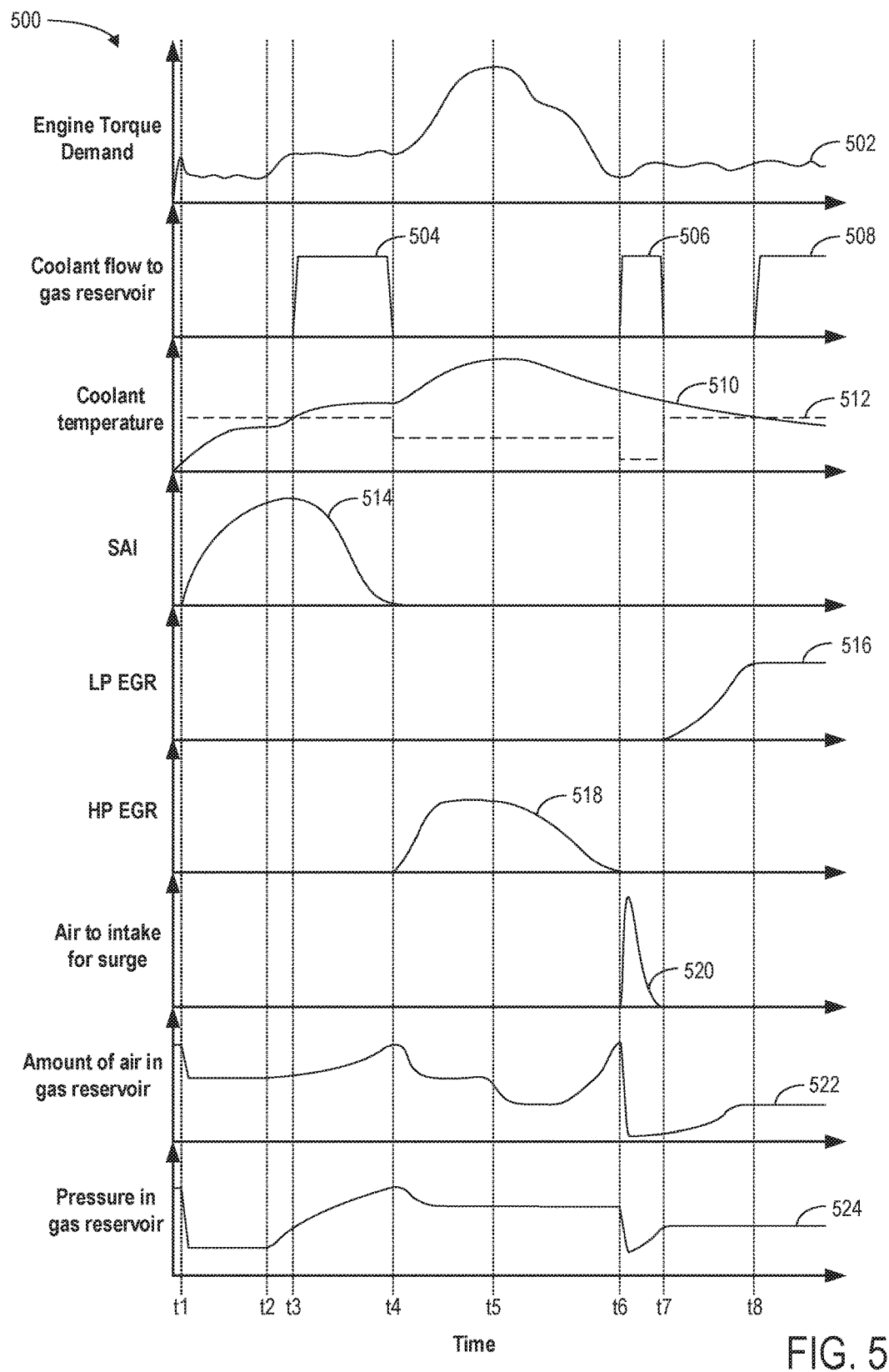
FIG. 5 shows graphs illustrating example charging and discharging operations from a heat exchanger based on engine operating conditions.

FIG. 4 shows a method 400 for discharging gas contents of a gas mixing tank reservoir (e.g., such as gas mixing tank reservoir 100 shown by FIG. 1, or gas mixing tank reservoir 200 shown by FIG. 2) as secondary air injection into either an exhaust manifold or a turbine bypass passage around a turbine based on engine operating conditions. In one example, the engine operating conditions may include a measurement or estimate of the temperature of a first emission control device (e.g., such as the first emission control device 188 shown by FIG. 1), a measurement or estimate of the temperature of a second emission control device (e.g., such as the second emission control device 190 shown by FIG. 1), and a measurement or estimate of the rotational speed of a turbine (e.g., such as turbine 186 shown by FIG. 1). As described during the discussion of FIG. 1, the first emission control device and the second emission control device may include one or more exhaust after-treatment catalysts configured to catalytically treat the exhaust flow, and thereby reduce an amount of one or more substances in the exhaust flow. In an example arrangement (referenced by method 400 below and shown schematically by FIG. 1), the first emission control device is positioned upstream of an exhaust turbine, and the second emission control device is positioned downstream of the exhaust turbine.

At 401, the method includes estimating and/or measuring engine operating conditions based on outputs of one or more temperature sensors, pressure sensors, etc. and/or one or more additional engine operating conditions. The engine operating conditions may further include engine speed and load, EGR flow rate (LP and/or HP), mass air flow rate, compressor inlet pressure, coolant flow rate, and/or other parameters based on measurements from sensors within an engine system. The engine operating conditions may also include the operating conditions of a gas mixing tank reservoir (e.g., temperature of coolant, gas pressure, amount of stored gas, percentage of exhaust gas mixed with intake air, etc.).

At 402, the method includes determining if the temperature of the first emission control device is greater than a temperature threshold. For example, the threshold temperature may be based on an operating temperature at which the emissions control device can efficiently remove hydrocarbons and/or other noxious compounds from exhaust gas. In another example, the threshold temperature may be a catalyst light off temperature of the first emission control device.

If the temperature of the first emission control device is not greater than the temperature threshold at 402, the method continues to 404 where the method includes increasing the flow of secondary air injection (SAI) to the exhaust manifold. In one example, the method at 404 may include the controller actuating a valve in a passage between the gas mixing tank reservoir and the exhaust manifold to increase the amount of SAI flowing to the exhaust manifold from the gas mixing tank reservoir. This may result in the combustion of unburned hydrocarbons in the exhaust gas, thereby increasing the thermal energy of the exhaust gas and increasing the temperature of the first emission control device.

If the temperature of the first emission control device is higher than the temperature threshold at 402, the method continues to 406. At 406, the method includes determining whether the rotational speed of the turbine is greater than a threshold value. For example, the threshold value may be based on a desired compressor flow output for supplying charge air to the engine and/or the gas mixing tank reservoir. The threshold value may also be based on driver torque demand (e.g., based on a throttle position or accelerator pedal position).

If the turbine rotational speed determined at 406 is not greater than the threshold value, the method continues to 404 where the method includes increasing secondary air injection (SAI) to the exhaust manifold from the gas mixing tank reservoir, as explained above. In this way, the increased airflow to the exhaust system (e.g., exhaust passage) upstream of the turbine may increase the turbine speed, thereby increasing rotation of the compressor and delivering demanded torque.

At 406, if the turbine rotational speed is greater than the threshold value, the method continues to 408. At 408, the method includes determining whether the temperature of the second emission control device is greater than a threshold temperature. For example, the threshold temperature may be based on an operating temperature at which the second emission control device can efficiently remove hydrocarbons and/or other noxious compounds from exhaust gas. In one example, the threshold temperature may be a catalyst light off temperature for the second emission control device.

If the temperature of the second emission control device is not greater than the temperature threshold at 408, the method continues to 410 where the method includes increasing the flow of secondary air injection (SAI) to a turbine bypass passage arranged around the turbine. In one example, the method at 410 includes the controller actuating a valve in a passage between the gas mixing tank reservoir and the turbine bypass passage to increase the amount of SAI routed to the turbine bypass passage from the gas mixing tank reservoir in order to combust unburned hydrocarbons in the exhaust gas, thereby increasing the thermal energy of the exhaust gas and increasing the temperature of the second emission control device.

If the temperature of the second emission control device is higher than the temperature threshold at 408, the method continues to 412 where the method includes decreasing the amount of SAI delivered to the exhaust manifold and/or the turbine bypass from the gas mixing tank reservoir. For example, if the first emission control device is above the threshold temperature at 402, the turbine is above the threshold rotational speed at 406, and the second emission control device is above the threshold temperature at 412, the controller may actuate one or more valves disposed in passages between the gas mixing tank reservoir and the exhaust system to decrease secondary air injection. This may result in conserving charge within the gas mixing tank reservoir and/or directing charge to the intake system instead of the exhaust system.

In an example routine, the exhaust manifold may receive SAI gases until a first emission control device reaches operating temperature. The exhaust manifold may then continue to receive SAI gases until a desired turbine rotational speed is achieved. Once the first emission control device reaches operating temperature and the turbine reaches the desired rotational speed, SAI gases may be directed towards the turbine bypass passage in order to expedite the heating of the second emission control device. After the second emission control device achieves operating temperature, the controller may decrease and/or discontinue SAI to one or both of the exhaust manifold and the turbine bypass passage. In this way, the performance of the exhaust system may be optimized through SAI via the gas mixing tank reservoir.

FIG. 5 shows a graphical example of adjustments to engine operation based on engine torque demand, as well as adjustments to the coolant flow to a gas mixing tank reservoir (e.g., such as the gas mixing tank reservoir 100 shown by FIG. 1, or the gas mixing tank reservoir 200 shown by FIG. 2) based on the temperature of coolant delivered to the gas mixing tank reservoir. Specifically, graph 500 shows changes in engine torque demand at plot 502, changes in coolant flow to the gas mixing tank reservoir at plots 504, 506, and 508, changes in engine coolant temperature at plot 512, changes in a coolant threshold temperature at plot 510, changes in secondary air injection (SAI) flow at plot 514, changes in low-pressure exhaust-gas recirculation (LP EGR) flow at plot 516, changes in high-pressure exhaust-gas recirculation (HP EGR) flow at plot 518, changes in flow from the gas mixing tank reservoir to the intake system to reduce compressor surge at plot 520, changes to the amount of gases in the gas mixing tank reservoir at plot 522, and changes in the pressure of the gases in the gas mixing tank reservoir at plot 524. The coolant temperature sensor may be positioned at an inlet of the gas mixing tank reservoir and referred to herein as the temperature sensor. The SAI, HP EGR, LP EGR, and intake air flow for compressor surge may all be delivered by passages arranged between the mixing tank reservoir and the intake and exhaust systems of the engine (and adjustments to valves disposed within those passage), such as those described above with reference to FIGS. 1 and 2. A controller (such as controller 169 shown in FIG. 1) may actuate actuators coupled to the various valves in order to adjust the SAI, LP EGR, HP EGR, and intake air flow for compressor surge control to the engine intake and exhaust systems from the gas mixing tank reservoir, as described further below.

Prior to time t1, engine torque demand is increasing (plot 502). Coolant temperature (plot 510) of coolant flowing the gas mixing tank reservoir is also increasing. In one example, the increase in engine torque demand and coolant temperature may be due to an engine cold start (e.g., the engine adjusted from a non-operational state to an operational state). The amount of air (e.g., intake air and/or exhaust gases) in a gas mixing tank reservoir (plot 522) prior to time t1 remains approximately constant. Additionally, the pressure of the air in the gas mixing tank reservoir (plot 524) prior to time t1 remains approximately constant. In this example, prior to time t1, intake air and/or exhaust had been stored within the gas mixing tank reservoir during a prior operation of the engine (e.g., a substantial amount of time prior to time t1). The stored air may then be utilized during a cold start, as described above.

At time t1, the controller (e.g., such as controller 169 shown by FIG. 1) receives a request for secondary air injection (SAI) to one or both of an exhaust manifold or a turbine bypass passage. As described during the discussion of FIGS. 3A-3B and FIG. 4, the secondary air injection request may be received in response to a measured temperature of one or more emission control devices, and/or a measured rotational speed of a turbocharger turbine. In response to the request for SAI, the controller actuates one or more valves to increase the SAI flow rate (plot 514) to the exhaust manifold and/or turbine bypass passage. Since coolant temperature (plot 510) is below the threshold coolant temperature (plot 512), coolant flow to the gas mixing tank reservoir remains turned off (e.g., does not flow to the reservoir) while SAI is delivered between time t1 and time t2. During this time, coolant temperature (plot 512) also increases.

In the time between t1 and t2, the engine coolant temperature has not yet reached a threshold value (plot 512). In response to the engine coolant temperature being below the threshold value, the controller does not circulate coolant to the gas mixing tank reservoir. In this example, the threshold temperature between times t1 and t2 may be associated with the temperature of the gases within the gas mixing tank reservoir as well as the gases entering the reservoir through the intake system. It may be advantageous to inject gases at a higher temperature into the exhaust manifold to promote combustion of unburned fuel. In this situation, the coolant temperature is relatively low and so coolant does not flow into the reservoir so that additional cooling of the gases is reduced.

The engine torque demand (plot 502) between time t1 and t2 remains relatively constant, and the engine is indicated to possess a relatively low load. This may correspond to a warm-up phase of the engine, and/or or a cruising phase in which torque demand remains low. In this example, SAI may be requested to increase the temperature of one or more emission control devices to reduce engine emissions. As gases are initially routed from the gas mixing tank reservoir to the exhaust manifold and/or turbine bypass passage between time t1 and time t2, the amount of air in the reservoir decreases (plot 522) and the pressure in the reservoir decreases (plot 524). However, the amount of air in the gas mixing tank reservoir reaches an approximately constant value as fresh air flows into the reservoir from the intake manifold in order to be injected into the exhaust manifold. Similarly, the pressure in the reservoir arrives at a relatively constant value due to the flow of intake air into the reservoir and out to the exhaust manifold.

Between time t2 and t3, engine torque demand (plot 502) increases again. As a result, coolant temperature (plot 510) also increases. The threshold temperature (plot 512) remains the same, as SAI flow is still increasing (plot 514). The amount of air in the reservoir (plot 522) begins to increase, and the pressure in the reservoir (plot 524) begins to increase. In this example, the increased torque demand on the engine produces an increased amount of exhaust gases, which in turn allow the compressor of the turbocharger to spin more rapidly. More intake air is delivered to the gas mixing tank reservoir, and while intake air is also exiting the reservoir and entering the exhaust system, a higher amount of gas is entering the reservoir than the gas that is leaving the reservoir.

The engine coolant temperature (plot 510) continues to increase and, at time t3, reaches the threshold temperature (plot 512). In response to reaching the threshold temperature, at time t3 the coolant is allowed to flow into the reservoir (as indicated by plot 504).

Between time t3 and t4, the engine torque demand (plot 502) remains approximately constant. The engine coolant temperature (plot 510) continues to increase past the threshold temperature (plot 512). Coolant flow to the reservoir (plot 504) increases in response to the continued SAI flow (plot 514) combined with the increase in coolant temperature beyond the temperature threshold. The effect of flowing coolant to the reservoir in this example is to heat the gases within (and passing through) the reservoir. As described above, increasing the temperature of the intake gas flowing through the reservoir may increase the combustion reaction at the exhaust manifold. The amount of air in the reservoir continues to increase due to the reduction in SAI flow (plot 514) and relatively constant engine torque demand (plot 502). In other words, the amount of gas exiting the reservoir decreases while the amount of gas entering the reservoir remains relatively constant. The pressure of the gas in the reservoir (plot 524) also increases due to the increase in temperature provided by the coolant as well as the increased amount of gas stored within the volume of the reservoir (as described above).

At time t4, the SAI flow (plot 514) stops. Between time t4 and t4, the controller determines that, due to rapidly increasing engine torque demand (plot 502), HP EGR flow (plot 518) increases in accordance with the torque demand. In response, the controller adjusts the temperature threshold value (plot 512) based on a temperature of the gases contained within the gas mixing tank reservoir and a temperature desired for HP EGR. In response to the temperature threshold change and the request to provide HP EGR via the gas mixing tank reservoir, coolant flow to the gas mixing tank reservoir (plot 504) is stopped. For the current example, continuing to circulate coolant to the gas mixing tank reservoir would heat the gases within the reservoir. It is advantageous to keep the gases for HP EGR at a lower temperature (as described in the discussion of FIGS. 3A-3B) and so coolant flow is stopped.

Due to the increased demand for HP EGR flow, the amount of air in the reservoir (plot 522) drops temporarily to fulfill the initial demand. The amount of air in the reservoir then stabilizes due to the increased speed of the turbine as the engine torque demand increases. The stabilized amount of air in the reservoir corresponds to an equal inflow and outflow of gases from the gas reservoir. The increased exhaust flow (from the increased engine torque demand) and the increased intake flow (due to the increasing rotational speed of the compressor) allow an increased flow into the gas mixing tank reservoir. As a result, the pressure within the reservoir (plot 524) increases until reaching a stabilized point (consistent with an equal inflow and outflow of gases as described above).

Between time t5 and t6, engine torque demand (plot 502) begins to decrease. As a result, coolant temperature (plot 510) also begins to decrease. The controller has determined that HP EGR flow is still desired and has adjusted the HP EGR flow (plot 518) according to the decreasing engine torque demand. Due to the decreasing torque demand, the percentage of HP EGR gas delivered to the engine begins to decrease. The composition of HP EGR gas (e.g., the ratio of fresh intake air to exhaust gas) may be adjusted in accordance with the decreasing engine torque demand to provide the desired amount of HP EGR injection. The amount of gas in the reservoir (plot 522) decreases temporarily to keep up with HP EGR flow demand. Pressure within the reservoir (plot 524) remains approximately unchanged due to the introduction of higher EGR percentage within the reservoir. The higher EGR percentage indicates that a greater amount of hot exhaust gas is stored within the mixing reservoir and so the pressure is higher when compared to a similar mass of fresh intake air. The controller discharges the contents of the reservoir and allows in exhaust gas in a way that approximately preserves the pressure within the reservoir.

As the engine torque demand continues to decrease, the controller predicts the potential for compressor surge. In response to the prediction, the controller gradually decreases HP EGR flow until it stops at time t6. The controller also continues to charge the gas mixing tank reservoir with gas from the intake system and/or exhaust system in anticipation of potential compressor surge.

At time t6, the engine torque demand (plot 502) has decreased to a value at which compressor surge may occur. In response to the indication of potential surge, the controller determines that air from the gas mixing tank reservoir be discharged to the inlet of the compressor (plot 520) in order to reduce surging of the compressor. In response to the determination to reduce surge, the controller adjusts the threshold coolant temperature (plot 512) to a lower value based on the temperature of the gases in the reservoir. The engine coolant temperature (plot 510) at time t6 is higher than the new coolant threshold temperature, and in response, coolant begins flowing through the gas mixing tank reservoir (plot 506). In this example, the controller determines that it is advantageous to circulate coolant in order to heat the gases within the gas mixing tank reservoir. Heating the gases increases the pressure within the tank, and the gases at increased pressure can be discharged into the compressor inlet to reduce surge.

The sudden discharging of gases into the compressor inlet (plot 520) decreases the amount of gas stored in the reservoir (522). The reduced amount of gas in the reservoir then reduces the pressure of the gases in the reservoir (plot 524). The engine torque demand (plot 502) then begins to increase again between time t6 and t7. As the engine torque demand increases, of the potential for compressor surge decreases and so the controller reduces the flow of gases from the reservoir to the compressor inlet until the flow stops at t7. The amount of air and the pressure of the air within the reservoir begins to increase until t7.

Between times t7 and t8, the engine torque demand (plot 502) remains approximately constant with little fluctuation. The controller determines at time t7 that LP EGR flow is desired based on additional engine operating conditions. At time t7, the controller begins increasing the flow of LP EGR gases (plot 516) to the engine from the gas mixing tank reservoir. In response to the flow of LP EGR, the controller adjusts the coolant temperature threshold (512) to a higher value based on the temperature of the gases within the gas mixing tank reservoir. However, between t7 and t8 the temperature of the engine coolant (plot 510) is still above the threshold value and so coolant does not flow through the gas mixing tank reservoir. It is advantageous to flow LP EGR gases at lower temperatures (as described in the discussion of FIGS. 3A-3B above) and so flowing coolant through the reservoir between time t7 and t8 would provide the disadvantageous effect of increasing the temperature of the gases.

The steady engine torque demand results in a charging opportunity for the gas mixing tank reservoir. As a result, the amount of air in the reservoir (plot 522) begins to increase. The ratio of the exhaust air to the intake air is varied by the controller to maintain a constant pressure (plot 524) within the reservoir.

After time t8, the temperature of the engine coolant (plot 510) decreases below the threshold coolant temperature (plot 512). In response to the decreased coolant temperature in combination with the continued demand for LP EGR, the controller begins flowing coolant into the gas mixing tank reservoir (plot 508). The flow of coolant cools the gases within the reservoir, and the controller adjusts the percentage of EGR gas within the reservoir to maintain a constant pressure (plot 524) within the reservoir. The inflow and outflow of gases from the reservoir stabilizes such that a constant amount of gas is contained within the reservoir after time t8 (plot 522). Additionally, the flow of LP EGR reaches a constant value (plot 516) in accordance with engine torque demand (plot 502).

In this way, the controller within the engine system may regulate the flow of gases to the gas mixing tank reservoir from the intake system and/or the exhaust system based on engine operating conditions. The controller may also regulate the flow of gases from the gas mixing tank reservoir to one or more locations within the intake system and one or more locations within the exhaust system based on engine operating conditions. The flow of gases to/from the gas mixing tank reservoir may be influenced at least in part by the temperature of the engine coolant. The controller may determine a threshold coolant temperature for each process occurring (e.g., LP EGR flow, SAI, etc.) and regulate the flow of coolant to the gas mixing tank reservoir based on a comparison of the engine coolant temperature with the coolant threshold temperature. Coolant flow to the gas mixing tank reservoir is adjusted by the controller based on coolant temperature. Coolant flow to the gas mixing tank reservoir is also adjusted based on one or more requests to at least partly discharge the gases contained within the gas mixing tank reservoir to provide the engine system with secondary air injection (SAD, low-pressure exhaust gas recirculation (LP EGR), high-pressure exhaust gas recirculation (HP EGR), and/or compressor surge control. The technical effect of adjusting coolant flow to the gas mixing tank reservoir based on one or more requests for SAI, LP EGR, HP EGR, and/or compressor surge control is to control the temperature of the gases discharged from the gas mixing tank reservoir to the intake/exhaust system. In one example, the discharge of gases from the gas mixing tank reservoir may be delayed until the gas temperature within the reservoir reaches a desired temperature, and where the desired temperature is based on the location of discharge (e.g., to one or more locations within the intake system and/or exhaust system). In this way, the temperature of SAI, LP EGR, HP EGR, and compressor surge control gases can be controlled to increase engine efficiency. By regulating the flows of gases to/from the gas mixing tank reservoir and coolant to/from the gas mixing tank reservoir, engine performance may be increased.

Figure 8:
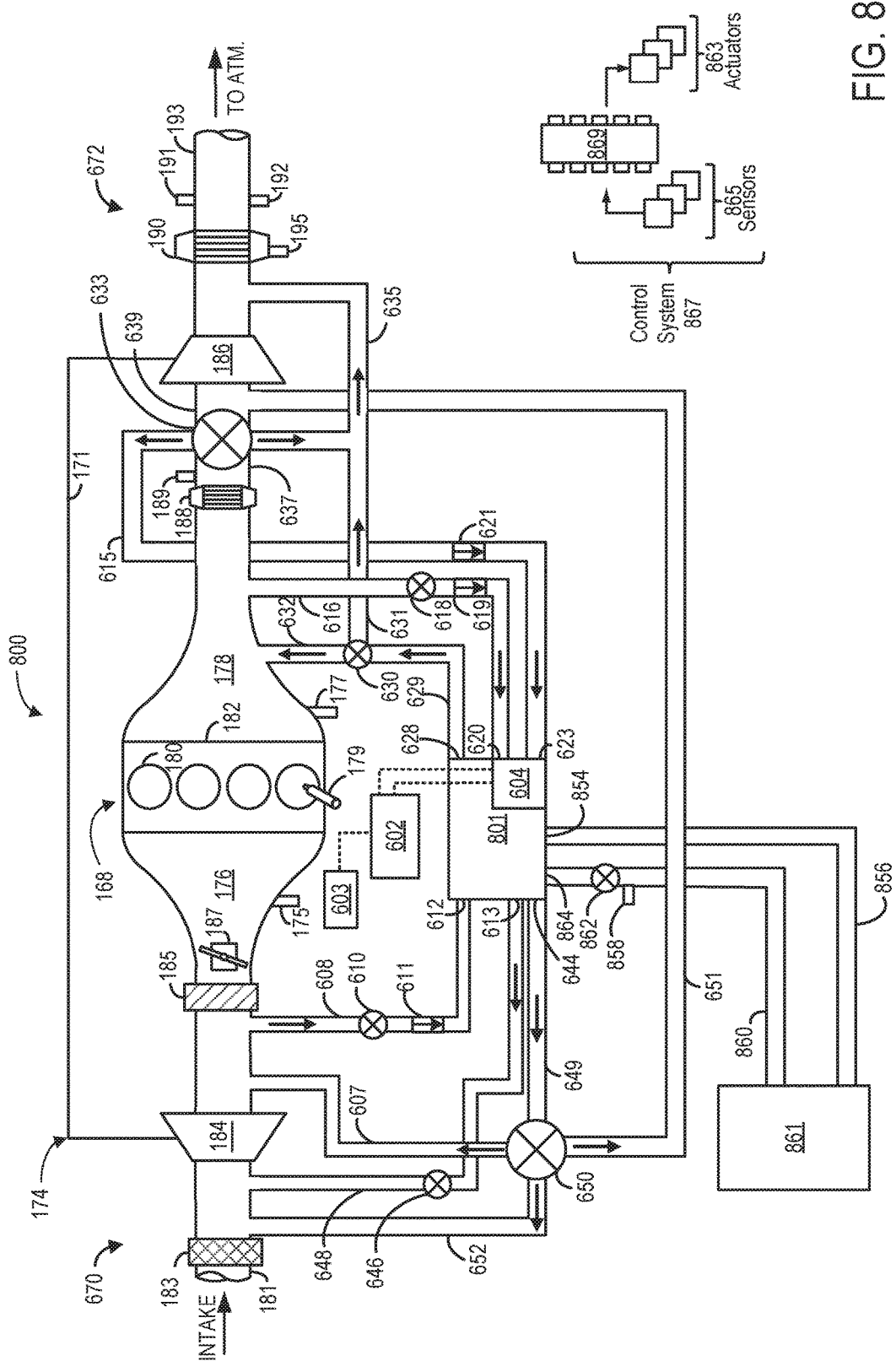
FIG. 8 shows a third schematic of a system for an engine including a heat exchanger positioned between an intake system and an exhaust system of the engine, an energy recovery device coupled to the heat exchanger, and coolant circulating through the heat exchanger.
Figure 9:
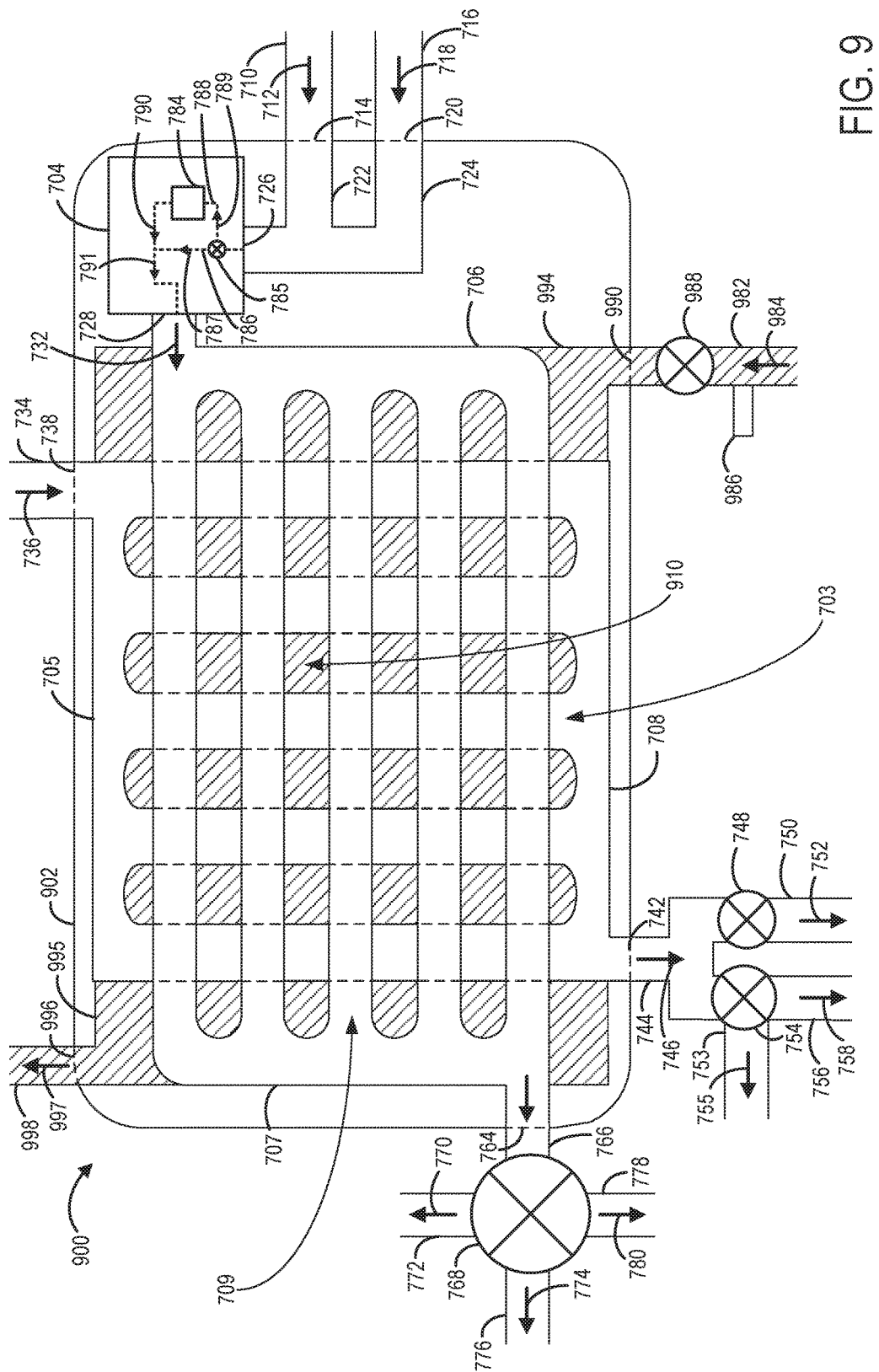
FIG. 9 shows a third embodiment of a heat exchanger including gas and coolant passages internal to the heat exchanger, inlet and outlet ports coupled to the internal gas and coolant passages, and an energy recovery device coupled to the heat exchanger.

FIGS. 6-9 present additional embodiments of a heat exchanger with may include similar features to the mixing tank reservoir (e.g., heat exchanger) presented above in the discussion of FIGS. 1-2. However, the embodiments of the heat exchanger (and the corresponding controls) presented in FIGS. 6-12 include a heat exchanger with an integrated energy recovery device, where the energy recovery device is physically and fluidly coupled with the heat exchanger. Specifically, FIG. 6 and FIG. 8 show additional schematics of example engine systems including a heat exchanger which may include similar features to the mixing tank reservoir of FIG. 1. Engine system 600 shown by FIG. 6 and engine system 800 shown by FIG. 8 include several components similar to those shown by engine system 166 of FIG. 1 and have been numbered similarly. Components shown by FIG. 6 and FIG. 8 that are included within engine system 166 of FIG. 1 and introduced during the discussion of FIG. 1 above may not be re-introduced in the following discussions of FIG. 6 and FIG. 8 below. Similarly, FIG. 7 and FIG. 9 show additional embodiments of the heat exchanger (e.g., heat exchanger 700 in FIG. 7 and heat exchanger 900 in FIG. 9), where heat exchanger 700 may be used as the heat exchanger 601 shown in FIG. 6 and heat exchanger 900 may be used as the heat exchanger 801 in FIG. 8. Turning first to FIG. 6, engine system 600 includes engine 168, cylinder head 182, combustion chambers (such as combustion chamber 180), and fuel injectors (such as fuel injector 179). Engine system 600 also includes turbocharger 174 comprised of shaft 171, compressor 184, and turbine 186. Compressor 184 of turbocharger 174 is arranged within an intake system 670, while turbine 186 of turbocharger 174 is arranged within an exhaust system 672. The turbine 186 and compressor 184 are coupled by shaft 171, as described during the discussion of FIG. 1. The intake system 670 includes several components similar to those shown by FIG. 1, such as intake passage 181, air cleaner 183, charge-air cooler 185, throttle 187, intake manifold 176, and pressure sensor 175. Similarly, the exhaust system 672 includes several components similar to those shown by FIG. 1, such as exhaust manifold 178, pressure sensor 177, first emissions control device 188, temperature sensor 189, second emissions control device 190, temperature sensor 195, temperature sensor 191, flow sensor 192, and exhaust conduit 193.

Engine system 600 also includes heat exchanger 601 coupled to both intake system 670 and exhaust system 672. Heat exchanger 601 is configured to both receive and output air from the intake system 670, and to both receive and output exhaust gas from the exhaust system 672, as described in further detail below and by the discussion of FIG. 7 presented below.

Heat exchanger 601 includes energy recovery device 604 which is electrically coupled to battery 602. In one example, the energy recovery device 604 is integrated with the heat exchanger 601 such that the energy recovery device 604 is fluidly and physically coupled (e.g., directly coupled without any intervening components separating the energy recovery device 604 and the heat exchanger 601) to the heat exchanger 601. As explained further below, passages of the energy recovery device configured to flow exhaust gas may be directly coupled to passages of the heat exchanger configured to flow exhaust gas.

Energy recovery device 604 may be a thermoelectric generator (such as a Seebeck generator, Peltier device, etc.) configured to convert heat into electrical energy. For example, a first side (not shown) of the energy recovery device 604 may be held at approximately a first temperature through a thermal coupling with a first temperature reservoir. The thermal coupling between the first side of the energy recovery device and the first temperature reservoir may include components such as heat sinks, fans, coolant circulation, etc. in direct contact with the first temperature reservoir to transfer thermal energy away from the first side and into the reservoir. The first temperature reservoir may comprise a fluid and/or surface at a temperature lower than a temperature of engine exhaust gases (e.g., ambient air) and may have a relatively high specific heat and/or volume such that the transfer of thermal energy from the first side of the energy recovery device to the first reservoir does not appreciably adjust the temperature of the first temperature reservoir. A second side of the energy recovery device is thermally coupled with engine exhaust gases such that the second side of the energy recovery device may receive thermal energy and be heated by the exhaust gases. The thermal coupling between the second side of the energy recovery device and the exhaust gases may include components such as heat sinks, fans, fluid circulation, etc. in direct contact with the exhaust gases to transfer thermal energy away from the exhaust gases and into the second side of the energy recovery device.

Battery 602 may be configured to store electrical energy generated by energy recovery device 604 and supply electrical energy to engine system 600. For example, battery 602 may store electrical energy during conditions of engine operation such as those described in the discussion of FIGS. 11-12 below. In one example, battery 602 may store electrical energy from energy recovery device 604 during periods of high engine load. Stored electrical energy from battery 602 may then be supplied to the engine system 600 in response to a request from a controller, such as controller 669 of control system 667. In one example, stored electrical energy within battery 602 may be utilized during an engine cold start and/or to supply power to one or more electrical components 603 of engine system 600. Example electrical components (such as electrical component 603) may include accessory devices of engine system 600 (such as lights of a vehicle passenger compartment), a controller (such as controller 669), one or more fluid pumps, heaters, compressors, etc. The electrical component 603 shown by FIG. 6 is not limited to the example electrical components mentioned above. Engine system 600 may also include additional electrical components (e.g., in addition to electrical component 603 and not shown) electrically coupled to battery 602.

The controller 669 may comprise a similar structure and configuration as that of controller 169 described above in the discussion of FIG. 1. However, the controller 669 includes instructions and logic specific to operation of engine system 600. In particular, controller 669 is configured with instructions stored in non-transitory memory for operation of heat exchanger 601, energy recovery device 604, and actuators 663 associated with valves (e.g., such as four-way valve 650, four-way valve 633, three-way valve 630, valve 610, valve 646, etc.) and sensors 665 within engine system 600.

Intake system 670 and exhaust system 672 of engine system 600 each include a plurality of passages coupled to heat exchanger 601 to flow gases to the heat exchanger 601. Intake air passage 608 is arranged upstream of charge-air cooler 185 and downstream of compressor 184 to supply compressed intake air to an intake port 612 of heat exchanger 601. A valve 610 is included within intake air passage 608 and may be actuated by controller 669 to increase or decrease the flow of intake air into the heat exchanger 601. Check valve 611 is coupled to intake air passage 608 to reduce the likelihood of pressurized intake air flowing from the intake port 612 of the heat exchanger 601 back through intake air passage 608.

A first exhaust passage 616 is coupled to the exhaust system 672 upstream of first emissions control device 188 and supplies exhaust gas from the exhaust system 672 to a first exhaust port 620 of the heat exchanger 601. A valve 618 is included within first exhaust passage 616 and may be actuated by controller 669 to increase or decrease the flow of exhaust gas into the heat exchanger 601 through first exhaust passage 616. Check valve 619 is coupled to first exhaust passage 616 to reduce the likelihood of exhaust gas flowing from the first exhaust port 620 of the heat exchanger 601 back through first exhaust passage 616.

Four-way valve 633 is arranged downstream of first emissions control device 188 and upstream of turbine 186 within the exhaust system 672. Four-way valve 633 is coupled to the exhaust conduit 193 and may be actuated (e.g., opened or closed or moved into a plurality of positions between fully opened and fully closed) to increase or decrease the flow of exhaust gases through exhaust conduit 193. Four-way valve 633 is additionally coupled to a second exhaust passage 615 and a turbine bypass passage 635. Exhaust gas may flow from the exhaust system 672 through second exhaust passage 615 gas to a second exhaust port 623 of the heat exchanger 601 when four-way valve 633 is actuated (e.g., opened or closed) by controller 669 according to the examples described below. Actuation of four-way valve 633 may increase or decrease the flow of exhaust gas from exhaust conduit 193 to second exhaust passage 615. Check valve 621 is coupled to second exhaust passage 615 to reduce the likelihood of exhaust gas flowing from the second exhaust port 623 of the heat exchanger 601 back through second exhaust passage 615.

The four-way valve 633 may be normally closed to the second exhaust passage 615 and the turbine bypass passage 635 so that gases do not flow into the second exhaust passage 615 and the turbine bypass passage 635 via exhaust conduit 193. However, the four-way valve 633 may be actuated (e.g., opened) by the controller 669 to allow gases to flow through the four-way valve 633 from the exhaust conduit into one or more of the second exhaust passage 615 and the turbine bypass passage 635.

In a first example, the four-way valve 633 may be opened to both the second exhaust passage 615 and a first portion 637 of exhaust conduit 193 to increase the flow of gases from the exhaust conduit 193 into the second exhaust passage 615, but closed to the turbine bypass passage 635 to reduce the flow of gases through turbine bypass passage 635, closed to a second portion 639 of exhaust conduit 193 to reduce the flow of gases towards turbine 186, or closed to both of the turbine bypass passage 635 and the second portion 639 of exhaust conduit 193 to reduce the flow of gases towards both the turbine 186 and the turbine bypass passage 635. In this way, the four-way valve 633 arranged downstream of first emissions control device 188 increases the flow of exhaust gases into the heat exchanger 601 from the exhaust manifold 178 via the second exhaust passage 615 coupled to exhaust conduit 193. In a second example, the four-way valve 633 may be opened to both the turbine bypass passage 635 and the first portion 637 of exhaust conduit 193 to increase the flow of exhaust gases from the exhaust conduit 193 into the turbine bypass passage 635, and closed to the second exhaust passage 615 to reduce the flow of gases towards second exhaust passage 615, closed to the second portion 639 of exhaust conduit 193 to reduce the flow of gases towards turbine 186, or closed to both of the second exhaust passage 615 and the second portion 639 of exhaust conduit 193 to reduce the flow of gases towards both the second exhaust passage 615 and the turbine 186. In this way, the four-way valve 633 may decrease the flow of exhaust gas through turbine 186, and decrease the flow of exhaust through second exhaust passage 615 towards heat exchanger 601. In a third example, the four-way valve 633 may be opened to the first portion 637 of exhaust conduit 193, opened to the second exhaust passage 615, and opened to the turbine bypass passage 635 to increase the flow of gases from the exhaust conduit 193 into each of the second exhaust passage 615 and the turbine bypass passage 635, and closed to the second portion 639 of exhaust conduit 193 to reduce the flow of gases through exhaust conduit 193 towards turbine 186. In this way, a first portion of the gas flow through exhaust conduit 193 is directed towards heat exchanger 601 via second exhaust passage 615 while a second portion of the gas flow is directed past the turbine 186 through turbine bypass passage 635. In a fourth example, the four-way valve 633 may be opened to both the first portion 637 of exhaust conduit 193 and the second portion 639 of exhaust conduit 193 to increase the flow of gases from the exhaust manifold 178 through the exhaust conduit 193 towards the turbine 186, but closed to the turbine bypass passage 635 to reduce the flow of gases towards turbine bypass passage 635, closed to the second exhaust passage 615 to reduce the flow of gases towards the second exhaust passage 615, or closed to both the turbine bypass passage 635 and the second exhaust passage 615 to reduce the flow of gases towards both of the turbine bypass passage 635 and the second exhaust passage 615. In this way, four-way valve 633 may increase the flow of exhaust gas through turbine 186 (e.g., in order to increase a speed of turbine 186). In a fifth example, the four-way valve 633 may be opened or closed to each of the first portion 637 of exhaust conduit 193, the second portion 639 of exhaust conduit 193, the turbine bypass passage 635, and the second exhaust passage 615 to increase or decrease the flow of exhaust gas towards each of the turbine 186, the turbine bypass passage 635, and the second exhaust passage 615.

By actuating the four-way valve 633 according to the examples described above, the heat exchanger 601 may receive exhaust gases from the exhaust conduit 193 downstream of the first emissions control device 188 (e.g., during conditions in which increasing a temperature of the first emissions control device 188 via exhaust flow is desired, such as during an engine cold start). Additionally, the flow of gases in exhaust conduit 193 may be selectively diverted past the turbine 186 via turbine bypass passage 635 to reduce an operating speed of the turbine 186 (e.g., to reduce the likelihood of compressor choke from occurring, such as during periods of high engine load). Actuation of the four-way valve 633 may include fully opening or closing the valve to increase or decrease flow from one or more of the coupled passages from traveling through the four-way valve 633. Actuation may also include increasing or decreasing an amount of opening of the four-way valve 633 to a position between fully open and fully closed in order to increase or decrease flow from one or more of the coupled passages from traveling through the four-way valve 633.

Heat exchanger 601 is additionally coupled to a plurality of passages of each of the intake system 670 and exhaust system 672 to flow gas out of the heat exchanger 601. A first return passage 629 (e.g., similar to the second external split passage 129 shown by FIG. 1 and described above in the discussion of FIG. 1) is coupled to a first return port 628 of the heat exchanger 601 and directs the flow of compressed air out of heat exchanger 601. The flow of compressed air from heat exchanger 601 through first return passage 629 is controlled by actuation of three-way valve 630 (e.g., similar to three-way valve 130 shown by FIG. 1 and described above in the discussion of FIG. 1). The three-way valve 630 is additionally coupled to a first secondary air injection (SAI) passage 632 (e.g., such as the first SAI passage 132 shown by FIG. 1 and described above in the discussion of FIG. 1) and a second secondary air injection (SAI) passage 631 (e.g., such as the second SAI passage 131 shown by FIG. 1 and described above in the discussion of FIG. 1). The second SAI passage 631 is coupled to the turbine bypass passage 635.

Three-way valve 630 is actuated (e.g., opened or closed) by controller 669 in a variety of ways described during the discussion of the actuation of three-way valve 130 of FIG. 1. For example, three-way valve 630 may be opened to both of the first return passage 629 and the first SAI passage 632 to increase a flow of compressed air from the heat exchanger 601 through the first return passage 629 to the first SAI passage 632, and closed to the second SAI passage 631 to decrease a flow of compressed air from the heat exchanger 601 to the second SAI passage 631. Alternately, the three-way valve 630 may be opened to both of the first return passage 629 and the second SAI passage 631 to increase the flow of compressed air from the heat exchanger 601 to the second SAI passage 631 via first return passage 629, and closed to the first SAI passage 632 to decrease the flow of compressed air from the heat exchanger 601 to the first SAI passage 632. As an additional example, the three-way valve 630 may be opened to the first return passage 629 to increase a flow of compressed air from the heat exchanger 601 through the first return passage 629, and opened or closed to both of the first SAI passage 632 and the second SAI passage 631 to increase or decrease a flow of compressed air from the first return passage 629 to both of the first SAI passage 632 and the second SAI passage 631.

Heat exchanger 601 is additionally coupled to a second return passage 648 via second return port 613 and a third return passage 649 via third return port 644. The second return passage 648 is coupled to intake passage 181 of intake system 670 downstream of air cleaner 183 and upstream of compressor 184. Flow of compressed air from heat exchanger 601 through second return passage 648 is adjusted by actuation of valve 646. Valve 646 may be actuated (e.g., opened or closed) by the controller 669 to increase or decrease a flow of compressed air out of heat exchanger 601 and into the intake passage 181. As an example, valve 646 may be opened to increase the flow of compressed air towards the compressor 184 in order to reduce the likelihood of compressor surge from occurring.

The third return passage 649 is coupled between third return port 644 and four-way valve 650. Exhaust gas flow from the third return port 644 of the heat exchanger 601 through the third return passage 649 may be adjusted when the four-way valve 650 is actuated (e.g., opened or closed) by controller 669 according to the examples described below. Actuation of four-way valve 650 may increase or decrease the flow of exhaust gas from the heat exchanger 601 to the third return passage 649.

The four-way valve 650 may be normally closed to the third return passage 649 so that gases do not flow from the heat exchanger 601 into the third return passage 649. However, the four-way valve 650 may be actuated by the controller 669 to allow gases to flow through the four-way valve 650 from the heat exchanger into one or more of a plurality of passages coupled to the four-way valve 650, such an exhaust return line 651, a high-pressure (HP) EGR passage 607, or a low-pressure (LP) EGR passage 652.

In a first example of actuation of the four-way valve 650, the four-way valve 650 may be opened to both of the third return passage 649 and the HP EGR passage 607 to increase a flow of gases through the third return passage 649 toward the HP EGR passage 607, but closed to both of the LP EGR passage 652 and the exhaust return line 651 to reduce a flow of gases from the third return passage 649 towards the LP EGR passage 652 and the exhaust return line 651. In this way, the four-way valve 650 increases the injection of exhaust gas into the intake system 670 at a location downstream of the compressor 184 to adjust an amount of HP EGR provided to the engine system 600. In a second example of actuation of the four-way valve 650, the four-way valve 650 may be opened to both of the third return passage 649 and the exhaust return line 651 to increase a flow of gases through the third return passage 649 toward the exhaust return line 651, but closed to both of the LP EGR passage 652 and the HP EGR passage 607 to reduce a flow of gases from the third return passage 649 towards the LP EGR passage 652 and the HP EGR passage 607. In this way, the four-way valve 650 decreases an injection of exhaust gas into the intake system 670 and increases an injection of exhaust gas back into the exhaust system 672. In a third example of actuation of the four-way valve 650, the four-way valve 650 may be opened to both of the third return passage 649 and the LP EGR passage 652 to increase a flow of gases through the third return passage 649 toward the LP EGR passage 652, but closed to both of the HP EGR passage 607 and the exhaust return line 651 to reduce a flow of gases from the third return passage 649 towards the HP EGR passage 607 and the exhaust return line 651. In this way, the four-way valve 650 increases the injection of exhaust gas into the intake system 670 at a location upstream of the compressor 184 to adjust an amount of LP EGR provided to the engine system 600. In a fourth example of actuation of the four-way valve 650, the four-way valve 650 may be opened to each of the third return passage 649, the HP EGR passage 607, and the LP EGR passage 652 to increase a flow of gases through the third return passage 649 toward each of the HP EGR passage 607 and the LP EGR passage 652, but closed to exhaust return line 651 to reduce a flow of gases from the third return passage 649 towards the exhaust return line 651. In this way, the four-way valve 650 increases the injection of exhaust gas into the intake system 670 both upstream and downstream of the compressor 184 to adjust an amount of LP EGR and HP EGR provided to the engine system 600. In a fifth example of actuation of the four-way valve 650, the four-way valve 650 may be opened to each of the third return passage 649, the LP EGR passage 652, and the exhaust return line 651 to increase a flow of gases through the third return passage 649 toward each of the LP EGR passage 652 and the exhaust return line 651, but closed to HP EGR passage 607 to reduce a flow of gases from the third return passage 649 towards the HP EGR passage 607. In this way, the four-way valve 650 increases the injection of exhaust gas into the intake system 670 upstream of the compressor 184 to adjust the amount of LP EGR provided to the engine system 600, and increases the injection of exhaust gas back into the exhaust system 672 via exhaust return line 651. In a sixth example of actuation of the four-way valve 650, the four-way valve 650 may be opened to each of the third return passage 649, the HP EGR passage 607, and the exhaust return line 651 to increase a flow of gases through the third return passage 649 toward each of the HP EGR passage 607 and the exhaust return line 651, but closed to LP EGR passage 652 to reduce a flow of gases from the third return passage 649 towards the LP EGR passage 652. In this way, the four-way valve 650 increases the injection of exhaust gas into the intake system 670 downstream of the compressor 184 to adjust the amount of HP EGR provided to the engine system 600, and increases the injection of exhaust gas back into the exhaust system 672 via exhaust return line 651. In a seventh example of actuation of the four-way valve 650, the four-way valve 650 may be opened to each of the third return passage 649, the HP EGR passage 607, the LP EGR passage 652, and the exhaust return line 651 to increase a flow of gases through the third return passage 649 toward each of the HP EGR passage 607, LP EGR passage 652, and exhaust return line 651. In this way, the four-way valve 650 increases the injection of exhaust gas into the intake system 670 both upstream and downstream of the compressor 184 to adjust an amount of LP EGR and HP EGR provided to the engine system 600, and increases the injection of exhaust gas back into the exhaust system 672 via exhaust return line 651.

By actuating the four-way valve 650 with the controller 669 according to the examples described above, the heat exchanger 601 may flow exhaust gases to provide HP EGR and/or LP EGR based on engine operation conditions (e.g., during conditions in which reduced NOx emissions are desired and engine load is sufficiently high). Additionally, the flow of gases from heat exchanger 601 may be selectively diverted back to the exhaust system 672 via exhaust return line 651 to reduce an amount of EGR gases supplied to engine system 600 (e.g., during conditions in which a higher percentage of fresh intake air is desired, such as a throttle tip-in). Actuation of the four-way valve 650 may include fully opening or closing the valve to increase or decrease flow from one or more of the coupled passages from traveling through the four-way valve 650. Actuation may also include increasing or decreasing an amount of opening of the four-way valve 650 to a position between fully open and fully closed in order to increase or decrease flow from one or more of the coupled passages from traveling through the four-way valve 650.

By configuring the engine system 600 in this way, the heat exchanger 601 may receive exhaust gas from the exhaust system 672 and intake air from the intake system 670. The heat exchanger 601 may convert thermal energy of exhaust gas into electrical energy via energy recovery device 604 disposed within the heat exchanger 601 and coupled to battery 602. The heat exchanger 601 may then return intake air and/or exhaust gas to one or each of the intake system 670 or the exhaust system 672 to supply EGR, SAI, and/or compressor surge reduction. In this way, engine performance may be increased.

FIG. 7 shows an embodiment of a heat exchanger, such as the heat exchanger 601 shown in FIG. 6. The heat exchanger 700 shown by FIG. 7 includes an energy recovery device (such as the energy recovery device 604 shown by FIG. 6 and described above in the discussion of FIG. 6), a first plurality of passages 703 coupled between an inlet intake air manifold 705 and an outlet intake air manifold 708 internal to a housing 702 of the heat exchanger 700, and a second plurality of passages 709 coupled between an inlet exhaust manifold 706 and an outlet exhaust manifold 707 internal to the housing 702 of the heat exchanger 700. The first plurality of passages 703 and the second plurality of passages 709 of the heat exchanger 700 are configured proximate to each other within an internal volume of the heat exchanger 700 to facilitate a transfer of thermal energy from exhaust gases flowing through the second plurality of passages 709 to intake air flowing through the first plurality of passages 703. As an example, the second plurality of passages 709 may be arranged approximately perpendicular to the first plurality of passages 703 within the housing 702 of the heat exchanger 700 to increase an interface area between the second plurality of passages 709 and the first plurality of passages 703. The interface area between the first plurality of passages 703 and the second plurality of passages 709 may include a thermally conductive material (e.g., metal) to facilitate the transfer of thermal energy from exhaust gases flowing through the second plurality of passages 709 to the intake air flowing through the first plurality of passages 703 while retaining fluidic isolation of the exhaust gas from the intake air. In other words, gases within the second plurality of passages 709 may exchange thermal energy with the intake air within the first plurality of passages 703, but the first plurality of passages 703 and the second plurality of passages 709 do not exchange and/or mix gases with each other.

Included with and/or coupled to the housing 702 of the heat exchanger 700 are a plurality of inlet and outlet ports functionally similar to the ports of the heat exchanger 601 shown by FIG. 6. The embodiment of the heat exchanger shown by FIG. 7 includes a first exhaust inlet port 720, a second exhaust inlet port 714, an intake air inlet port 738, an intake air outlet port 742, and an exhaust outlet port 764. Alternate embodiments may contain a different number of ports. For example, in one embodiment (not shown), the first exhaust inlet port 720 and the second exhaust inlet port 714 may be combined into a single exhaust inlet port receiving exhaust gas flow from a plurality of passages.

The ports facilitate the flow of gases to and from the heat exchanger 700. The first exhaust inlet port 720 is coupled to a first exhaust inlet passage 716, such as the first exhaust passage 616 shown by FIG. 6 and described during the discussion of FIG. 6 above. The first exhaust inlet passage 716 is coupled to a location upstream of a first emission control device of an exhaust system, such as the first emission control device 188 of exhaust system 672 shown by FIG. 6, and flows exhaust gas to the heat exchanger in a direction indicated by arrow 718. The second exhaust inlet port 714 is coupled to a second exhaust inlet passage 710, such as the second exhaust passage 615 shown by FIG. 6 and described during the discussion of FIG. 6 above. The second exhaust inlet passage 710 is coupled to a location downstream of the first emission control device of the exhaust system, and flows exhaust gas to the heat exchanger 700 in a direction indicated by arrow 712.

The intake air inlet port 738 is coupled to an intake air passage 734, such as the intake air passage 608 shown by FIG. 6 and described during the discussion of FIG. 6 above. The intake air passage 734 is coupled to an intake system downstream of a compressor, such as the compressor 184 of the intake system 670 shown by FIG. 6. The intake air passage 734 flows compressed intake air from the intake system to the heat exchanger 700 in a direction indicated by arrow 736.

Compressed intake air flows through intake air inlet port 738 into the inlet intake air manifold 705 (internal to the interior of the heat exchanger 700) towards the first plurality of passages 703 (which may herein be referred to as exchanger intake passages 703). The intake air flows through the exchanger intake passages 703 towards the outlet intake air manifold 708 and is directed to intake air outlet port 742.

The intake air outlet port 742 is coupled to a first intake air outlet passage 744. Intake air flows out of the intake air outlet port 742 through the first intake air outlet passage 744 in a direction indicated by arrow 746. The first intake air outlet passage 744 is coupled to a second intake air outlet passage 750 via a first valve 748. The second intake air outlet passage 750 (e.g., similar to second return passage 648 shown by FIG. 6) selectively flows gases from the heat exchanger 700 to a location upstream of the compressor in the intake system via actuation of valve 748 by a controller (such as controller 669 shown by FIG. 6). For example, a flow of gas through the second intake air outlet passage 750 from the heat exchanger 700 in a direction indicated by arrow 752 may be increased or decreased by actuation of the valve 748.

The first intake air outlet passage 744 is additionally coupled to a first secondary air injection passage 753 and a second secondary air injection passage 756 via a single valve 754 (e.g., a three-way valve 754). The first secondary air injection passage 753 (e.g., such as first SAI passage 632 shown by FIG. 6) selectively flows gases from the heat exchanger 700 in a direction indicated by arrow 755 to a location upstream of the first emissions control device (such as the first emissions control device 188 shown by FIG. 6) of the exhaust system (such as the exhaust system 672 shown by FIG. 6) via actuation of three-way valve 754. Three-way valve 754 may open or close via the controller in a plurality of ways similar to the actuation of three-way valve 630 described above in the discussion of FIG. 6. For example, the controller may open or close the three-way valve 754 to the first SAI passage 753 to increase or decrease the flow of gases from first intake air outlet passage 744 into first SAI passage 753. The second secondary air injection passage 756 selectively flows gases from the heat exchanger 700 in a direction indicated by arrow 758 to a location downstream of the first emissions control device and downstream of a turbine (such as turbine 186 shown by FIG. 6) via actuation of three-way valve 754. For example, the controller may open or close the three-way valve 754 to the second SAI passage 756 to increase or decrease the flow of gases from first intake air outlet passage 744 into second SAI passage 756. In this way, the flow of gas from the heat exchanger 700 through first SAI passage 753 may be adjusted by opening or closing the three-way valve 754 to the first SAI passage 753, the flow of gas from the heat exchanger 700 through the second SAI passage 756 may be adjusted by opening or closing the three-way valve 754 to the second SAI passage 756, and the flow through both of the first SAI passage 753 and the second SAI passage 756 may be adjusted by opening or closing the three-way valve to each of the first SAI passage 753 and the second SAI passage 756. The flow of gas to both of the first SAI passage 753 and the second SAI passage 756 may additionally be adjusted by opening or closing (via the controller) three-way valve 754 to the first intake air outlet passage 744, and not opening or not closing the three-way valve 754 to either of the first SAI passage 753 or the second SAI passage 756.

In a first example of actuation of three-way valve 754, the three-way valve 754 may be opened to the first SAI passage 753 by the controller to increase the flow of gases from the heat exchanger 700 to the first SAI passage 753, and closed to the second SAI passage 756 by the controller to decrease the flow of gases from the heat exchanger 700 to the second SAI passage 756. By increasing the flow of gases to the first SAI passage 753, the first emissions control device may achieve an increased temperature at an increased rate due to an exothermic reaction between the injected gases and unburnt fuel in the exhaust system. In a second example of actuation of valve 754, the three-way valve 754 may be closed to the first SAI passage 753 by the controller to decrease the flow of gases from the heat exchanger 700 to the first SAI passage 753, and opened to the second SAI passage 756 by the controller to increase the flow of gases from the heat exchanger 700 to the second SAI passage 756. By increasing the flow of gases to the second SAI passage 756, a second emissions control device (e.g., such as the second emissions control device 190 shown by FIG. 6) downstream of the first emissions control device may achieve an increased temperature at an increased rate due to exothermic reaction between the injected gases and unburnt fuel in the exhaust system. In a third example of actuation of valve 754, the three-way valve 754 may be opened or closed to both the first SAI passage 753 and the second SAI passage 756 by the controller to increase or decrease the flow of gases from the heat exchanger 700 to both the first SAI passage 753 and the second SAI passage 756. By adjusting (e.g., increasing or decreasing) the flow to both the first SAI passage 753 and the second SAI passage 756 from the heat exchanger 700, a total flow of gases from the intake system to the exhaust system may be increased or decreased to increase engine performance.

Exhaust gases from the exhaust system flow through the first exhaust inlet passage 716 coupled to the first exhaust inlet port 720 and into the heat exchanger 700. Flow of gases through first exhaust inlet passage 716 may be increased or decreased by the controller via actuation of a first valve (e.g., such as valve 618 shown by FIG. 6). Exhaust gases from the exhaust system also flow through the second exhaust inlet passage 710 coupled to the second exhaust inlet port 714 and into the heat exchanger 700. Flow of gases through second exhaust inlet passage 710 may be increased or decreased by the controller via actuation of a second valve (e.g., such as the four-way valve 633 shown by FIG. 6).

First exhaust inlet passage 716 flows gases from a location upstream of the first emissions control device to the heat exchanger 700 while second exhaust inlet passage 710 flows gases from a location downstream of the first emissions control device to the heat exchanger 700 (as described above). The gases flowing through the second exhaust inlet passage 710 may be at a lower temperature than the gases flowing through the first exhaust inlet passage 716 due to an interaction of the exhaust gases with the first emissions control device. For example, the first emissions control device may receive a portion of the thermal energy of the exhaust gas before the exhaust gas flows through the second exhaust inlet passage 710. By actuating the first valve and/or the second valve via the controller to adjust the flow of exhaust gases into the heat exchanger via the first exhaust inlet passage 716 and the second exhaust inlet passage 710, a temperature of the exhaust gases entering the heat exchanger 700 may be selectively adjusted.

Exhaust gases entering the first exhaust inlet port 720 flow through a first exhaust passage 724 internal to an interior of the heat exchanger 700, and exhaust gases entering the second exhaust inlet port 714 flow through a second exhaust passage 722 internal to the interior of the heat exchanger 700. The first exhaust passage 724 and the second exhaust passage 722 are both fluidically coupled to the energy recovery device 704 arranged internal to the interior of the heat exchanger 700. The embodiment of the heat exchanger 700 shown by FIG. 7 includes the energy recovery device 704 entirely within the interior of the heat exchanger 700. However, alternate embodiments (not shown) may include one or more surfaces of the energy recovery device arranged external to the interior of the heat exchanger.

The energy recovery device 704 is a device (such as a Peltier device, as described above in the discussion of FIG. 6) that utilizes heat from exhaust gases to generate electrical energy. For example, exhaust gases may flow from one or both of the first exhaust inlet port 720 or the second exhaust inlet port 714 into an inlet port 726 of the energy recovery device 704 via the first exhaust passage 724 or the second exhaust passage 722 respectively. Exhaust gases flowing through the inlet port 726 of the energy recovery device 704 may transfer thermal energy to an electrically conductive element 784 of the energy recovery device 704. The exhaust gases may then exit the energy recovery device via an outlet port 728 in a direction indicated by arrow 732, flow through the inlet exhaust manifold 706 coupled to the outlet port 728, and flow into the exchanger exhaust passages 709 internal to the interior of the heat exchanger 700. In this way, the outlet port 728 of the energy recovery device is directly coupled to inlet exhaust manifold 706 inside the heat exchanger 700. As such, exhaust gases flow directly from the energy recovery device 704 to the interior of the heat exchanger 700.

A valve 785 internal to an interior of the energy recovery device 704 may adjust a flow of exhaust gases from inlet port 726 towards the electrically conductive element 784. For example, the valve 785 may be disposed within a first device passage 786 while the electrically conductive element 784 may be disposed within a second device passage 788. The first device passage 786, second device passage 788, valve 785, and electrically conductive element 784 may each be included within an interior of the energy recovery device 704.

In one example, the valve 785 may be opened to both of the inlet port 726 and the first device passage 786 to increase a flow of exhaust gas in a direction indicated by arrow 787, but closed to the second device passage 788 to decrease a flow of exhaust gas in a direction indicated by arrow 789. In this way, a flow of exhaust gas through the energy recovery device 704 may not increase an output of the energy recovery device 704.

In a second example, the valve 785 may be opened to both of the inlet port 726 and the second device passage 788 to increase a flow of exhaust gas in the direction indicated by arrow 789, but closed to the first device passage 786 to decrease a flow of exhaust gas in the direction indicated by arrow 787. In this way, a flow of exhaust gas to the electrically conductive element 784 may be increased, and the output of the energy recovery device 704 may increase.

In a third example, the valve may be opened or closed to each of the inlet port 726, the first device passage 786, and the second device passage 788 to increase or decrease the flow of exhaust gas in the directions of arrows 787 and 789. In this way, a total flow of exhaust gases through the energy recovery device may be adjusted.

In the examples of opening or closing valve 785 as described above, opening or closing valve 785 (with respect to one or more corresponding passages) may be include fully opening valve 785, fully closing valve 785, or adjusting an amount of opening of valve 785 to a plurality of positions between fully open and fully closed. Additionally, when the energy recovery device 704 is described as "active" or "operating" herein, an exhaust flow rate in the direction of arrow 788 (e.g., toward the electrically conductive element) may be above a threshold flow rate. When the energy recovery device is described as "not active" or "not operating" herein, an exhaust flow rate in the direction of arrow 788 may be below a threshold flow rate.

During operation of the energy recovery device 704 (as described in further detail below during the discussion of FIG. 10) the electrically conductive element 784 of the energy recovery device 704 may be heated via contact with exhaust gases entering the inlet port 726. A portion of the thermal energy transferred to the electrically conductive element of the energy recovery device 704 is converted into electrical energy by the energy recovery device 704. As a result, exhaust gases exiting the energy recovery device 704 may have less thermal energy than the exhaust gases entering the energy recovery device 704 when the exhaust gas flows in the direction of arrow 789 through the energy recovery device 704. In other words, the exhaust gases exiting the outlet port 728 may be at a lower temperature than the exhaust gases entering the inlet port 726 while the energy recovery device 704 is active. In this way, the energy recovery device 704 may be utilized to cool exhaust gases and generate electrical energy for an engine system (such as the engine system 600 shown by FIG. 6).

The outlet port 728 of the energy recovery device 704 is coupled to the inlet exhaust manifold 706, and the inlet exhaust manifold 706 is coupled to the exchanger exhaust passages 709. Gases exiting the outlet port 728 of the energy recovery device 704 flow through the inlet exhaust manifold 706 into the exchanger exhaust passages 709. The exchanger exhaust passages 709 then route the exhaust gas through the outlet exhaust manifold 707 towards the exhaust outlet port 764 (coupled to the outlet exhaust manifold 707) in a direction indicated by arrow 760.

The exhaust outlet port 764 is coupled to a passage 766 external to the interior of the heat exchanger 700. Four-way valve 768 (e.g., such as 4-way valve 650 shown by FIG. 6) is coupled to passage 766 (e.g., such as third return passage 649 shown by FIG. 6), LP EGR passage 778 (e.g., such as LP EGR passage 652 shown by FIG. 6), HP EGR passage 772 (e.g., such as HP EGR passage 607 shown by FIG. 6), and exhaust return line 776 (e.g., such as exhaust return line 651 shown by FIG. 6). Four-way valve 768 may be actuated (e.g., opened or closed) by the controller to increase or decrease a flow of gases from the exhaust outlet port 764 of the heat exchanger 700 through the passage 766 and into one or more of the HP EGR passage 772, the LP EGR passage 778, or the exhaust return line 776, similar to the actuation of four-way valve 650 described above in the discussion of FIG. 6.

As one example of actuation of four-way valve 768, the four-way valve 768 may be opened to HP EGR passage 772 and opened to passage 766 to increase a flow of gases from passage 766 through HP EGR passage 772, and closed LP EGR passage 778 to decrease the flow of gases through LP EGR passage 778, closed to exhaust return line 776 to decrease the flow of gases through exhaust return line 776, or closed to both of LP EGR passage 778 and exhaust return line 776 to decrease flow of gases to both of the LP EGR passage 778 and the exhaust return line 776. In this configuration, the heat exchanger 700 routes exhaust gas in a direction indicated by arrow 770 to the intake system to provide HP EGR (as described in the discussion of FIG. 6). As another example, the four-way valve 768 may be opened to LP EGR passage 778 to increase a flow of gases through the LP EGR passage 778, and closed to HP EGR passage 772 to decrease the flow of gases through HP EGR passage 772, closed to exhaust return line 776 to decrease the flow of gases through exhaust return line 776, or closed to both HP EGR passage 772 and exhaust return line 776 to decrease the flow of gases through both HP EGR passage 772 and the exhaust return line 776. In this configuration, the heat exchanger 700 routes exhaust gas in a direction indicated by arrow 780 to the intake system to provide LP EGR. As yet another example, the four-way valve 768 may be opened to exhaust return line 776 to increase a flow of gases through the exhaust return line 776, and closed to HP EGR passage 772 to decrease the flow of gases through HP EGR passage 772, closed to LP EGR passage 778 to decrease the flow of gases through LP EGR passage 778, or closed to both HP EGR passage 772 and LP EGR passage 778 to decrease the flow of gases to both of the HP EGR passage 772 and the LP EGR passage 778. In this configuration, the heat exchanger 700 routes exhaust gas in a direction indicated by arrow 774 back to the exhaust system at a location upstream of the turbine via exhaust return line 776 (e.g., similar to exhaust return line 651 shown by FIG. 6). As yet another example, the four-way valve 768 may be opened or closed to the LP EGR passage 778, the HP EGR passage 772, and the exhaust return line 776 to increase or decrease a flow of gases through each of the LP EGR passage 778, HP EGR passage 772, and exhaust return line 776, or the four-way valve 768 may be opened or closed to the passage 766 to increase or decrease the flow of gases out of the exhaust outlet port 764. In this configuration, the four-way valve 768 may adjust flow of exhaust gas to each of the three passages mentioned above.

In an example operation of the heat exchanger 700 according to the arrangement shown by FIG. 7 (and described above), exhaust flows into the heat exchanger 700 via both the first exhaust inlet passage 716 and the second exhaust inlet passage 710. The exhaust gas flows into the energy recovery device 704 and transfers a first portion of thermal energy to the energy recovery device 704. The energy recovery device 704 converts an amount (based on an efficiency of the energy recovery device) of the first portion of thermal energy into electrical energy and stores the electrical energy in a battery (e.g., such as the battery 602 shown by FIG. 6). The exhaust gas then flows out of the energy recovery device 704 via the outlet port 728, through the inlet exhaust manifold 706, and into the exchanger exhaust passages 709. Meanwhile, intake air from the intake system flows through intake air passage 734 into the exchanger intake passages 703 via intake air inlet port 738. The exhaust gases flowing through the exchanger exhaust passages 709 transfer a second portion of thermal energy to the intake air flowing through the exchanger intake passages 703 via proximity of the exchanger exhaust passages 709 to the exchanger intake passages 703. Through this interaction, the intake air increases in temperature while the exhaust gas decreases in temperature. Three-way valve 754 is then opened by the controller to the second SAI passage 756 to increase the flow of intake air to the second SAI passage 756. The increased flow of intake air increases the temperature of the second emissions control device via exothermic reaction between intake air and exhaust gas in the exhaust system as described above. Four-way valve 768 is opened to the LP EGR passage 778 by the controller to increase the flow of exhaust gas from the exchanger exhaust passages 709 through LP EGR passage 778 and to the intake system. The increased flow of exhaust gas to the intake system provides LP EGR and reduces noxious emissions from the exhaust system.

The above operation of the heat exchanger 700 is one example of flowing exhaust gases and intake air through the heat exchanger 700 according to the configuration shown by FIG. 7 and is not a limiting case. Additional methods of operation are described in the discussion of FIGS. 10-12 below. By adjusting flows of exhaust gas and intake air through the heat exchanger via actuation of valves coupled to the inlet and outlet ports of the heat exchanger (such as three-way valve 754 and four-way valve 768), engine performance may be increased.

FIG. 8 shows a schematic representation of a third engine system including a heat exchanger. Engine system 800 of FIG. 8 includes several components similar to those shown by engine system 600 of FIG. 6. Similar components between FIG. 6 and FIG. 8 may be labeled similarly and may not be re-introduced in the discussion of FIG. 8 below.

Engine system 800 includes a control system 867. Control system 867 is comprised of sensors 865, actuators 863, and a controller 869. The sensors 865 may include several sensors (temperature sensors, pressure sensors, etc.) similar to those shown by FIG. 6 and may include additional sensors shown by FIG. 8 as described below. Similarly, the actuators 863 may include several actuators (e.g., actuators of valves) as described in the discussion of FIG. 6 and may include additional actuators as described below. The controller 869 may comprise a similar structure and configuration as the controller 669 shown by FIG. 6. However, the controller 869 includes additional instructions and/or logic in non-transitory memory for controlling a flow of coolant within components of engine system 800. In particular, controller 869 includes instructions for adjusting coolant flow in response to a measured or estimated exhaust temperature (as described in the discussion of FIGS. 11-12 below).

A heat exchanger 801 is coupled to both the intake system 670 and the exhaust system 672 of engine system 800 and includes an energy recovery device 604. In one example, the energy recovery device 604 is integrated with the heat exchanger 801 such that the energy recovery device 604 is fluidly and physically coupled (e.g., directly coupled without any intervening components separating the energy recovery device 604 and the heat exchanger 801) to the heat exchanger 801. The heat exchanger 801 of engine system 800 is additionally fluidly coupled to a radiator 861. The heat exchanger 801 is configured to receive coolant from the radiator 861 and return coolant to the radiator 861. Coolant is routed within the heat exchanger 801 via a plurality of coolant passages (as shown by FIG. 9 and described in the discussion of FIG. 9 below).

The heat exchanger 801 includes a coolant inlet port 864 and a coolant outlet port 854. The coolant inlet port 864 is coupled to a first coolant passage 860, and the first coolant passage 860 is coupled to the radiator 861. A valve 862 is additionally coupled to the first coolant passage 860 to adjust a flow of coolant to the heat exchanger 801. For example, valve 862 may be actuated (e.g., opened or closed) by the controller 869 to increase or decrease the flow of coolant from the radiator 861 to the heat exchanger 801 in response to operating conditions of heat exchanger 801. A temperature sensor 858 is coupled to first coolant passage 860 and may transmit a signal to controller 869 to indicate a temperature of coolant within the first coolant passage 860. The heat exchanger 801 may return coolant to the radiator 861 via a second coolant passage 856 coupled to both the heat exchanger 801 (via coolant outlet port 854) and the radiator 861.

In an example operation of the heat exchanger 801 shown by FIG. 8, the heat exchanger 801 may receive intake air from the intake system 670 via intake air passage 608, and may also receive exhaust gas from the exhaust system 672 via one or both of the first exhaust passage 616 and the second exhaust passage 615. Intake air may flow out of the heat exchanger 801 via first return passage 629 and/or second return passage 648, and exhaust gas may flow out of the heat exchanger 801 via third return passage 649. Additionally, coolant may flow to the heat exchanger 801 via first coolant passage 860, and coolant may flow out of the heat exchanger 801 via second coolant passage 856. Coolant flow may increase or decrease in response to operation of the energy recovery device 604 and measured or estimated exhaust temperature (as described further in the discussion of FIGS. 11-12 below). Within the heat exchanger, the intake air, exhaust gases, and coolant flow are all kept separate from one another (via a plurality of passages of the heat exchanger) such that coolant flow, exhaust gas flow, and intake air flow, do not mix with one another within the heat exchanger. In this way, only heat may transfer between the coolant, exhaust gases, and intake air within the heat exchanger.

By adjusting coolant flow through the heat exchanger 801, the temperature of intake air and exhaust gas flowing through the heat exchanger 801 may be adjusted. For example, the controller 869 may increase coolant flow to the heat exchanger 801 in order to decrease a temperature of exhaust gas flowing through the heat exchanger 801. In this way, EGR may be provided at a lower temperature and engine performance may be increased.

FIG. 9 shows a third embodiment of a heat exchanger, such as the heat exchanger 801 shown by FIG. 8. The heat exchanger 900 shown by FIG. 9 includes several components similar to those shown by heat exchanger 700 of FIG. 7. Components shown by FIG. 9 that are also included within FIG. 7 and have been introduced during the discussion of FIG. 7 may not be re-introduced in the following discussion of FIG. 9.

Heat exchanger 900 shown by FIG. 9 includes an energy recovery device 704, a first plurality of passages 703 (which may herein be referred to as exchanger intake passages 703) coupled between an inlet intake air manifold 705 and an outlet intake air manifold 708 internal to an interior of a housing 902 of the heat exchanger 900, a second plurality of passages 709 (which may herein be referred to as exchanger exhaust passages 709) coupled between an inlet exhaust manifold 706 and an outlet exhaust manifold 707 internal to the interior of the housing 902 of the heat exchanger 900, and a plurality of passages and valves coupling the heat exchanger 900 to both of an intake system (e.g., intake system 670 shown by FIG. 8) and an exhaust system (e.g., exhaust system 672 shown by FIG. 8) in a configuration similar to that shown by heat exchanger 700 of FIG. 7. Heat exchanger 900 additionally includes third plurality of passages 910 (which may herein be referred to as exchanger coolant passages 910) coupled between an inlet coolant manifold 994 and an outlet coolant manifold 995 internal to the interior of the housing 902 of the heat exchanger 900. Similar to the arrangement shown by FIG. 7 and discussed above with reference to FIG. 7, the exchanger exhaust passages 709 and exchanger intake passages 703 may be arranged perpendicular to each other. The exchanger coolant passages 910 may be arranged perpendicular to each of the exchanger exhaust passages 709 and exchanger intake passages 703 and an interface area between the three pluralities of passages (exchanger exhaust passages 709, exchanger intake passages 703, and exchanger coolant passages 910) may include a thermally conductive material (e.g., metal). In this way, thermal energy may transfer between intake air flowing through the exchanger intake passages 703, exhaust gas flowing through the exchanger exhaust passages 709, and coolant flowing through the exchanger coolant passages 910.

Coolant (e.g., from a radiator, such as the radiator 861 shown by FIG. 8) flows through a coolant inlet passage 982 (e.g., such as the first coolant passage 860 shown by FIG. 8) in a direction indicated by arrow 984. The flow of coolant through coolant inlet passage 982 is adjusted by a controller (such as the controller 869 shown by FIG. 8) via actuation (e.g., opening or closing) of valve 988 (e.g., such as valve 862 shown by FIG. 8) disposed within coolant inlet passage 982. A temperature sensor 986 (e.g., such as temperature sensor 858 shown by FIG. 8) is coupled to the coolant inlet passage 982 and may transmit a signal to the controller to indicate a temperature of coolant flowing within the coolant inlet passage 982.

The coolant inlet passage 982 is coupled to a coolant inlet port 990 of the housing 902 of the heat exchanger 900. The coolant inlet port 990 is additionally coupled to the inlet coolant manifold 994, and the inlet coolant manifold 994 is coupled to the exchanger coolant passages 910. Coolant may flow through the coolant inlet passage 982, into the coolant inlet port 990, and through the inlet coolant manifold 994 into exchanger coolant passages 910. In this way, coolant may adjustably flow (via opening or closing of valve 988) from the radiator to the exchanger coolant passages 910 of the heat exchanger 900.

Coolant flows through the exchanger coolant passages 910 and is directed towards the outlet coolant manifold 995 internal to the interior of the housing 902. The outlet coolant manifold 995 is coupled to a coolant outlet port 996 of the housing 902, and the coolant outlet port 996 is additionally coupled to a coolant outlet passage 998 external to the interior of the housing 902. Coolant may flow from the exchanger coolant passages 910, through the outlet coolant manifold 995, into the coolant outlet port 996, and through the coolant outlet passage 998 in a direction indicated by arrow 997.

By configuring the heat exchanger 900 with the exchanger coolant passages 910 in this way, the exchanger coolant passages 910 may selectively receive coolant from the radiator via the inlet coolant manifold 994 coupled to the coolant inlet port 990 of the housing 902 and may return coolant to the radiator via the outlet coolant manifold 995 coupled to the coolant outlet port 996 of the housing 902. The coolant may receive thermal energy from intake air flowing through the exchanger intake passages 703 and/or exhaust gas flowing through the exchanger exhaust passages 709, and the coolant may transfer thermal energy to the radiator. The controller may adjust coolant flow through the radiator (as described in the discussion of FIGS. 11-12 below) via opening or closing of valve 982 in order to adjust an amount of thermal energy exchange (e.g., adjust a temperature) between the coolant, intake air, and exhaust gas. In this way, engine performance may be increased.

FIG. 10 shows a method 1000 for adjusting operation of an energy recovery device (such as the energy recovery device 704 shown by FIG. 7 and FIG. 9) coupled to a heat exchanger (such as the heat exchanger 601 shown by FIG. 6, or the heat exchanger 801 shown by FIG. 8) in response to operating conditions of an engine (such as the engine 168 shown by FIG. 6 and FIG. 8). The method includes increasing, maintaining, or decreasing an output of the energy recovery device via a controller (such as the controller 669 shown by FIG. 6, or the controller 869 shown by FIG. 8) based on signals from sensors (such as the sensors 665 described during the discussion of FIG. 6, or the sensors 865 of FIG. 8) of an engine system (such as the engine system 600 shown by FIG. 6, or the engine system 800 shown by FIG. 8).

The method at 1002 includes estimating and/or measuring engine operating conditions based on one or more outputs of various sensors within in the engine system (e.g., such as various temperature sensors, pressure sensors, etc., as described above) and/or operating conditions of the engine system. Engine operating conditions may include engine speed and load, EGR flow rate (LP and/or HP), mass air flow rate, turbine speed, compressor inlet pressure, emissions control device temperature, coolant flow rate, a demand of one or more electrical components of the engine, exhaust temperatures, intake air temperatures, etc. The operating conditions may also include the operating conditions of the heat exchanger (e.g., energy recovery device electrical output, temperature of exhaust gases within the exhaust system, flow rate of gases through the heat exchanger, etc.).

The method continues to 1004 where the method includes detecting whether the engine is in a cold start condition. A cold start condition may include adjusting the engine from a non-operational state to an operational state while a temperature of the engine is below a threshold temperature. The threshold temperature may be based on a standard operating temperature of the engine during prolonged periods of low to moderate engine load. As an example, the temperature of the engine may be estimated based on a signal transmitted to the controller from one or more sensors configured to detect a temperature of coolant circulating within the engine. The controller may compare the estimated value of engine temperature to the threshold value in order to determine whether the engine is in a cold start condition.

If the controller determines the engine is in a cold start condition at 1004, the method continues to 1014 where the method includes decreasing an output of the energy recovery device of the heat exchanger. The output of the energy recovery device includes an electrical current generated by the energy recovery device. The electrical current is generated in response to a transfer of thermal energy to the energy recovery device from exhaust gas flowing through the energy recovery device. If the output of the energy recovery device cannot be further decreased (for example, if the output is at a minimum output), the controller may maintain the minimum output of the energy recovery device. In another example, the method at 1014 may include turning off the energy recovery device so that no thermal energy is extracted from exhaust gases passing through the energy recovery device and to the heat exchanger.

For example, an amount of thermal energy transferred to the energy recovery device from the exhaust gas may be proportional to a temperature and mass flow rate of the exhaust gas. As a result, the electrical current generated by the energy recovery device may also be proportional to the temperature and mass flow rate of the exhaust gas. During a cold start condition, the exhaust mass flow rate through an exhaust system may be decreased compared to an exhaust mass flow rate during average engine operating conditions (e.g., low to moderate engine load for a prolonged period of time). As a result, an exhaust mass flow rate through the heat exchanger (and energy recovery device) may also be decreased during a cold start condition. The reduced exhaust flow rate through the heat exchanger results in a decreased amount of thermal energy available to the heat exchanger from exhaust gas flow during a cold start condition compared to an amount of thermal energy available to the heat exchanger from exhaust gas flow during engine running conditions when engine temperatures are above a threshold (e.g., cold start thresholds as described above). In response to the cold start condition, the controller may decrease the output of the energy recovery device in order to decrease the amount of thermal energy transferred away from exhaust gas flowing into the heat exchanger (e.g., to decrease cooling of the exhaust gas).

As one example, by decreasing the output of the energy recovery device in this way during a cold start condition, exhaust gas flowing out of the energy recovery device and into exchanger exhaust passages (such as the exchanger exhaust passages 709 shown by FIG. 7 and FIG. 9) may preserve an increased amount of thermal energy compared to exhaust gas that flows through the energy recovery device when output is not decreased. In one example, the preserved thermal energy of the exhaust gas may be utilized by the heat exchanger to heat intake air flowing through exchanger intake passages (such as exchanger intake passages 703 shown by FIG. 7 and FIG. 9). In this way, intake air for secondary air injection may be provided to the exhaust system at a higher temperature to increase an efficiency of an exothermic reaction (as described above in the discussion of FIG. 7).

In an example of decreasing the output of the energy recovery device, the output (e.g., generated electrical current) of the energy recovery device may be decreased by diverting a portion of exhaust gas away from an element of the energy recovery device configured to receive thermal energy from the exhaust gas. The exhaust gas may be diverted via actuation of a valve (not shown) internal to an interior of the energy recovery device by the controller. By adjusting a position (e.g., an amount of opening) of a valve internal to the energy recovery device (such as the valve 785 shown by FIG. 7 and FIG. 9 and described above) via the controller, an amount of exhaust gas flow diverted from the energy recovery device and into the exchanger exhaust passages may be adjusted. In this way, decreasing the amount of opening of the valve decreases the output of the energy recovery device.

If a cold start is not detected at 1004, the method continues to 1006 where the method includes determining whether the engine load is less than a threshold engine load. As an example, engine load may be determined based on engine torque output. In one example, the threshold engine load may be based on an engine torque output typical of a moderate engine operational speed. In another example, the threshold engine load may be indicative of a relatively low engine load where exhaust temperatures and/or exhaust gas flow rates through an exhaust passage may be reduced. One or more sensors coupled to the engine, such as a manifold pressure sensor, temperature sensor, and/or a mass flow sensor, may transmit information (e.g., signals) to the controller. The controller may interpret signals from one or more of the sensors to determine engine load.

If the engine load is determined by the controller to be below the threshold engine load at 1004, the method continues to 1014 where the method includes decreasing an output of the energy recovery device of the heat exchanger, as explained above.

During periods of low engine load (e.g., periods in which measured engine load is lower than the threshold engine load), exhaust mass flow rate may be decreased compared to periods of moderate or high engine load. As a result, the controller may decrease output of the energy recovery device in order to preserve thermal energy of the exhaust gas flowing out of the energy recovery device (as described above). In this way, exhaust gas flowing through the exchanger exhaust passages may transfer thermal energy to intake air flowing through the exchanger intake passages. The exhaust gas may then be returned to the exhaust system at a relatively higher temperature by decreasing energy device output compared to exhaust gases returned to the exhaust system without decreasing energy device output.

If the measured engine load is determined to be at or greater than the threshold engine load at 1006, the method continues to 1008 where the method includes determining whether a temperature of the exhaust gas is less than a threshold exhaust temperature. The temperature of the exhaust gas may be measured by one or more sensors coupled to the exhaust system, such as (but not limited to) the temperature sensor 189 shown by FIG. 6 and FIG. 8. In one example, the threshold exhaust temperature may be based on a temperature for efficient operation of the energy recovery device. As described in the discussion of FIG. 6, a first side of the energy recovery device may be held at a temperature lower than a second side of the energy recovery device in order to increase a temperature gradient (e.g., temperature difference) across the device. In this case, the threshold exhaust temperature may be based on a temperature determined by the controller to sufficiently heat the second side of the energy recovery device to a threshold operational temperature.

If the exhaust temperature is determined by the controller to be below the threshold exhaust temperature at 1008, the method continues to 1014 where the method includes decreasing an output of the energy recovery device of the heat exchanger, as explained above. For example, the controller may decrease output of the energy recovery device until the exhaust temperature entering the heat exchanger has increased to the threshold exhaust temperature in order to provide efficient operation of the energy recovery device.

If the measured exhaust temperature is determined to be at or greater than the threshold exhaust temperature at 1008, the method continues to 1010 where the method includes determining whether regeneration of a diesel particulate filter (DPF) or a gasoline particulate filter (GPF) is active. For example, prior to the determination at 1010, the controller may have initiated regeneration of an engine particulate filter (DPF for an engine utilizing diesel fuel, or GPF for an engine utilizing gasoline fuel).

If the controller determines that the regeneration of the engine particulate filter is active at 1010, the method continues to 1014 where the method includes decreasing an output of the energy recovery device of the heat exchanger, as explained above. Decreasing the output of the energy recovery device of the heat exchanger in response to an active regeneration of the engine particulate filter may result in an increased temperature of exhaust gases flowing out of the heat exchanger. The increased temperature of the exhaust gases may increase the efficiency of the regeneration of the engine particulate filter.

If the controller determines that the regeneration of the engine particulate filter is not active at 1010, the method continues to 1012 where the method includes increasing or maintaining an output of the energy recovery device of the heat exchanger. In one example, the engine may be operating with an increased engine load and/or an increased exhaust temperature. The output of the energy recovery device may be increased in order to utilize the additional thermal energy supplied to the heat exchanger. In a second example, the controller may increase low-pressure EGR flow and/or high-pressure EGR flow as engine load increases and/or in response to additional engine operating conditions. In this case, the output of the energy recovery device may be increased to reduce the temperature of the exhaust gas flowing out of the energy recovery device in order to reduce a temperature of exhaust gases for EGR injection. In a third example, the engine may be operating with a relatively constant engine load for a prolonged period of time and the controller may have implemented an efficient rate of output for the energy recovery device according to the engine load. In this situation, the output of the energy recovery device may be maintained (e.g., not adjusted by the controller) in order to continue to provide an efficient amount of electrical energy generation to the engine system.

FIG. 11 shows a method 1100 for adjusting flow of intake air, exhaust gas, and/or coolant through a heat exchanger (such as the heat exchanger 700 shown in FIG. 7 and/or the heat exchanger 900 shown by FIG. 9) in response to an output of an energy recovery device (such as energy recovery device 704 shown by FIGS. 7 and 9). As described below, adjustment of one or more flows may be based on an exhaust temperature at a location within an exhaust system. Alternately, adjustment of one or more flows may be based on an estimated temperature of exhaust gases within the heat exchanger according to energy recovery device output.

At 1102, the method includes estimating and/or measuring engine operating conditions based on one or more outputs of various sensors in the engine system and/or operating conditions of the engine system (e.g., such as various temperature sensors, pressure sensors, etc., as described above). Engine operating conditions may include engine speed and load, EGR flow rate (LP and/or HP), mass air flow rate, turbine speed, compressor inlet pressure, emissions control device temperature, coolant flow rate, etc. The operating conditions may also include the operating conditions of the heat exchanger (e.g., energy recovery device electrical output, temperature of exhaust gases and/or intake air near the heat exchanger, flow rate of gases through the heat exchanger, etc.).

At 1104 the method includes determining whether an output of the energy recovery device is greater than a threshold output. As described above in the discussion of FIG. 10, the output of the energy recovery device includes an electrical current generated by the device in response to a temperature gradient across the device (e.g., a temperature difference between a first side of the device and a second side of the device). As the magnitude of the temperature gradient across the device increases, the electrical current generated by the device also increases. In other words, the output of the device is proportional to an amount of thermal energy transferred to the device.

The threshold output (e.g., threshold electrical current) may correspond to a specific magnitude of electrical current generated by the device. For example, a controller (such as the controller 869 shown by FIG. 8) may receive an electrical signal from the energy recovery device. The controller may then compare the magnitude of the received electrical current to the threshold electrical current in order to determine whether the received electrical current is greater than the threshold electrical current. The threshold electrical current may be based in part on a minimum electrical current that indicates that the energy recovery device is operating and removing thermal energy from exhaust gases passing through the energy recovery device. In one example, the threshold electrical current may be a non-zero threshold. In another example, threshold electrical current may be substantially zero such that when the energy recovery device output is above threshold it is operating and producing current via removing heat from exhaust gases passing through the device.

If the controller determines at 1104 that the output of the energy recovery device is not greater than the threshold output, the method continues to 1106 where the method includes adjusting one or more of intake, exhaust, or coolant flows through the heat exchanger based on a temperature of exhaust gas within the exhaust system, upstream of the heat exchanger. For example, the controller may receive a signal from one or more temperature sensors coupled to the exhaust system at one or more locations (e.g., coupled to an exhaust manifold, coupled downstream of a first emissions control device, etc.). The controller may utilize the signals from the temperature sensors to determine the temperature of exhaust gas flowing through the exhaust system. In response to the determined temperature, the controller may adjust a flow of intake air, exhaust gas, and/or coolant through the heat exchanger via actuation of one or more valves coupled to the heat exchanger (e.g., such as the four-way valve 633 shown by FIG. 6 and FIG. 8).

In one example, the controller may increase coolant flow through the heat exchanger in response to the determined temperature (as described above) in order to cool one or more of the intake air and exhaust gas flowing through the heat exchanger, or the controller may decrease coolant flow through the heat exchanger in order to increase a temperature of one or more of the intake air and exhaust gas flowing through the heat exchanger. While the energy recovery device operates with an output below the threshold output, a decreased amount of thermal energy is transferred away from exhaust gas flowing through the energy recovery device. The adjustment of coolant flow through the heat exchanger by the controller may compensate for a reduced cooling effect of the energy recovery device due to the reduced output of the energy recovery device.

In another example, the controller may increase intake air flow through the heat exchanger in response to the determined temperature of exhaust gas in the exhaust system in order to decrease a temperature of exhaust gas flowing through the heat exchanger, or the controller may decrease intake air flow through the heat exchanger in order to increase the temperature of exhaust gas flowing through the heat exchanger. In this way, the flow of intake air through the heat exchanger may provide an additional method of adjusting the temperature of exhaust gas flowing through the heat exchanger. The flow of intake air may also be utilized to adjust the temperature of exhaust gas flowing through a heat exchanger that does not include coolant flow (e.g., such as the embodiment of the heat exchanger 700 shown by FIG. 7).

In yet another example, adjusting the flow of exhaust gas through the heat exchanger may adjust the temperature of the intake air flowing through the heat exchanger. The controller may increase a flow of exhaust gas through the heat exchanger in order to increase a temperature of intake air flowing through the heat exchanger, or the controller may decrease the flow of exhaust gas through the heat exchanger in order to decrease the temperature of intake air flowing through the heat exchanger. The increased temperature of the exhaust gas flowing through the heat exchanger due to the decreased amount of thermal energy transferred away from exhaust gas by the energy recovery device enables a more efficient heating of the intake air flowing through the heat exchanger.

If the controller determines at 1104 that the output of the energy recovery device is not lower than the threshold output, the method continues to 1108 where the method includes estimating exhaust gas temperature entering the heat exchanger from the energy recovery device based on an output of the energy recovery device. In other words, when the electrical current generated by the energy recovery device is greater than a threshold electrical current, the controller may estimate the temperature of exhaust gas entering and flowing through the heat exchanger based on a magnitude of the electrical current generated by the energy recovery device.

As described above, the magnitude of the electrical current generated by the energy recovery device may be proportional to a temperature difference between a first side of the device and a second side of the device. The first side of the device may be in approximate thermal equilibrium with a first temperature reservoir (as described above in the discussion of FIG. 6) such as ambient air, engine coolant, etc., and the temperature of the first temperature reservoir may be determined by the controller via signals from one or more temperature sensors arranged proximate to the first temperature reservoir. The magnitude of the electrical current generated by the energy recovery device can then be interpreted by the controller in order to calculate a difference in temperature between the first side of the energy recovery device and the second side of the energy recovery device based on instructions stored in a non-transitory memory of the controller. The controller may then estimate the temperature of exhaust gases flowing through the heat exchanger based on the calculated difference in temperature between the first side of the energy recovery device and the second side of the energy recovery device.

After the controller has estimated the temperature of exhaust gas flowing through the heat exchanger at 1108, the method continues to 1110 where the method includes adjusting one or more of intake air, exhaust gas, or coolant flows through the heat exchanger based on the estimated temperature of exhaust gas. As described above (e.g., with reference to 1106), adjusting one or more of coolant flow, intake air flow, or exhaust gas flow through the heat exchanger may adjust a temperature of the intake air and/or the exhaust gas flowing through the heat exchanger.

In one example of the method at 1110, as shown at 1112, the method includes adjusting the intake air flow through the heat exchanger based on the estimated temperature of exhaust gas. For example, the intake air flow may be increased in order to decrease the temperature of the exhaust gas, or the intake air flow may be decreased in order to increase the temperature of the exhaust gas. As one example, increasing the intake air flow may include adjusting an amount of opening of a valve coupled to an intake air outlet of the heat exchanger. The valve (such as three-way valve 754 or valve 748 shown by FIG. 7 and FIG. 9) may be opened or closed to a passage coupled between the heat exchanger and one of either an intake system or the exhaust system.

In a first example of adjusting intake air flow through the heat exchanger based on the estimated temperature of exhaust gas, if the estimated temperature of exhaust gas is above a threshold temperature, intake air flow may be increased in order to heat the intake air for secondary air injection into the exhaust system (e.g., to increase an efficiency of the SAD, or decreased in order to increase a flow of intake air through the intake system (e.g., increasing intake air flow through the intake system by decreasing an amount directed toward the heat exchanger).

In a second example of adjusting intake air flow through the heat exchanger based on the estimated temperature of exhaust gas, if the estimated temperature of exhaust gas is below the threshold temperature, intake air flow may be increased in order to reduce a risk of compressor surge without appreciably heating the intake air (e.g., by reducing thermal energy exchange between the intake air and exhaust gas), or decreased in order to increase the flow of intake air through the intake system (as described above).

In another example of the method at 1110, at 1114 the method includes adjusting the exhaust gas flow through the heat exchanger based on the estimated temperature of the exhaust gas. For example, the exhaust gas flow may be increased in order to increase an amount of thermal energy transferred to the energy recovery device and/or to increase a temperature of the intake air flowing through the heat exchanger. In other words, an increase in exhaust flow may increase an output of the energy recovery device. As another example, the exhaust gas flow may be decreased if controller determines that transfer of thermal energy to the energy recovery device be decreased (e.g., if a battery coupled to the energy recovery device is fully charged), and/or a decrease in the temperature of the intake air flowing through the heat exchanger is desired. As one example, increasing the exhaust gas flow may include adjusting an amount of opening of a valve coupled to an exhaust gas outlet of the heat exchanger. The valve (such as four-way valve 768 shown by FIG. 7 and FIG. 9) may be opened or closed to one or more passages coupled between the heat exchanger and the intake system and/or the exhaust system.

In a first example of adjusting exhaust gas flow through the heat exchanger based on the estimated temperature of exhaust gas, if the estimated temperature of exhaust gas is above the threshold temperature, exhaust gas flow may be increased in order to increase the output of the energy recovery device (e.g., to increase an amount of exhaust gas transferring thermal energy to the energy recovery device) or to increase an efficiency of a second emissions control device arranged within the exhaust system (e.g., to reduce an operating temperature of the second emissions control device below a threshold temperature for efficient NOx removal from exhaust gas, for example), or decreased in order to increase an amount of cooling of the exhaust by the intake air and/or coolant in order to supply the cooled exhaust to the intake system as HP EGR (e.g., by decreasing an amount of exhaust gas flowing through the heat exchanger, the temperature of the exhaust gas is adjusted more quickly by the flows of intake air and/or coolant).

In a second example of adjusting exhaust gas flow through the heat exchanger based on the estimated temperature of exhaust gas, if the estimated temperature of exhaust gas is below the threshold temperature, exhaust gas flow may be increased in order to increase the output of the energy recovery device (e.g., if a threshold charge of the battery or a threshold electrical demand of engine system has not been met), or decreased in order to increase an efficiency of the second emissions control device (e.g., by increasing the operating temperature of the second emissions control device above a threshold temperature for efficient NOx removal from exhaust gas, for example).

In yet another example of the method at 1110, at 1116 the method includes adjusting the coolant flow through the heat exchanger based on the estimated temperature of the exhaust gas if the heat exchanger is configured for coolant flow (e.g., such as the heat exchanger 900 shown by FIG. 9). For example, although the energy recovery device receives thermal energy from the exhaust gas (and lowers the temperature of the exhaust gas), in some situations additional cooling may be desired (e.g., in order to provide more efficient EGR to the engine). As one example, increasing the coolant flow may include adjusting an amount of opening of a valve coupled to a coolant outlet of the heat exchanger. The valve (such as valve 988 shown by FIG. 9) may be opened or closed to a passage coupled between the heat exchanger and a radiator.

In a first example of adjusting coolant flow through the heat exchanger based on the estimated temperature of exhaust gas, if the estimated temperature of exhaust gas is above the threshold temperature, coolant flow may be increased in order to increase an amount of cooling of the exhaust gas by the coolant (e.g., to lower the temperature of the exhaust gas for EGR injection in order to reduce engine degradation), or decreased in order to reduce the amount of cooling of the exhaust gas by the coolant (to increase the transfer of thermal energy from the exhaust gas to the intake air for secondary air injection, for example).

In a second example of adjusting exhaust gas flow through the heat exchanger based on the estimated temperature of exhaust gas, if the estimated temperature of exhaust gas is below the threshold temperature, coolant flow may be increased in order to provide additional cooling of the exhaust gas (e.g., for EGR injection as described above), or decreased if additional cooling is not desired (e.g., if the energy recovery device is sufficiently cooling the exhaust gas via transfer of thermal energy from the exhaust gas to the energy recovery device).

By determining an adjustment to flows of intake air, exhaust gas, and/or coolant flow based on either the estimated exhaust temperature within the heat exchanger or the measured exhaust temperature within the exhaust system (with determination made in response to energy recovery device output), the temperature of exhaust gas flowing from the heat exchanger may be controlled with increased precision. For example, the estimated exhaust temperature provides the controller with additional information about the condition of gases flowing through the heat exchanger (e.g., information additional to the temperature of the exhaust gas as it was measured before flowing into the energy recovery device of the heat exchanger). In this way, the controller may more precisely adjust flows of intake air and exhaust gas from the heat exchanger in order to provide EGR injection and secondary air injection at desired temperatures to increase engine performance.

FIG. 12 shows a graphical example of adjustments to an output of an energy recovery device (e.g., such as the energy recovery device 704 shown by FIGS. 7 and 9) in response to engine operating conditions, as well as adjustments to one or more of intake air flow, exhaust gas flow, or coolant flow through a heat exchanger (e.g., such as the heat exchanger 900 shown by FIG. 9) in response to energy recovery device output (which may be an amount of electrical current output by the energy recovery device, in one example).

Specifically, graph 1200 shows changes in engine torque output at plot 1202, changes in energy recovery device output at plot 1206, changes in exhaust temperature within an exhaust system upstream of the heat exchanger at plot 1210, changes in estimated exhaust temperature entering the heat exchanger at plot 1212 and plot 1214, changes in intake air flow through the heat exchanger at plot 1216, changes in exhaust flow through the heat exchanger at plot 1218, and changes in coolant flow through the heat exchanger at plot 1220.

The exhaust temperature in the exhaust system may be determined by a controller (such as controller 869 shown by FIG. 8) based on a signal from one or more temperature sensors coupled to the exhaust system. The intake air flow, exhaust air flow, and coolant flow to the heat exchanger may all be delivered by a plurality of passages arranged between the heat exchanger and a radiator, an intake system, and the exhaust system (and by adjustments to valves disposed within those passages), such as the passages described above with reference to FIGS. 6-9.

The controller may actuate actuators coupled to the various valves in order to adjust the flow of intake air, exhaust gas, and/or coolant to the heat exchanger from the intake system, exhaust system, and radiator, respectively, as described below.

Prior to time t1, engine torque output is increasing (plot 1202). Temperature of exhaust gas within the exhaust system (plot 1206) is also increasing. In one example, the increase in engine torque output and increase in temperature of exhaust gas within the exhaust system may be a result of an engine cold start (e.g., the engine adjusted from a non-operational state to an operational state). Despite the increase in exhaust temperature, the temperature of the exhaust gas within the exhaust system is below a threshold temperature (plot 1214). As a result, the output of the energy recovery device (plot 1206) is below a threshold output (plot 1208). In response to the output of the energy recovery device, the flow of intake air through the heat exchanger (plot 1216), the flow of exhaust gas through the heat exchanger (plot 1218), and the flow of coolant through the heat exchanger (plot 1220) are adjusted based on the temperature of the exhaust gas in the exhaust system. Specifically, the flow of each of intake air, exhaust gas, and coolant increases.

Between time t1 and t2, the engine torque output (plot 502) remains relatively constant, and the engine is indicated to possess a relatively low load. This may correspond to a warm-up phase of the engine, and/or or a cruising phase in which torque output remains low. The engine torque output is below a threshold torque output (plot 1204) between time t1 and t2. Additionally, the temperature of exhaust gas in the exhaust system (plot 1210) is below a threshold exhaust temperature (plot 1215). In response to both the low (e.g., below threshold) engine torque output and the low temperature of exhaust gas in the exhaust system, the output of the energy recovery device (plot 1206) is not increased. Although the temperature of exhaust gas in the exhaust system is below the threshold temperature between time t1 and t2, the temperature of the exhaust gas continues to increase. Intake air flow, exhaust gas flow, and coolant flow through the heat exchanger each continue to increase in response to the temperature of the exhaust gas within the exhaust system.

At time t2, engine torque output (plot 1202) reaches the threshold torque output (plot 1204). Additionally, temperature of exhaust gas in the exhaust system (plot 1210) reaches the threshold exhaust temperature (plot 1215). Between time t2 and t3, engine torque output (plot 1202) and the temperature of exhaust gas in the exhaust system (plot 1210) continue to increase. In response to the increased torque output and increased exhaust temperature (e.g., the torque output exceeding the threshold torque output, and the exhaust temperature exceeding the threshold exhaust temperature), the output of the energy recovery device (plot 1206) increases. Intake air flow (plot 1216) and exhaust gas flow (plot 1218) to the heat exchanger remain approximately constant while coolant flow (plot 1220) increases slightly in response to the increasing temperature of the exhaust gas within the exhaust system.

At time t3, the output of the energy recovery device (plot 1206) reaches the threshold output (plot 1208). Between time t3 and t4, engine torque output (plot 1202) remains approximately constant above the threshold torque output (plot 1204). The controller estimates a temperature of exhaust gas within the heat exchanger (plot 1212) in response to the increased output of the energy recovery device (e.g., in response to the output of the device exceeding the threshold output). The estimated exhaust temperature is initially lower than the temperature of exhaust gas in the exhaust system (plot 1210) due to the transfer of thermal energy from the exhaust gas to the energy recovery device (as described above in the discussion of FIGS. 10-11). As the output of the energy recovery device increases, the difference between the temperature of the exhaust gas in the exhaust system and the estimated temperature of the exhaust gas in the heat exchanger also increases. In other words, as the output of the energy recovery device increases, the estimated temperature of the exhaust gas in the heat exchanger is decreased relative to the measured temperature of exhaust gas in the exhaust system (due to the transfer of energy described above). The flows of intake air, exhaust gas, and coolant through the heat exchanger between time t2 and t3 are each adjusted in response to the estimated temperature of exhaust gas within the heat exchanger (e.g., the flows are not adjusted based on the measured temperature of exhaust gas within the exhaust system). Specifically, flow of intake air to the heat exchanger (plot 1216) decreases in response to the estimated exhaust temperature, exhaust gas flow to the heat exchanger (plot 1218) increases in response to the estimated exhaust temperature, and coolant flow to the heat exchanger (plot 1220) slightly increases in response to the estimated exhaust temperature. The increase in exhaust gas flow and decrease in intake air flow may be the result of the reduced estimated exhaust temperature within the heat exchanger relative to the measured exhaust temperature within the exhaust system.

Between time t4 and t5, engine torque output (plot 1202) sharply increases. In one example, the increase in engine torque output may be accompanied by a signal from the controller to the engine to initiate a regeneration of an engine particulate filter (e.g., a diesel particulate filter, gasoline particulate filter, etc.) due to an anticipated increase in exhaust gas temperature. In response to the particulate filter regeneration, the output of the energy recovery device (plot 1206) decreases (as described in the discussion of FIG. 10). However, between time t4 and t5, the output of the energy recovery device is above the threshold output (plot 1208), and in response, the controller continues to estimate the temperature of exhaust gas within the heat exchanger (plot 1212). As the output of the energy recovery device decreases, the estimated exhaust gas temperature within the heat exchanger approaches the measured exhaust temperature within the exhaust system (plot 1210). The estimated exhaust temperature and the measured exhaust temperature between t4 and t5 both increase due to the increased engine torque output. In response to the increased estimated exhaust temperature, the controller increases the flow of intake air through the heat exchanger (plot 1216) and increases the flow of coolant through the heat exchanger (plot 1220). The controller also decreases the flow of exhaust gas through the heat exchanger (plot 1218).

At time t5, the output of the energy recovery device (plot 1206) decreases below the threshold output (plot 1208). Between time t5 and t6, engine torque output (plot 1202) continues to increase. In response to the output of the energy recovery device decreasing below the threshold output at t5, the controller does not continue to estimate the temperature of exhaust gas within the heat exchanger between time t5 and t6. Additionally, the intake air flow (plot 1216), exhaust gas flow (1218), and coolant flow (plot 1220) through the heat exchanger are adjusted by the controller in response to the measured temperature of exhaust gas within the exhaust system (plot 1210). For example, the measured temperature of exhaust gas in the exhaust system between time t5 and t6 is greater than the last estimated temperature of exhaust gas within the heat exchanger at time t5. In response to the relative increase in exhaust temperature (e.g., the measured temperature compared to the previously estimated temperature), the controller increases intake air flow and coolant flow through the heat exchanger and reduces exhaust gas flow through the heat exchanger.

At time t6, engine torque output (plot 1202) stops increasing and begins to decrease. In one example, the change in engine torque output may be accompanied by a conclusion of the regeneration of the engine particulate filter (as described above). In response to the conclusion of the particulate filter regeneration, energy recovery device output (plot 1206) begins to increase. Between time t6 and time t7, engine torque output is decreasing, energy device output is increasing, and the temperature of exhaust gas within the exhaust system (plot 1210) is increasing (e.g., increasing due to residual heat from particulate filter regeneration). The energy recovery device output is below the threshold output (plot 1208), and in response, the intake air flow (plot 1216), exhaust gas flow (plot 1218), and coolant flow (plot 1220) through the heat exchanger are adjusted based on the temperature of exhaust within the exhaust system. The intake air flow and exhaust gas flow are slightly adjusted (e.g., increased and decreased, respectively) but remain relatively constant. The coolant flow is increased.

At time t7, energy recovery device output (plot 1206) increases to the threshold output (plot 1208). Between time t7 and t8, engine torque output (plot 1202) is decreasing and the temperature of exhaust gas within the exhaust system (plot 1210) is decreasing. Energy recovery device output increases and then remains relatively constant as intake air flow (plot 1216), exhaust gas flow (plot 1218), and coolant flow (plot 1220) through the heat exchanger are each adjusted in response to an estimated exhaust temperature within the heat exchanger (plot 1214). The estimated exhaust temperature is generated by the controller (as described above with reference to the estimated exhaust temperature shown by plot 1212) in response to the output of the energy recovery device surpassing the threshold output at t7. As the output of the energy recovery device increases, the amount of thermal energy transferred away from the exhaust gas entering the heat exchanger also increases. As a result, a difference between the estimated temperature of the exhaust gas within the heat exchanger and the measured temperature of exhaust gas within the exhaust system increases in unison with the energy recovery device output. In other words, as the energy recovery device output increases, the estimated temperature of exhaust gas within the heat exchanger decreases relative to the measured exhaust gas temperature. In response to the decreasing estimate of exhaust temperature within the heat exchanger, the controller decreases the intake air flow (plot 1216) to the heat exchanger, increases the exhaust gas flow (plot 1218) to the heat exchanger, and decreases the coolant flow (plot 1220) to the heat exchanger.

At time t8, the engine torque output (plot 1202) decreases below the threshold torque output (plot 1204). Between times t8 and t9, in response to the engine torque output decreasing below the threshold torque output at time t8, the engine recovery device output (plot 1206) begins to decrease. As a result of the energy recovery device output decreasing, the estimated exhaust temperature within the heat exchanger (plot 1214) begins to approach the measured temperature of exhaust within the exhaust system (plot 1210). However, due to the decreased engine torque output, both the estimated exhaust temperature and the measured exhaust temperature are decreasing between times t8 and t9. In response to the decreasing estimate of exhaust temperature within the heat exchanger, the controller increases the exhaust gas flow (plot 1218) to the heat exchanger, increases the intake air flow (plot 1216) to the heat exchanger, and decreases the coolant flow (plot 1220) to the heat exchanger. In one example, the exhaust flow and intake flow may be increased in order to reduce a risk of compressor surge as indicated by the decreasing estimate of exhaust temperature within the heat exchanger.

At time t9, the engine torque output (plot 1202) has increased above the threshold torque output (plot 1204). After time t9, the engine torque output remains approximately constant with occasional small fluctuations. The output of the energy recovery device (plot 1206) increases and then remains approximately constant above the threshold output (plot 1208). In response to the output of the energy recovery device, the controller continues to estimate the temperature of exhaust gas within the heat exchanger (plot 1214). The controller adjusts the flows of intake air flow (plot 1216), exhaust gas flow (plot 1218), and coolant flow (plot 1220) in response to the estimated exhaust temperature. The intake air flow is adjusted to decrease and then remain approximately constant, the exhaust flow is adjusted to remain approximately constant, and the coolant flow is adjusted to decrease and then remain approximately constant.

In this way, the controller within the engine system may regulate the flow of gases to the heat exchanger from the intake system and/or the exhaust system based on engine operating conditions. The controller may also regulate the flow of gases from the heat exchanger to one or more locations within the intake system and one or more locations within the exhaust system based on engine operating conditions. The flow of gases and/or coolant to/from the heat exchanger may be influenced at least in part by the temperature of the output of the energy recovery device, and one of either the measured temperature of exhaust gas within the exhaust system or the estimated temperature of exhaust gas within the heat exchanger. The controller may compared the energy recovery device output to the threshold output to adjust flows of intake air, exhaust gas, and/or coolant through the heat exchanger based on the estimated exhaust temperature or the measured exhaust temperature. The technical effect of adjusting intake air flow, exhaust gas flow, and/or coolant flow to the heat exchanger in response to energy recovery device output is to control the temperature of the gases discharged from the heat exchanger to the intake/exhaust system, and to generate electrical energy efficiently using the energy recovery device. In one example, the flow of gases and/or coolant to the heat exchanger may be adjusted in order to increase the conversion of thermal energy of exhaust gas into electrical energy by the energy recovery device. In another example, the output of the energy recovery device may be adjusted in order to increase or decrease the estimated temperature of exhaust gas within the heat exchanger. In this way, the temperature of the gases can be controlled and provided for SAI, LP EGR, HP EGR, and compressor surge reduction to increase engine efficiency. Additionally, exhaust gas thermal energy can be utilized as electrical energy via the energy recovery device of the heat exchanger, and engine performance may be increased.

In one embodiment, a method for a gas mixing tank reservoir includes adjusting a flow of coolant through a gas mixing tank reservoir fluidly coupled to each of an intake system and exhaust system of an engine in response to a request to supply one or more of secondary air injection to the exhaust system and exhaust gas recirculation to the intake system via the reservoir, based on a temperature of the coolant entering the reservoir. In a first example of the method, the method includes after adjusting the flow of coolant through the reservoir, supplying the one or more of secondary air injection and exhaust gas recirculation as requested in response to a temperature of gases within the reservoir being at a desired temperature, where the desired temperature is based on an indicated location for injecting the gases from the reservoir to one or more of the intake system and exhaust system. A second example of the method optionally includes the first example and further includes when the request is a request to supply secondary air injection to the exhaust system, selectively supplying secondary air injection to an exhaust manifold and turbine bypass disposed around a turbine based on a first temperature of a pre-turbine catalyst and second temperature of a post-turbine catalyst. A third example of the method optionally includes one or more or both of the first and second examples, and further includes wherein selectively supplying secondary sir injection includes supplying secondary air injection to the exhaust manifold in response to the first temperature being below a first catalyst light off temperature of the pre-turbine catalyst and supplying secondary air injection to the turbine bypass in response to the second temperature being below a second catalyst light off temperature of the post-turbine catalyst. A fourth example of the method optionally includes one or more or each of the first through third examples, and further includes wherein, in response to the request being a request to supply secondary air injection to the exhaust system, adjusting the flow of coolant includes: increasing the flow of coolant through the reservoir when the coolant temperature is greater than a threshold temperature; and decreasing the flow of coolant through the reservoir when the coolant temperature is less than the threshold temperature. A fifth example of the method optionally includes one or more or each of the first through fourth examples, and further includes after adjusting the flow of coolant through the reservoir, delaying supplying the secondary air injection to the exhaust system until the coolant temperature reaches a desired coolant temperature for secondary air injection. A sixth example of the method optionally includes one or more or each of the first through fifth examples, and further includes wherein the threshold temperature is adjusted based on a gas temperature within the reservoir before the adjusting and the desired coolant temperature for secondary air injection. A seventh example of the method optionally includes one or more or each of the first through sixth examples, and further includes wherein adjusting the flow of coolant includes maintaining a current flow of coolant through the reservoir in response to the request being a request to supply secondary air injection to the exhaust system in order to increase turbine speed only, regardless of the temperature of the coolant entering the reservoir. An eighth example of the method optionally includes one or more or each of the first through seventh examples, and further includes wherein, in response to the request being a request to supply low pressure exhaust gas recirculation to the intake system, upstream of a compressor, adjusting the flow of coolant includes: increasing the flow of coolant through the reservoir when the coolant temperature is greater than a threshold temperature and condensate is indicated at the compressor or when the coolant temperature is less than the threshold temperature and condensate is not indicated at the compressor; and decreasing the flow of coolant through the reservoir when the coolant temperature is greater than the threshold temperature and condensate is not indicated at the compressor or when the coolant temperature is less than the threshold temperature and condensate is indicated at the compressor. A ninth example of the method optionally includes one or more or each of the first through eighth examples, and further includes wherein, in response to the request being a request to supply high pressure exhaust gas recirculation to the intake system, downstream of a compressor, adjusting the flow of coolant includes: increasing the flow of coolant through the reservoir when the coolant temperature is less than a threshold temperature; and decreasing the flow of coolant through the reservoir when the coolant temperature is greater than the threshold temperature. A tenth example of the method optionally includes one or more or each of the first through ninth examples, and further includes adjusting the flow of coolant through the reservoir in response to a request to supply air injection to the intake system, upstream of a compressor, based on compressor surge, wherein adjusting the flow of coolant includes: increasing the flow of coolant through the reservoir when the coolant temperature is greater than a threshold temperature; and decreasing the flow of coolant through the reservoir when the coolant temperature is less than the threshold temperature. An eleventh example of the method optionally includes one or more or each of the first through tenth examples, and further includes storing gases from one or more of the intake system and exhaust system in response to one or more of an amount of charge stored within the gas mixing tank reservoir being below a threshold level, boost pressure greater than a desired boost pressure for torque demand, and a deceleration fuel shut off condition.

In another embodiment, a method for a gas mixing tank reservoir includes during a first condition, circulating coolant to a gas mixing tank reservoir arranged between and intake system and exhaust system of an engine and providing one or more of secondary air injection to the exhaust system and exhaust gas recirculation to the intake system via the gas mixing tank reservoir; and during a second condition, not circulating coolant to the gas mixing tank reservoir and providing one or more of secondary air injection to the exhaust system and exhaust gas recirculation to the intake system via the gas mixing tank reservoir. In a first example of the method, the method includes wherein the first condition includes in response to one or more of: a request to provide secondary air injection to the exhaust system when a temperature of coolant entering the gas mixing tank reservoir is greater than a first threshold temperature; a request to provide low pressure exhaust gas recirculation to the intake system, upstream of a compressor, when the temperature of the coolant is greater than a second threshold temperature and condensate is indicated at the compressor; a request to provide low pressure exhaust gas recirculation to the intake system, upstream of the compressor, when the temperature of the coolant is at or less than the second threshold temperature and condensate is not indicated at the compressor; and a request to provide high pressure exhaust gas recirculation to the intake system, downstream of the compressor, when the temperature of the coolant is at or less than a third threshold temperature. A second example of the method optionally includes the first example and further includes wherein the second condition includes in response to one or more of: a request to provide secondary air injection to the exhaust system when a temperature of coolant entering the gas mixing tank reservoir is at or less than a first threshold temperature; a request to provide low pressure exhaust gas recirculation to the intake system, upstream of a compressor, when the temperature of the coolant is greater than a second threshold temperature and condensate is not indicated at the compressor; a request to provide low pressure exhaust gas recirculation to the intake system, upstream of the compressor, when the temperature of the coolant is at or less than the second threshold temperature and condensate is indicated at the compressor; and a request to provide high pressure exhaust gas recirculation to the intake system, downstream of the compressor, when the temperature of the coolant is greater than a third threshold temperature. A third example of the method optionally includes one or more or both of the first and second examples, and further includes during the first condition and second condition, delaying providing one or more of the secondary air injection and exhaust gas recirculation via the gas mixing tank reservoir until a gas temperature within the gas mixing tank reservoir reaches a desired temperature, where the desired temperature is based on a requested location in the intake system or exhaust system for injecting gases from the gas mixing temperature reservoir.

In one embodiment, a system for an engine includes a gas mixing tank reservoir positioned between an intake system and exhaust system of the engine including: a first gas inlet port fluidly coupled to an exhaust manifold; a second gas inlet port fluidly coupled to an intake passage downstream of a compressor; a first gas outlet port fluidly coupled to the intake passage; a second gas outlet port fluidly coupled to the exhaust system; coolant passages configured to flow coolant through the reservoir; and a first valve fluidly coupled to the coolant passages and configured to adjust the flow of coolant through the coolant passages. In a first example of the system for an engine, the system for an engine includes a controller including computer readable instructions for adjusting a position of the first valve in response to a request to supply one or more of gas stored within the reservoir to the exhaust system via the second gas outlet port and gas stored within the reservoir to the intake system via the first gas outlet port, based on a temperature of the coolant entering the coolant passages. A second example of the system for an engine optionally includes the first example and further includes wherein the second gas outlet port is selectively coupled via a second valve to each of the exhaust manifold and turbine bypass passage disposed around a turbine of the exhaust system. A third example of the system for an engine optionally includes one or more or both of the first and second examples, and further includes wherein the first gas outlet port is fluidly coupled to the intake passage upstream of the compressor and wherein the gas mixing tank reservoir further comprises a third gas outlet port fluidly coupled to the intake passage downstream of the compressor.

In one embodiment, a method for a heat exchanger includes flowing intake air through the heat exchanger and selectively to each of an intake system and an exhaust system; flowing exhaust gas through an energy recovery device coupled with the heat exchanger, through the heat exchanger, and selectively to each of the intake and exhaust system; and adjusting the flow of intake air and exhaust gas through the heat exchanger in response to an output of the energy recovery device. In a first example of the method, the method includes wherein flowing exhaust gas includes flowing exhaust gas directly from the energy recovery device to the heat exchanger and wherein the flow of intake air and exhaust gas do not mix within the heat exchanger. A second example of the method optionally includes the first example and further includes during flowing intake air and exhaust through the heat exchanger, transferring thermal energy between the intake air and exhaust gas within the heat exchanger. A third example of the method optionally includes one or more or both of the first and second examples, and further includes adjusting a flow of coolant through the heat exchanger in response to the output of the energy recovery device. A fourth example of the method optionally includes one or more or each of the first through third examples, and further includes wherein adjusting the flow of coolant includes decreasing the flow of coolant through the heat exchanger as the output of the energy recovery device increases. A fifth example of the method optionally includes one or more or each of the first through fourth examples, and further includes wherein adjusting the flow of intake air and exhaust gas through the heat exchanger includes one or more of decreasing the flow of intake air through the heat exchanger as the output of the energy recovery device increases, or decreasing the flow of exhaust gas through the heat exchanger as the output of the energy recovery device increases toward a threshold energy output. A sixth example of the method optionally includes one or more or each of the first through fifth examples, and further includes estimating a temperature of exhaust gas entering the heat exchanger from the energy recovery device based on the output of the energy recovery device and one or more of a temperature of the exhaust gas in the exhaust system and engine load. A seventh example of the method optionally includes one or more or each of the first through sixth examples, and further includes operating the energy recovery device in response to one or more of an engine torque output increasing above a threshold engine torque output, and an exhaust gas temperature within the exhaust system increasing above a threshold exhaust gas temperature. An eighth example of the method optionally includes one or more or each of the first through seventh examples, and further includes not operating the energy recovery device in response to one or more of an engine torque output decreasing below a threshold engine torque output, an exhaust gas temperature within the exhaust system decreasing below a threshold exhaust gas temperature, an active particulate filter regeneration, and an engine cold start, and flowing exhaust gas through the energy recovery device, without transferring heat from the exhaust gas, and to the heat exchanger. A ninth example of the method optionally includes one or more or each of the first through eighth examples, and further includes wherein flowing intake air through the heat exchanger and selectively to each of the intake system and the exhaust system includes adjusting a first valve to adjust the flow of intake air from the heat exchanger to the intake system, upstream of a compressor, and adjusting a second valve to adjust the flow of intake air from the heat exchanger to each of a location in the exhaust system upstream of a first catalyst and a location in the exhaust system downstream of the first catalyst. A tenth example of the method optionally includes one or more or each of the first through ninth examples, and further includes wherein flowing exhaust gas through the heat exchanger and selectively to each of the intake and exhaust system includes adjusting a single valve to adjust the flow of exhaust gas to each of the intake system upstream of a compressor, the intake system downstream of the compressor, and the exhaust system upstream of a turbine.

In one embodiment, a system includes: a heat exchanger coupled to each of an intake system and exhaust system and including a first set of passages configured to flow intake air from the intake system and to one or more of the intake and exhaust system and a second set of passages configured to flow exhaust gases from the exhaust system and to one of the intake system and exhaust system; and an energy recovery device integrated with the heat exchanger and fluidly coupled to each of the exhaust system and the second set of passages, where exhaust gases flow from the exhaust system, through the energy recovery device, and into the second set of passages. In a first example of the system, the system includes an outlet port of the energy recovery device directly coupled to an exhaust passage within the heat exchanger. A second example of the system optionally includes the first example and further includes wherein the heat exchanger includes: a first inlet port coupled to each of the intake system, via a first valve, and the first set of passages; a second inlet port directly coupled to the energy recovery device and the second set of passages; a first outlet port coupled to the first set of passages and selectively coupled to each of the intake system, upstream of a compressor via a second valve and the exhaust system via a third valve; and a second outlet port coupled to the second set of passages and selectively coupled to each of the intake system upstream of the compressor, the intake system downstream of the compressor, and the exhaust system via a fourth valve. A third example of the system optionally includes one or more or both of the first and second examples, and further includes wherein the energy recovering device is selectively fluidly coupled to each of the exhaust system upstream of a first exhaust catalyst and a turbine and the exhaust system downstream of the turbine via a fifth valve. A fourth example of the system optionally includes one or more or each of the first through third examples, and further includes a controller including memory with non-transitory computer-readable instructions for adjusting one or more of the first, second, third, fourth, and fifth valves based on an output of the energy recovery device. A fifth example of the system optionally includes one or more or each of the first through fourth examples, and further includes wherein the heat exchanger further includes a third set of passages configured to flow coolant, where the third set of passages are positioned between each of the first set of passages and second set of passages. A sixth example of the system optionally includes one or more or each of the first through fifth examples, and further includes wherein the energy recovery device includes a thermoelectric generator adapted to convert thermal energy from exhaust gases to electrical energy and output the electrical energy to a battery electrically coupled to the energy recovery device.

In another embodiment of a system, the system includes: a heat exchanger including a first set of passages configured to flow intake air from an intake system and selectively to each of the intake system and an exhaust system, a second set of passages configured to flow exhaust gas from an exhaust system and selectively to each of the intake system upstream of a compressor, the intake system downstream of a compressor, and the exhaust system, and a third set of passages configured to circulate coolant; an energy recovery device physically and fluidly coupled with the heat exchanger and including a fourth set of passages directly coupled between the exhaust system and the second set of passages; and a controller including non-transitory memory with computer readable instructions for: adjusting a flow of one or more of intake air thorough the first set of passages, exhaust gas through the second set of passages, and coolant through the third set of passages based on an amount of energy generated by the energy recovery device. In a first example of the system, the system includes an electrical component electrically coupled to a battery electrically coupled to and receiving electrical energy from the energy recovery device and wherein the computer readable instructions further include instructions for operating the electrical component using energy stored at the battery via the energy recovery device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   flowing intake air through a heat exchanger and selectively to each of an intake system and an exhaust system;
   flowing exhaust gas through an energy recovery device coupled with the heat exchanger, through the heat exchanger, and selectively to each of the intake and exhaust system; and
   adjusting the flow of intake air and exhaust gas through the heat exchanger in response to an output of the energy recovery device.

2. The method of claim 1, wherein flowing exhaust gas includes flowing exhaust gas directly from the energy recovery device to the heat exchanger and wherein the flow of intake air and exhaust gas do not mix within the heat exchanger.

3. The method of claim 1, further comprising, during flowing intake air and exhaust through the heat exchanger, transferring thermal energy between the intake air and exhaust gas within the heat exchanger.

4. The method of claim 1, further comprising adjusting a flow of coolant through the heat exchanger in response to the output of the energy recovery device.

5. The method of claim 4, wherein adjusting the flow of coolant includes decreasing the flow of coolant through the heat exchanger as the output of the energy recovery device increases.

6. The method of claim 1, wherein adjusting the flow of intake air and exhaust gas through the heat exchanger includes one or more of decreasing the flow of intake air through the heat exchanger as the output of the energy recovery device increases, or decreasing the flow of exhaust gas through the heat exchanger as the output of the energy recovery device increases toward a threshold energy output.

7. The method of claim 1, further comprising estimating a temperature of exhaust gas entering the heat exchanger from the energy recovery device based on the output of the energy recovery device and one or more of a temperature of the exhaust gas in the exhaust system and engine load.

8. The method of claim 1, further comprising operating the energy recovery device in response to one or more of an engine torque output increasing above a threshold engine torque output, and an exhaust gas temperature within the exhaust system increasing above a threshold exhaust gas temperature.

9. The method of claim 1, further comprising not operating the energy recovery device in response to one or more of an engine torque output decreasing below a threshold engine torque output, an exhaust gas temperature within the exhaust system decreasing below a threshold exhaust gas temperature, an active particulate filter regeneration, and an engine cold start, and flowing exhaust gas through the energy recovery device, without transferring heat from the exhaust gas, and to the heat exchanger.

10. The method of claim 1, wherein flowing intake air through the heat exchanger and selectively to each of the intake system and the exhaust system includes adjusting a first valve to adjust the flow of intake air from the heat exchanger to the intake system, upstream of a compressor, and adjusting a second valve to adjust the flow of intake air from the heat exchanger to each of a location in the exhaust system upstream of a first catalyst and a location in the exhaust system downstream of the first catalyst.

11. The method of claim 1, wherein flowing exhaust gas through the heat exchanger and selectively to each of the intake and exhaust system includes adjusting a single valve to adjust the flow of exhaust gas to each of the intake system upstream of a compressor, the intake system downstream of the compressor, and the exhaust system upstream of a turbine.

12. A system, comprising:
   a heat exchanger coupled to each of an intake system and exhaust system and including a first set of passages configured to flow intake air from the intake system and to one or more of the intake and exhaust system and a second set of passages configured to flow exhaust gases from the exhaust system and to one of the intake system and exhaust system; and
   an energy recovery device integrated with the heat exchanger and fluidly coupled to each of the exhaust system and the second set of passages, where exhaust gases flow from the exhaust system, through the energy recovery device, and into the second set of passages.

13. The system of claim 12, wherein an outlet port of the energy recovery device is directly coupled to an exhaust passage within the heat exchanger.

14. The system of claim 12, wherein the heat exchanger includes:
   a first inlet port coupled to each of the intake system, via a first valve, and the first set of passages;
   a second inlet port directly coupled to the energy recovery device and the second set of passages;
   a first outlet port coupled to the first set of passages and selectively coupled to each of the intake system, upstream of a compressor via a second valve and the exhaust system via a third valve; and
   a second outlet port coupled to the second set of passages and selectively coupled to each of the intake system upstream of the compressor, the intake system downstream of the compressor, and the exhaust system via a fourth valve.

15. The system of claim 14, wherein the energy recovering device is selectively fluidly coupled to each of the exhaust system upstream of a first exhaust catalyst and a turbine and the exhaust system downstream of the turbine via a fifth valve.

16. The system of claim 15, further comprising a controller including memory with non-transitory computer-readable instructions for adjusting one or more of the first, second, third, fourth, and fifth valves based on an output of the energy recovery device.

17. The system of claim 12, wherein the heat exchanger further includes a third set of passages configured to flow coolant, where the third set of passages are positioned between each of the first set of passages and second set of passages.

18. The system of claim 12, wherein the energy recovery device includes a thermoelectric generator adapted to convert thermal energy from exhaust gases to electrical energy and output the electrical energy to a battery electrically coupled to the energy recovery device.

19. A system, comprising:
   a heat exchanger including a first set of passages configured to flow intake air from an intake system and selectively to each of the intake system and an exhaust system, a second set of passages configured to flow exhaust gas from an exhaust system and selectively to each of the intake system upstream of a compressor, the intake system downstream of a compressor, and the exhaust system, and a third set of passages configured to circulate coolant;
   an energy recovery device physically and fluidly coupled with the heat exchanger and including a fourth set of passages directly coupled between the exhaust system and the second set of passages; and
   a controller including non-transitory memory with computer readable instructions for:
      adjusting a flow of one or more of intake air thorough the first set of passages, exhaust gas through the second set of passages, and coolant through the third set of passages based on an amount of energy generated by the energy recovery device.

20. The system of claim 19, further comprising an electrical component electrically coupled to a battery electrically coupled to and receiving electrical energy from the energy recovery device and wherein the computer readable instructions further include instructions for operating the electrical component using energy stored at the battery via the energy recovery device.

* * * * *